June 14, 1938.  F. Q. RAST  2,120,373
WEIGHT CONTROLLED MACHINE
Filed Feb. 5, 1935    29 Sheets-Sheet 1

INVENTOR.
Frederick Q. Rast
BY
A. C. Maby ATTORNEY

June 14, 1938.  F. Q. RAST  2,120,373
WEIGHT CONTROLLED MACHINE
Filed Feb. 5, 1935   29 Sheets-Sheet 2

INVENTOR.
Frederick Q. Rast
BY
[signature] ATTORNEY.

June 14, 1938.　　　　F. Q. RAST　　　　2,120,373
WEIGHT CONTROLLED MACHINE
Filed Feb. 5, 1935　　　29 Sheets-Sheet 3

INVENTOR.
Frederick Q. Rast
BY
A.C. Maby ATTORNEY

June 14, 1938.　　　F. Q. RAST　　　2,120,373
WEIGHT CONTROLLED MACHINE
Filed Feb. 5, 1935　　　29 Sheets-Sheet 4

INVENTOR.
Frederick Q. Rast
BY
A.C. Mahy ATTORNEY

June 14, 1938.  F. Q. RAST  2,120,373
WEIGHT CONTROLLED MACHINE
Filed Feb. 5, 1935   29 Sheets-Sheet 5

INVENTOR.
Frederick Q. Rast
BY
ATTORNEY

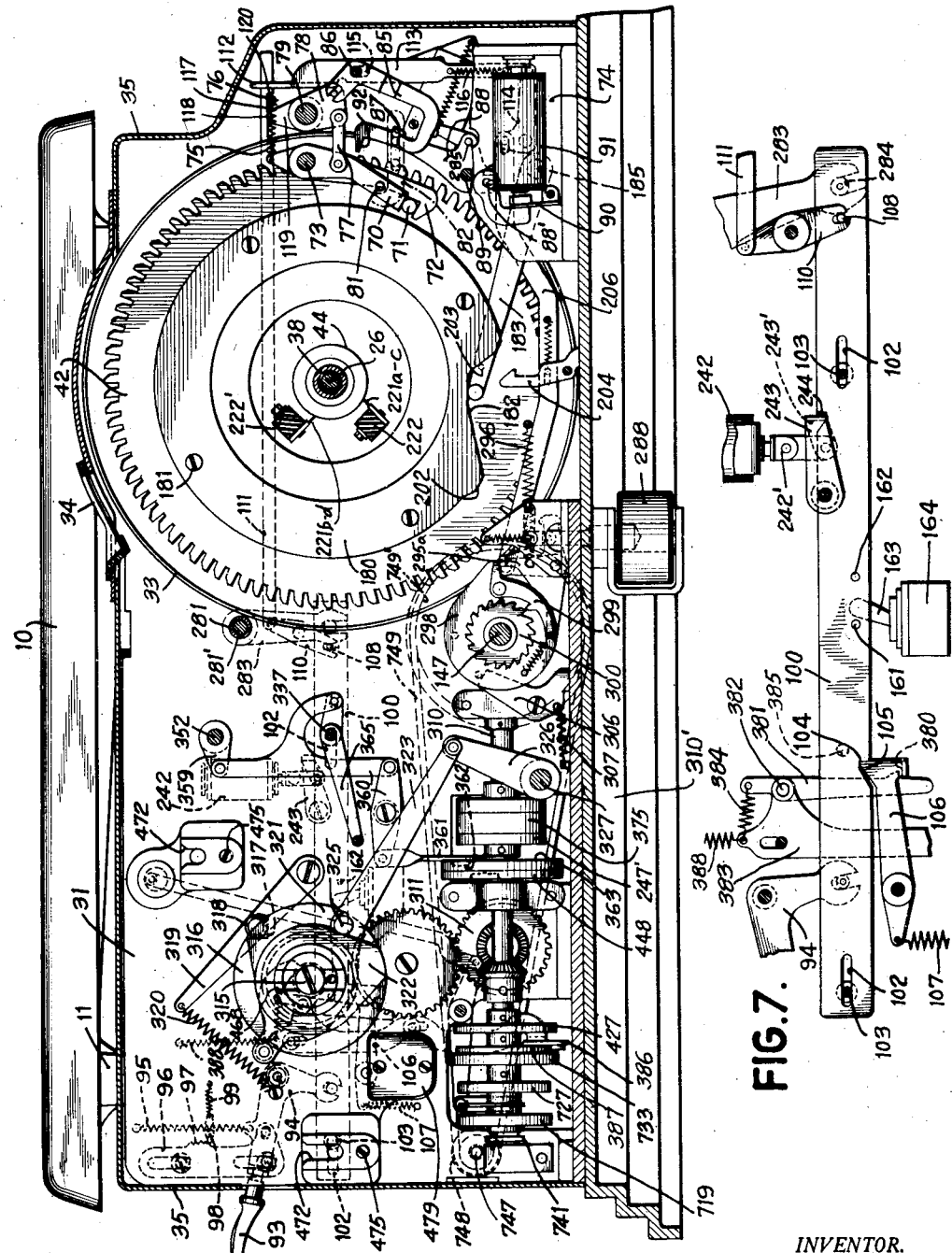

June 14, 1938. F. Q. RAST 2,120,373
WEIGHT CONTROLLED MACHINE
Filed Feb. 5, 1935 29 Sheets-Sheet 8
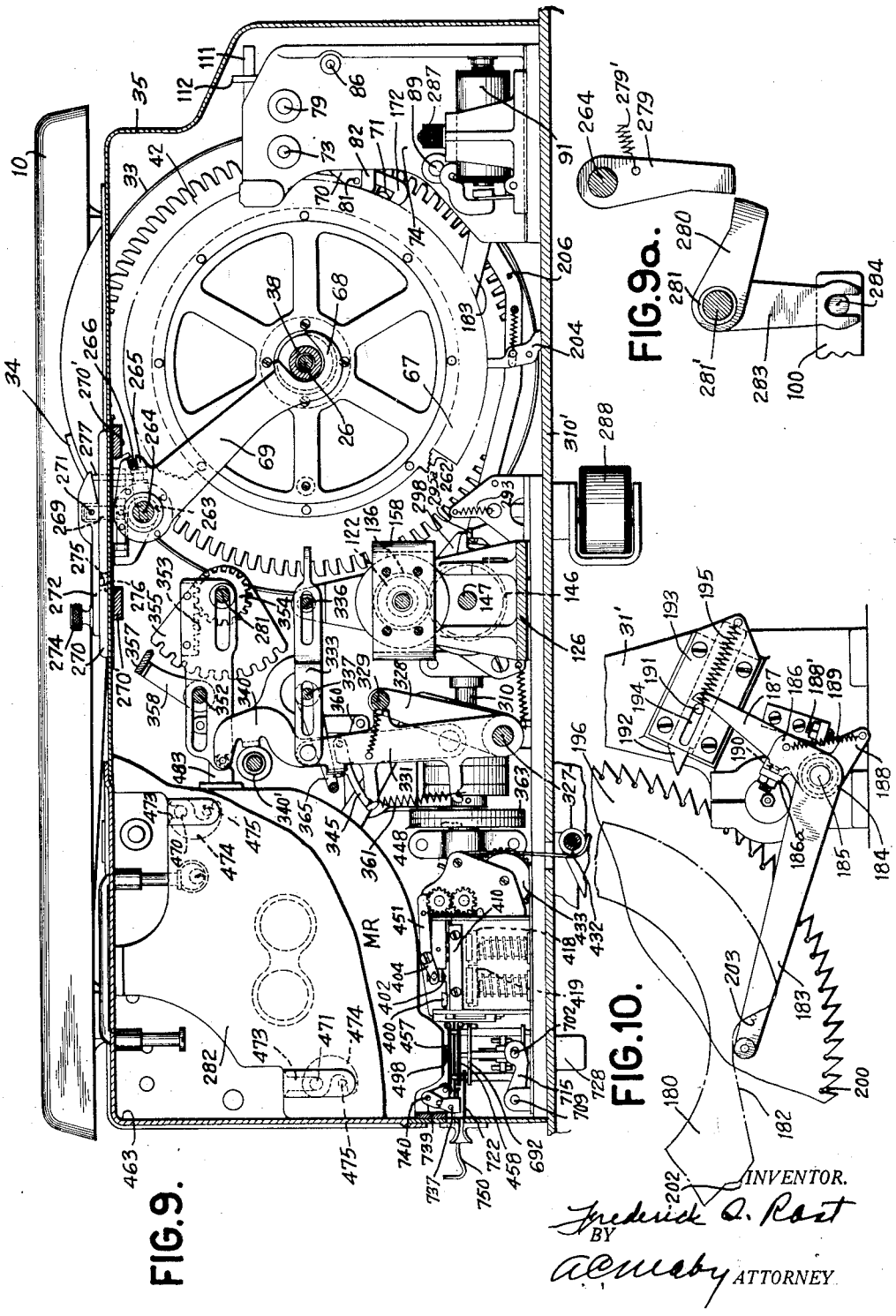
INVENTOR.
Frederick Q. Rast
BY
a c musby ATTORNEY

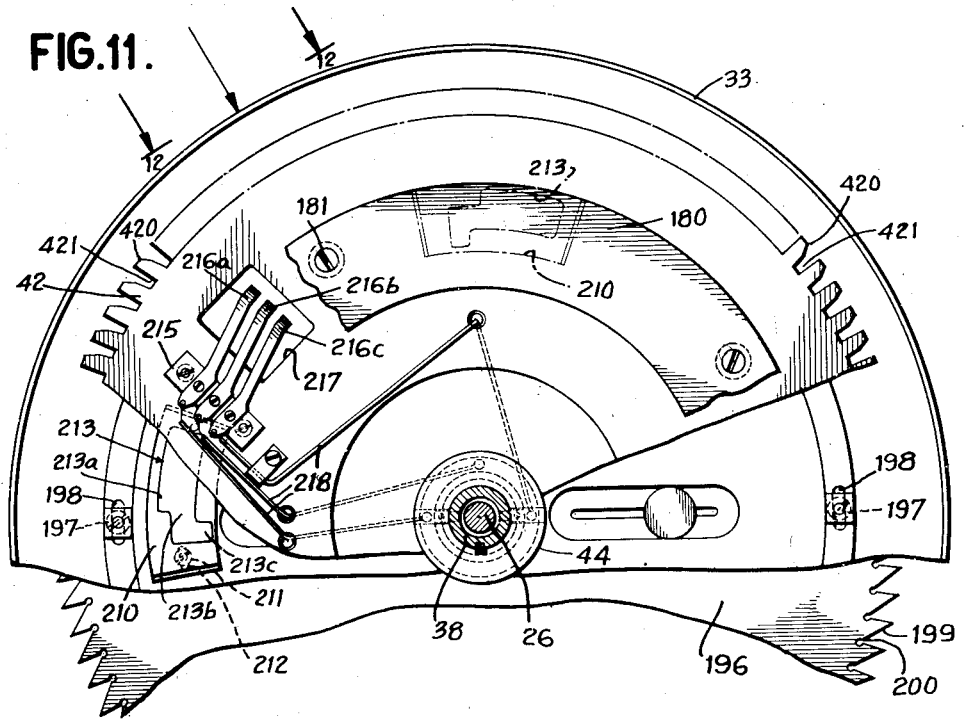
FIG.11.
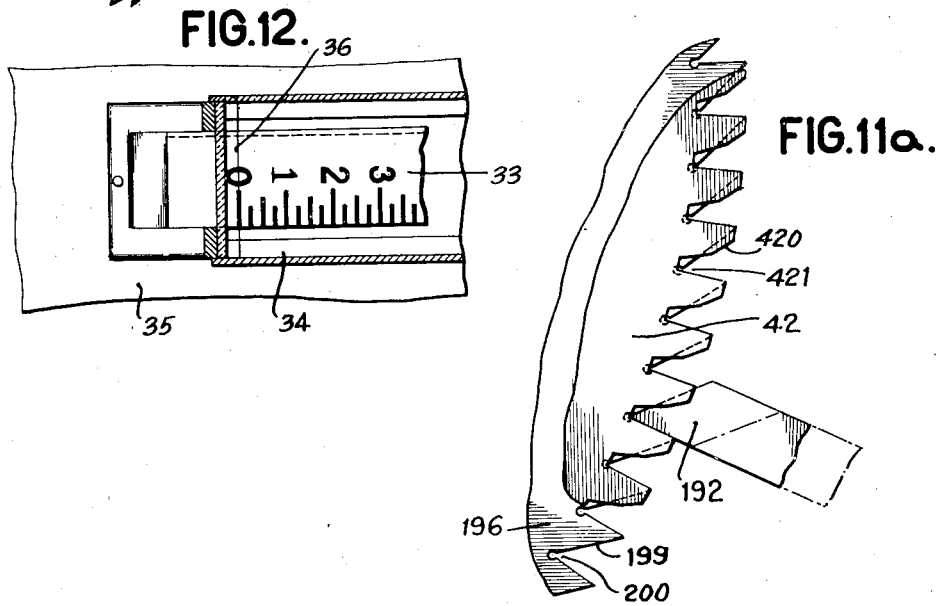
FIG.12.
FIG.11a.

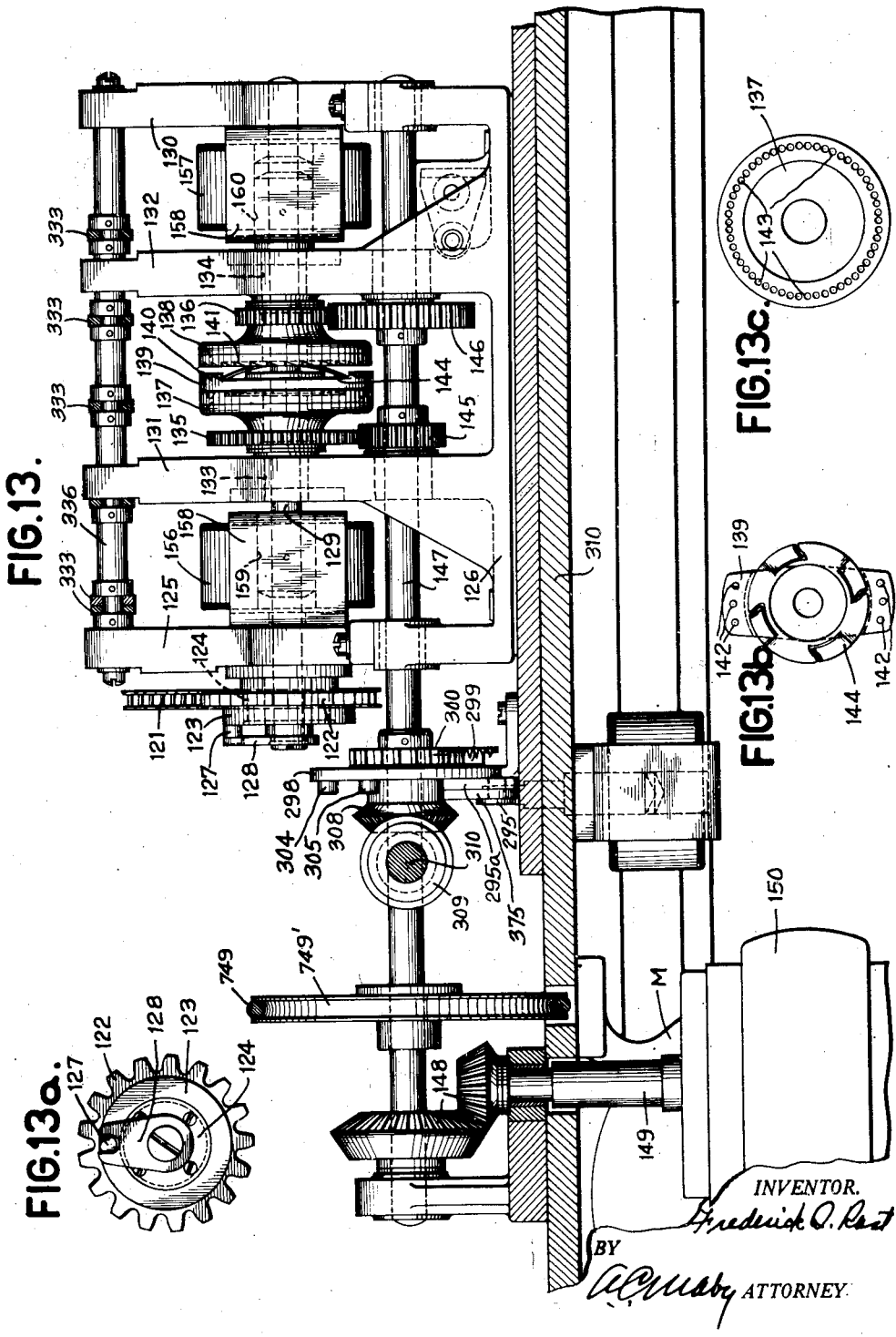

June 14, 1938.   F. Q. RAST   2,120,373
WEIGHT CONTROLLED MACHINE
Filed Feb. 5, 1935   29 Sheets-Sheet 12

INVENTOR.
Frederick Q. Rast
BY
A. C. Mabry
ATTORNEY

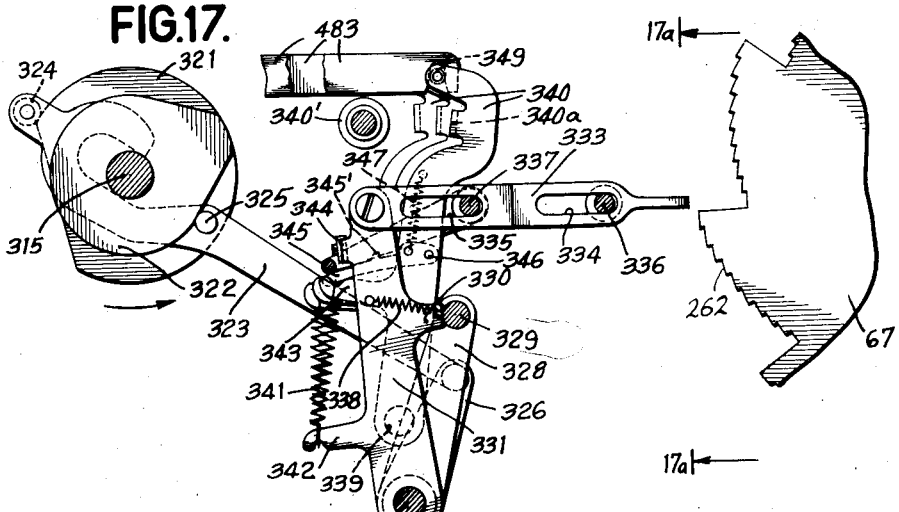
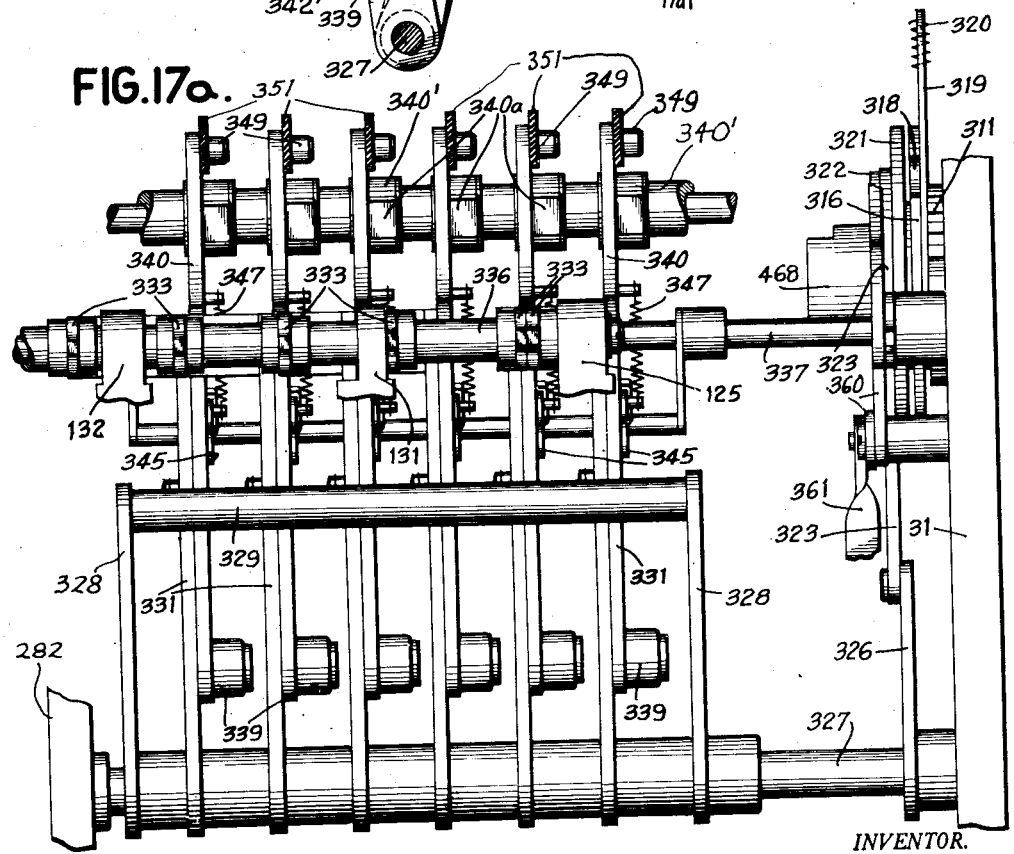

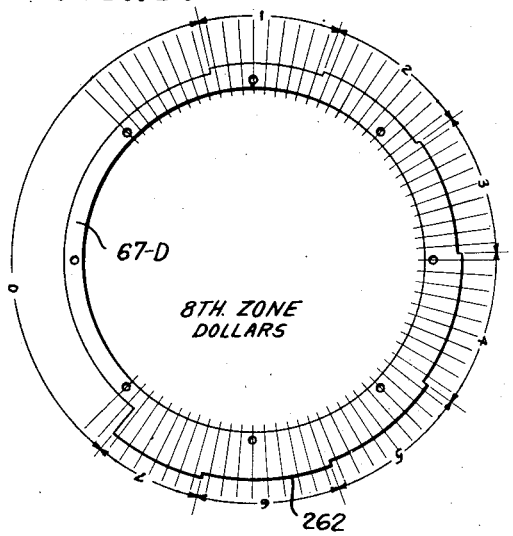
FIG.18. 8TH. ZONE DOLLARS
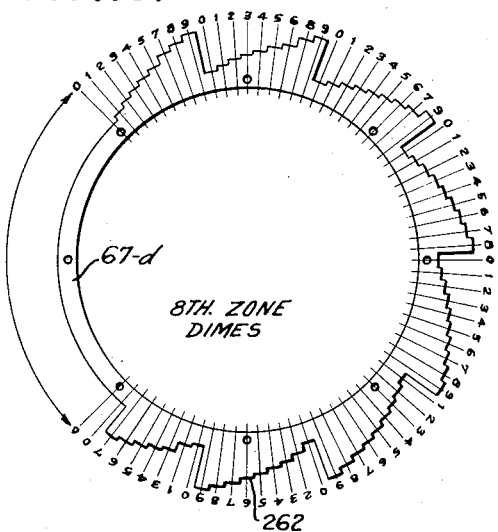
FIG.19. 8TH. ZONE DIMES
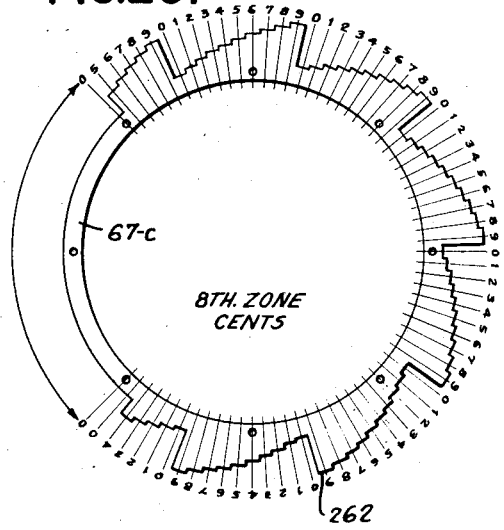
FIG.20. 8TH. ZONE CENTS
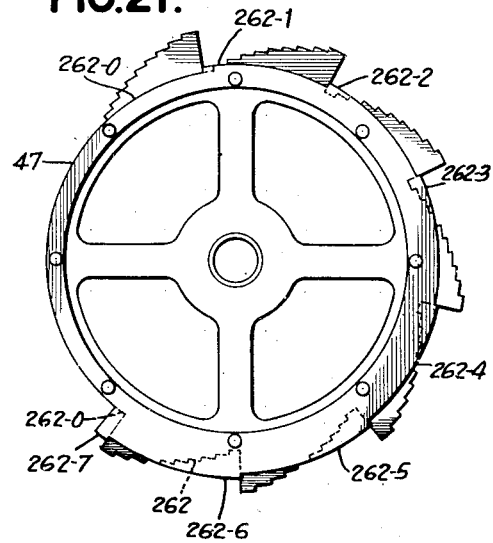
FIG.21.

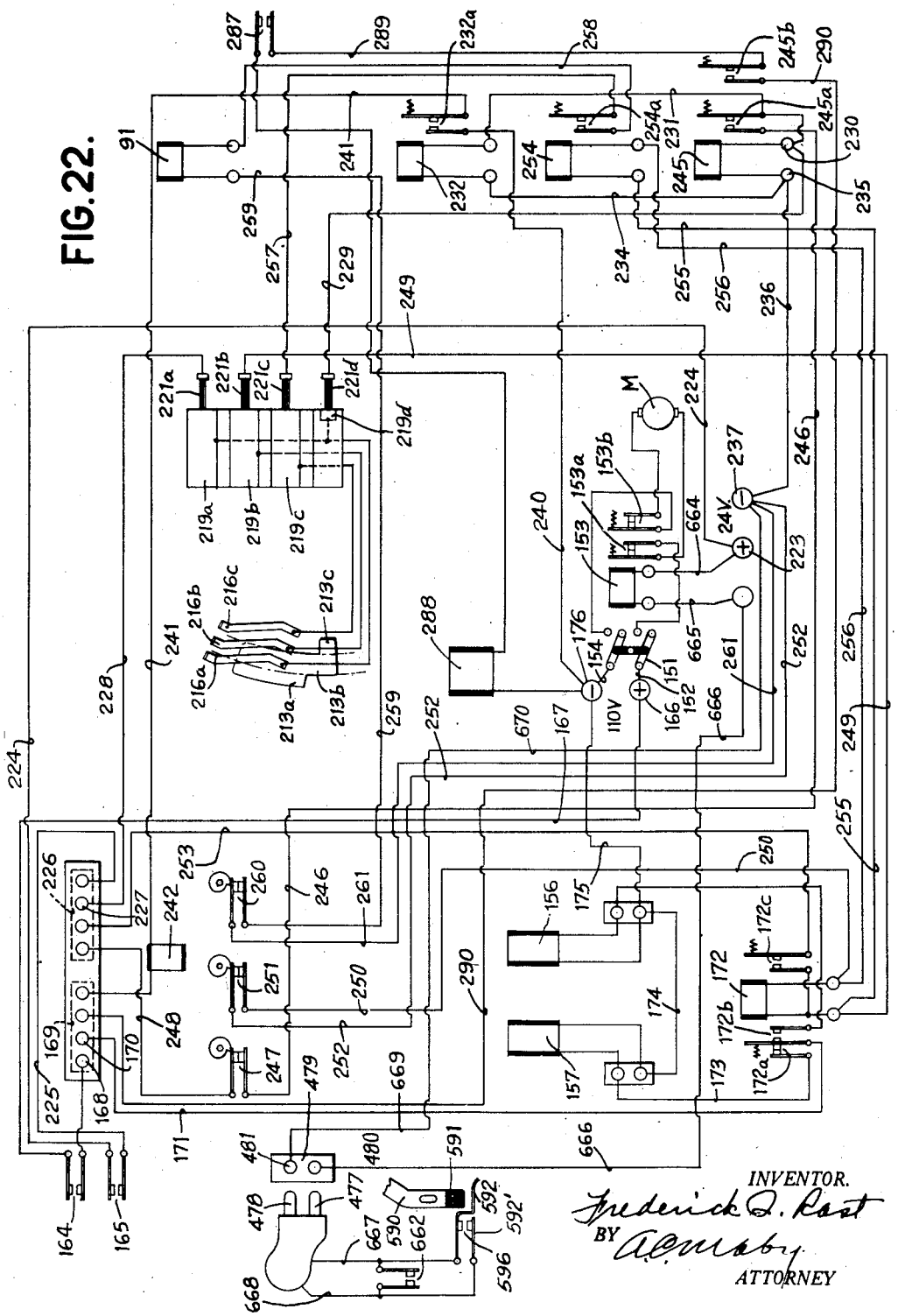

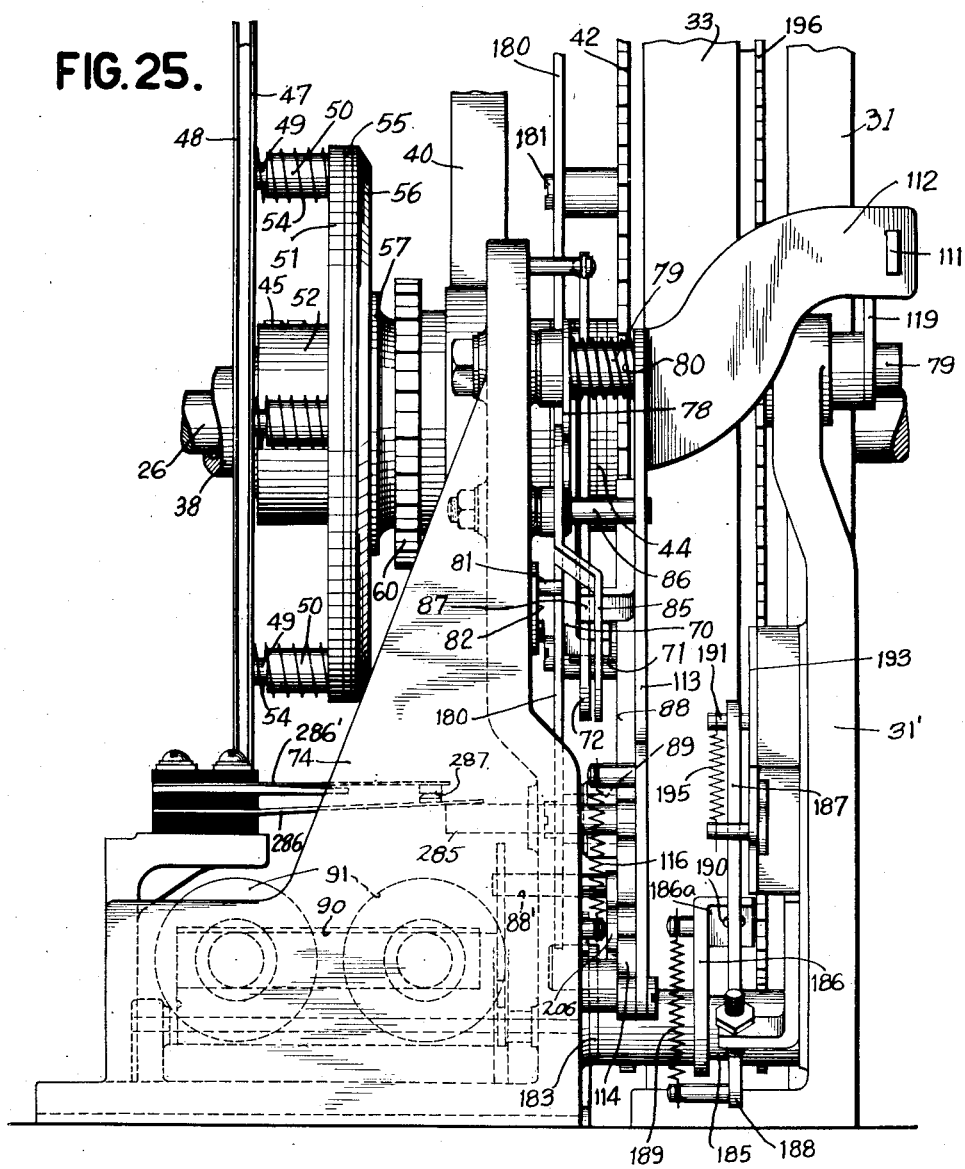

June 14, 1938.  F. Q. RAST  2,120,373
WEIGHT CONTROLLED MACHINE
Filed Feb. 5, 1935  29 Sheets-Sheet 17

INVENTOR.
Frederick Q. Rast
BY
ATTORNEY

June 14, 1938.　　　　F. Q. RAST　　　　2,120,373

WEIGHT CONTROLLED MACHINE

Filed Feb. 5, 1935　　　29 Sheets-Sheet 19

INVENTOR.
Frederick Q. Rast
BY
ATTORNEY

June 14, 1938.   F. Q. RAST   2,120,373
WEIGHT CONTROLLED MACHINE
Filed Feb. 5, 1935   29 Sheets-Sheet 20

INVENTOR.
Frederick Q. Rast
BY
ATTORNEY

June 14, 1938.  F. Q. RAST  2,120,373
WEIGHT CONTROLLED MACHINE
Filed Feb. 5, 1935  29 Sheets-Sheet 21
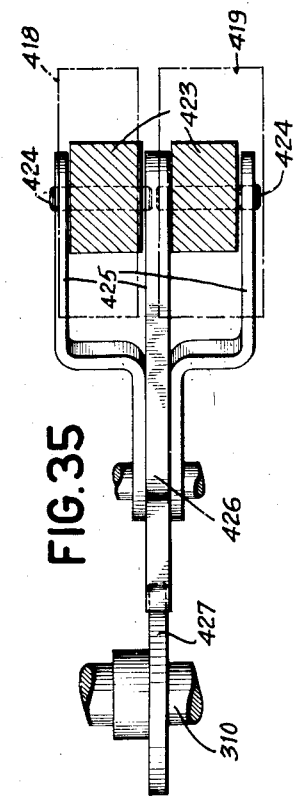
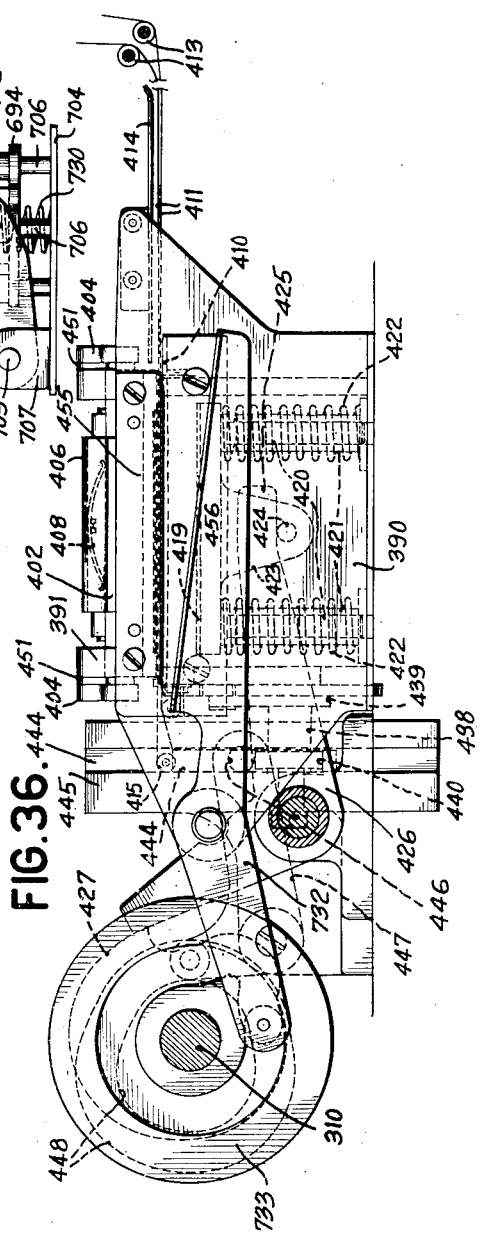
INVENTOR.
Frederick Q. Rast
BY
ATTORNEY

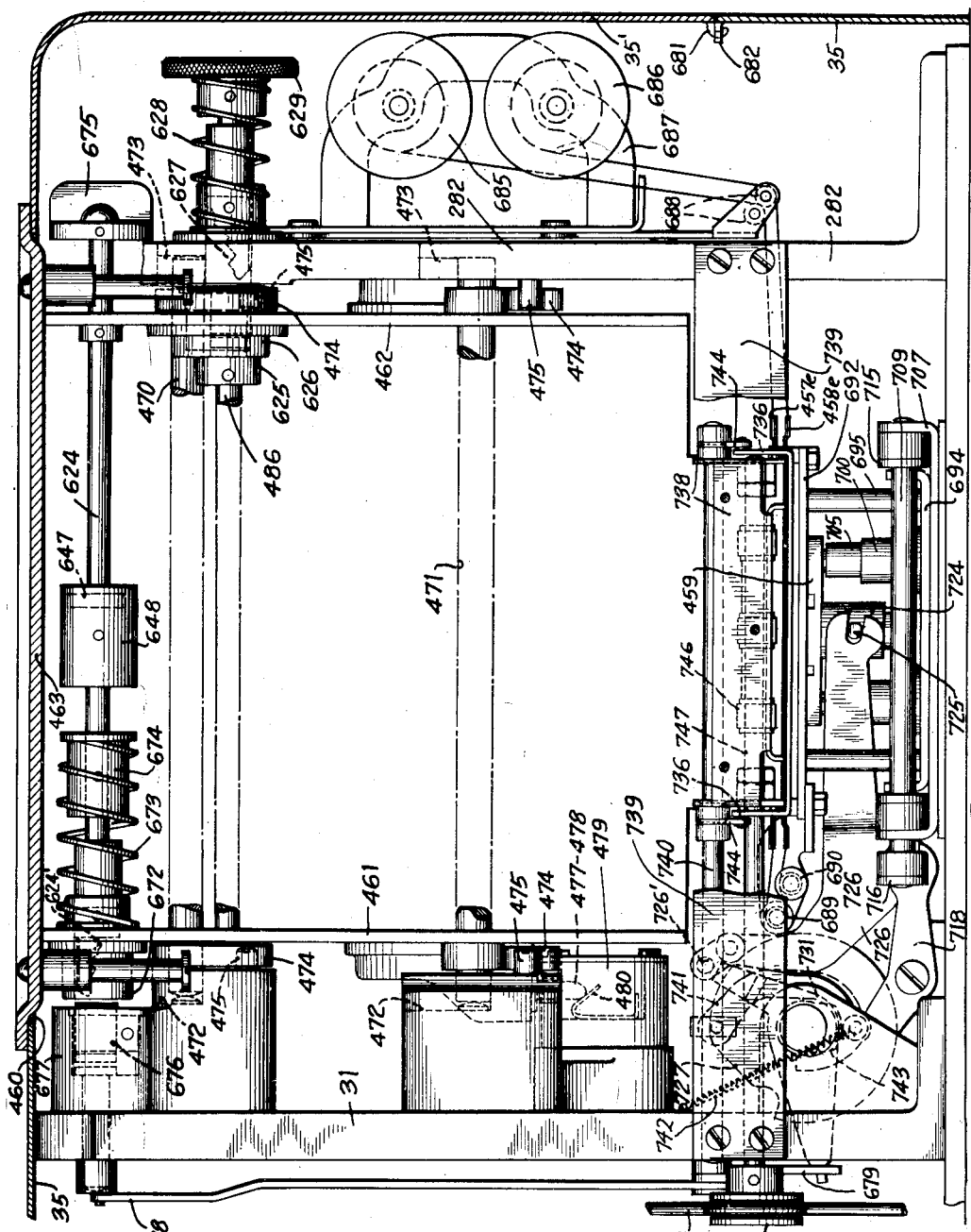

June 14, 1938.  F. Q. RAST  2,120,373
WEIGHT CONTROLLED MACHINE
Filed Feb. 5, 1935  29 Sheets-Sheet 24
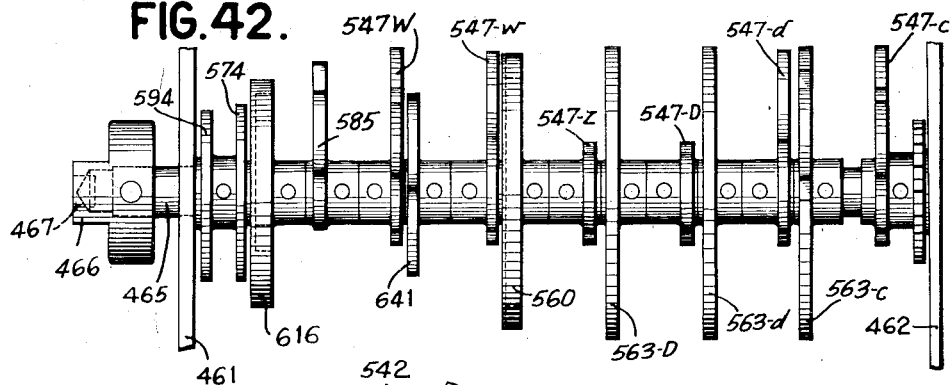
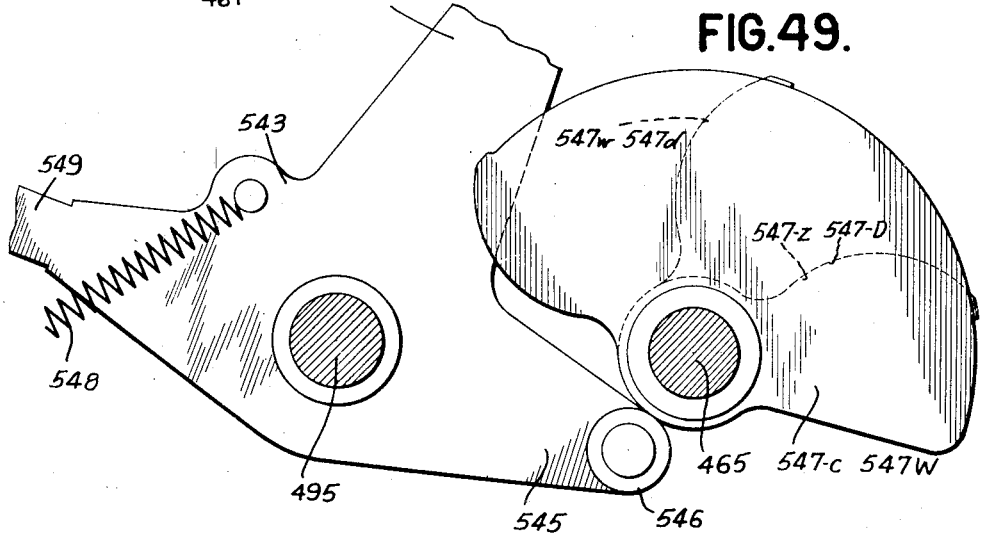
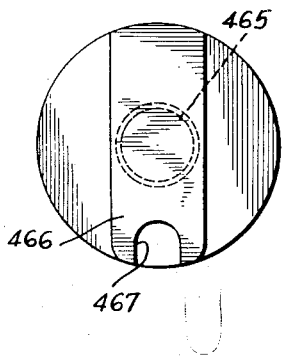
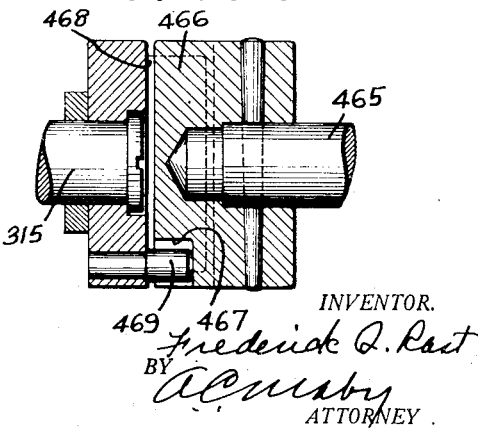
INVENTOR.
Frederick Q. Rast
BY
ATTORNEY.

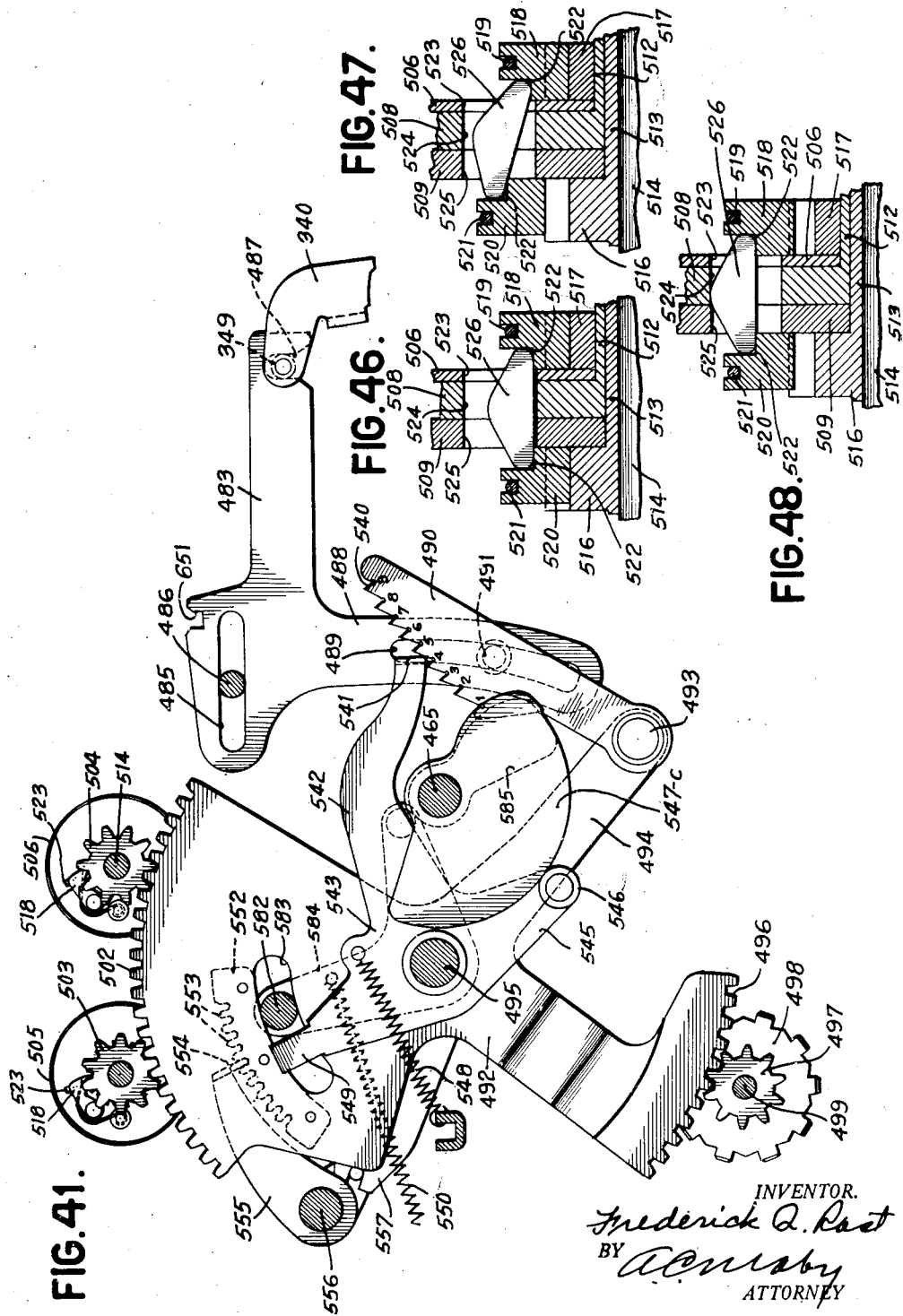

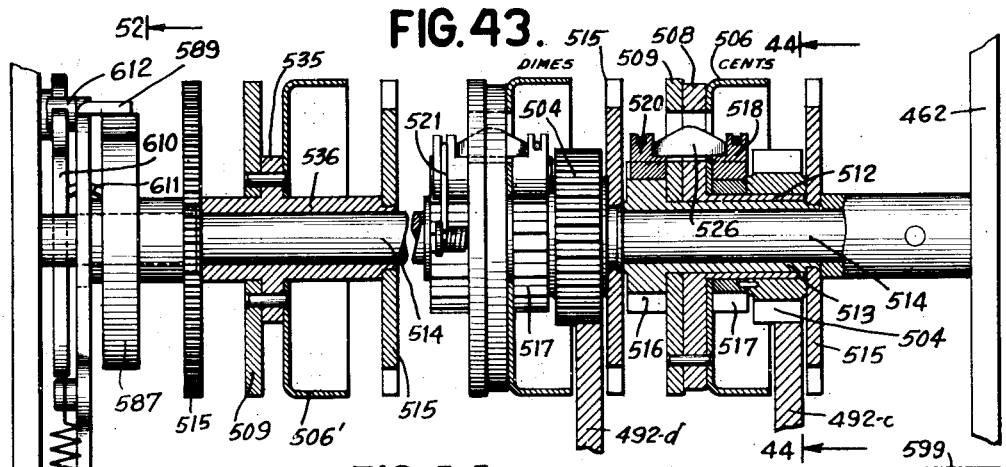
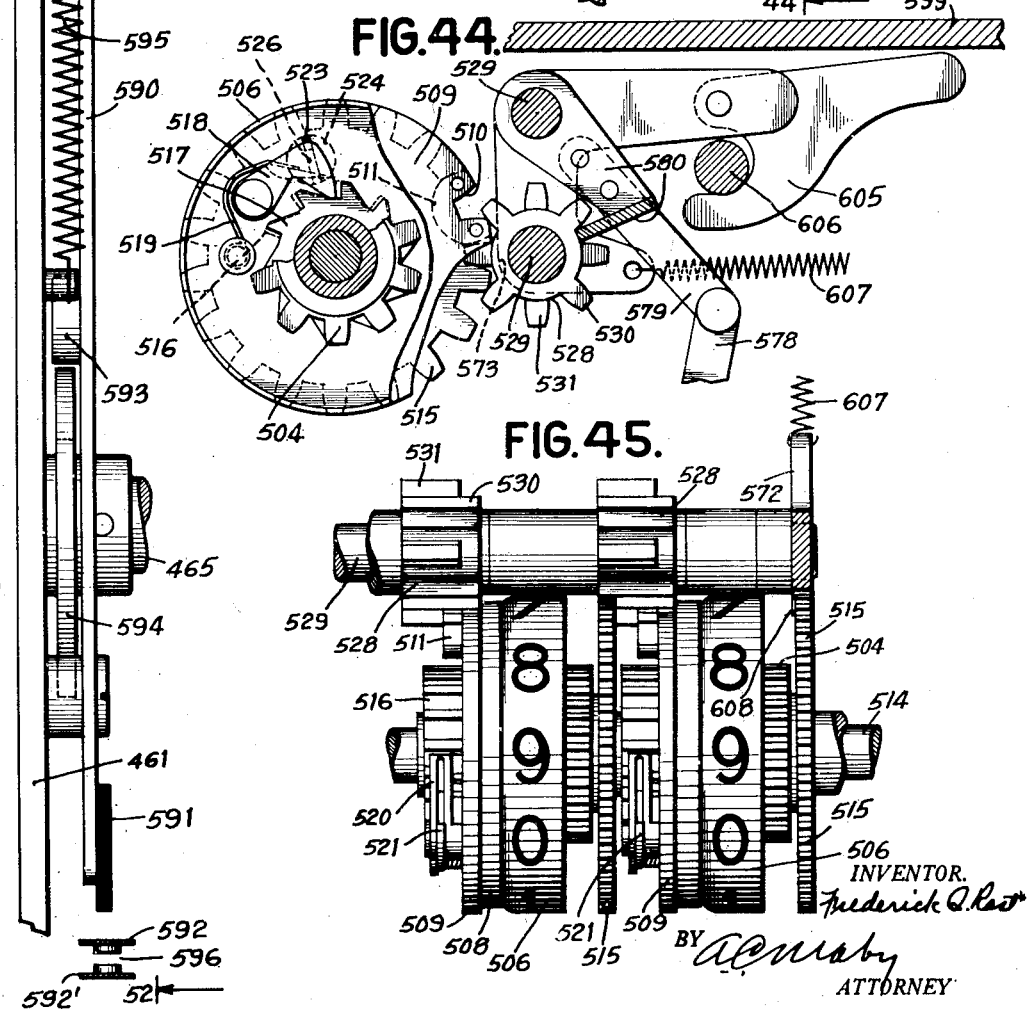

June 14, 1938.  F. Q. RAST  2,120,373
WEIGHT CONTROLLED MACHINE
Filed Feb. 5, 1935  29 Sheets-Sheet 27
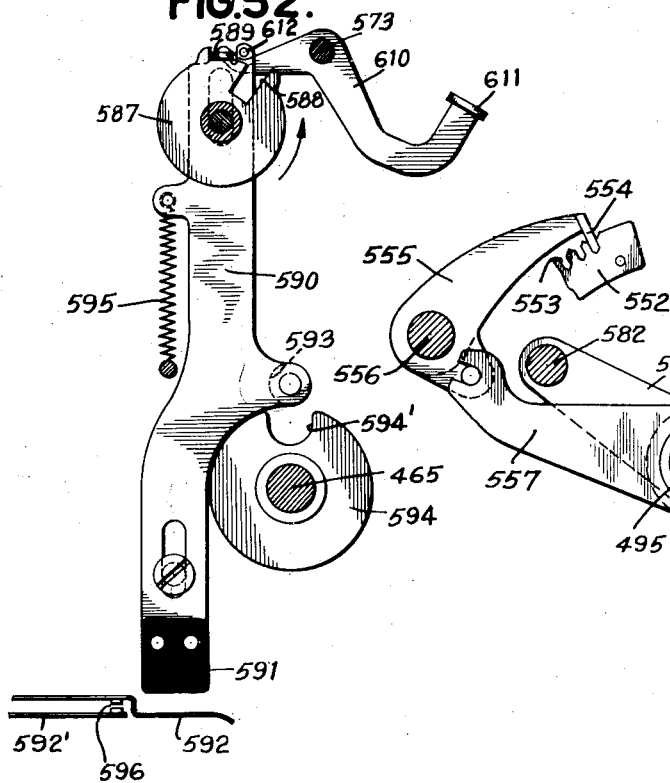
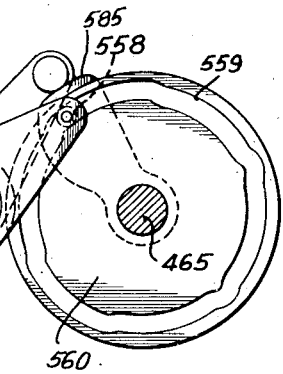
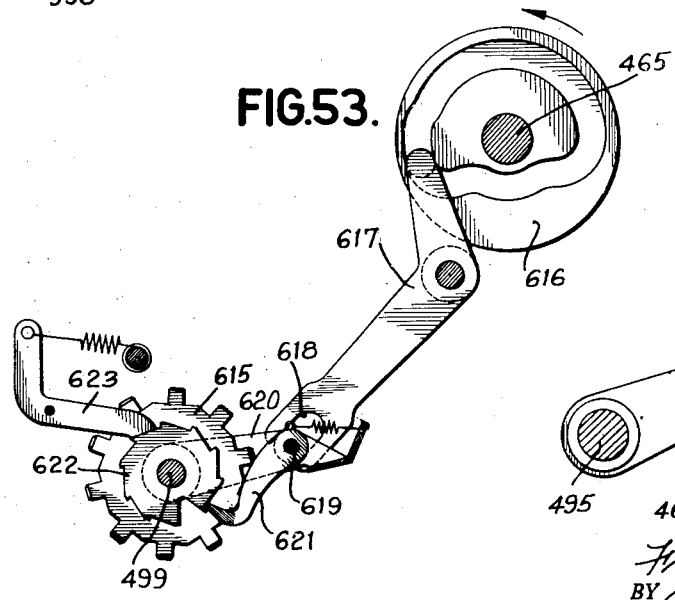
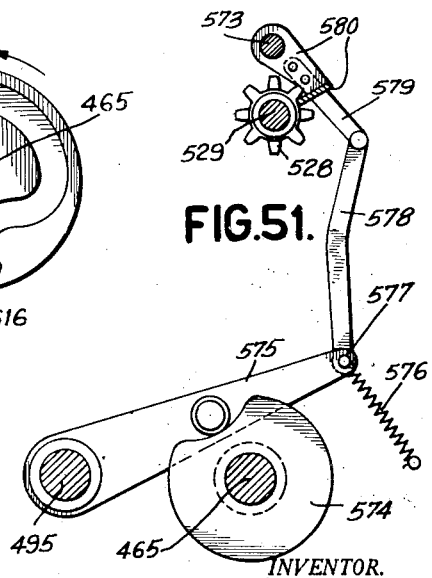
INVENTOR.
Frederick Q. Rast
BY
ATTORNEY June 14, 1938.   F. Q. RAST   2,120,373
WEIGHT CONTROLLED MACHINE
Filed Feb. 5, 1935   29 Sheets-Sheet 28
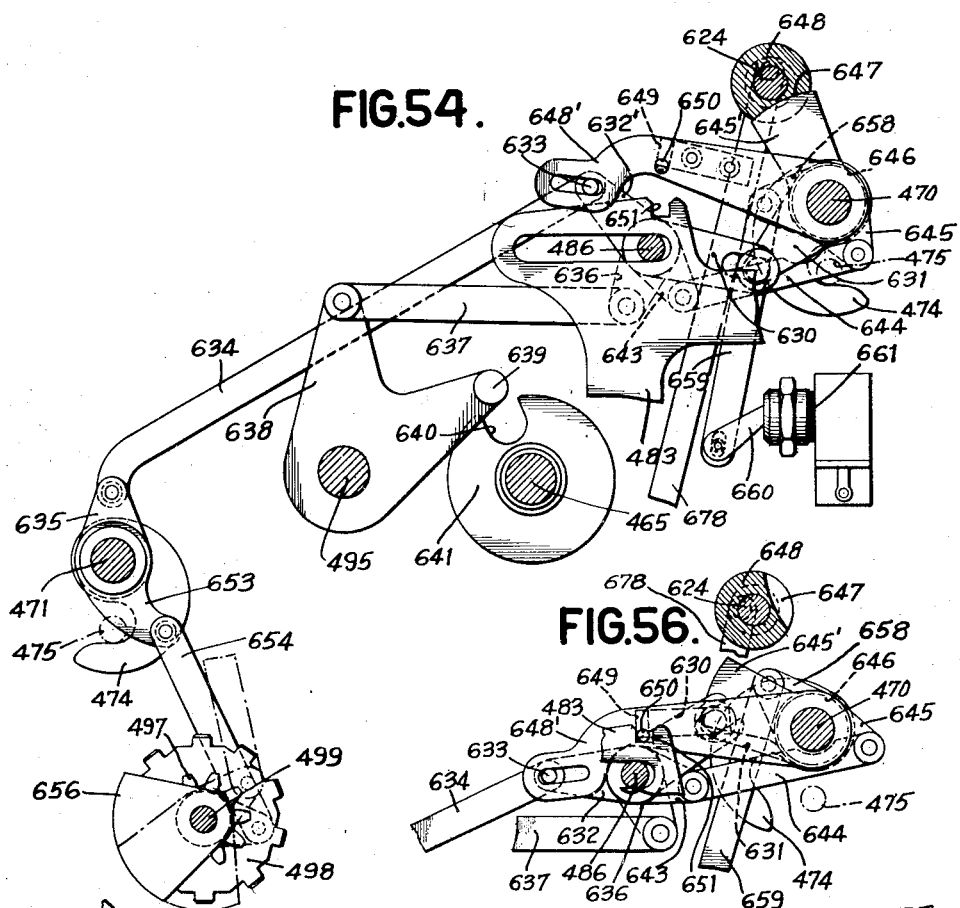
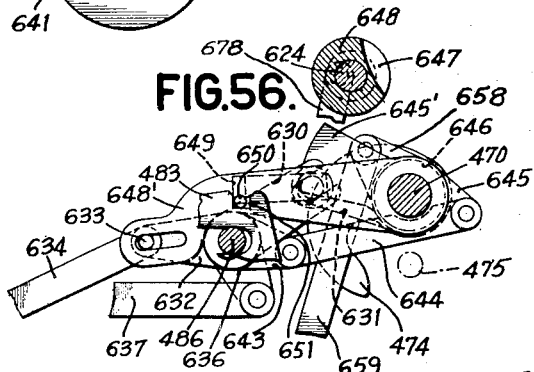
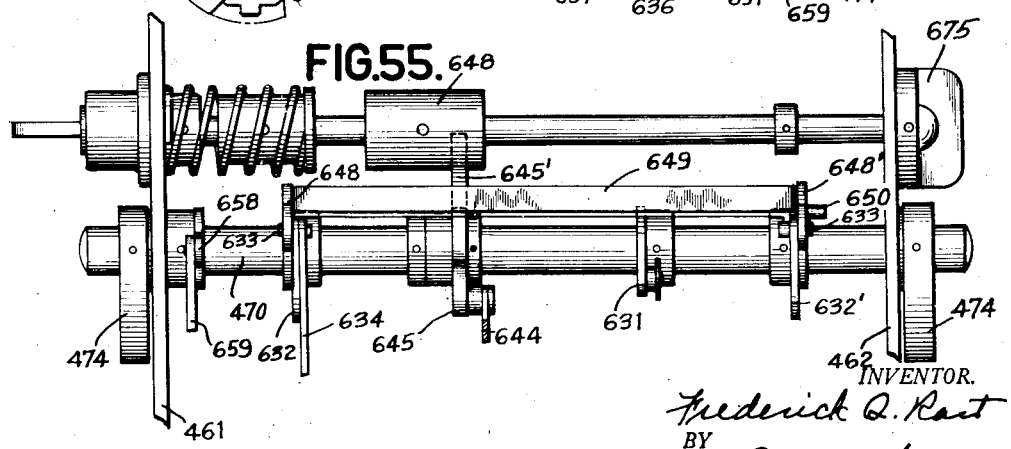
INVENTOR.
Frederick Q. Rast
BY
ATTORNEY

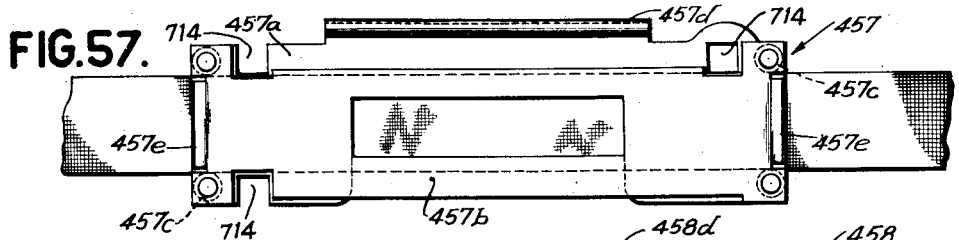
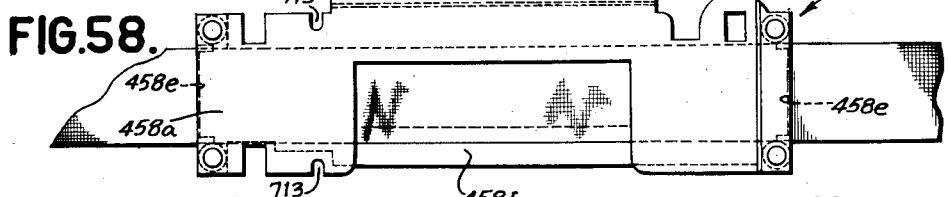
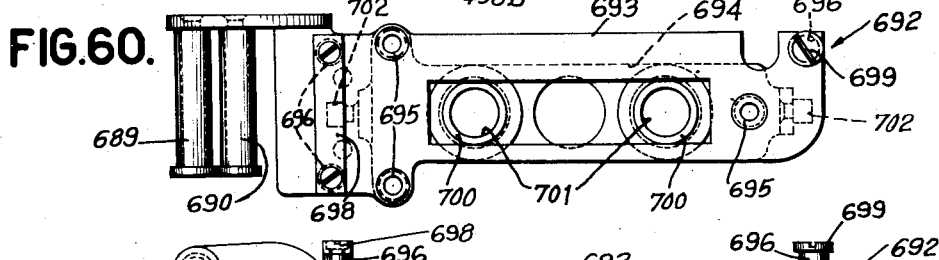
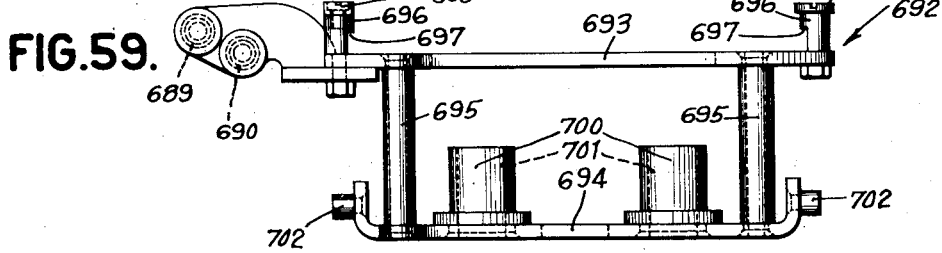
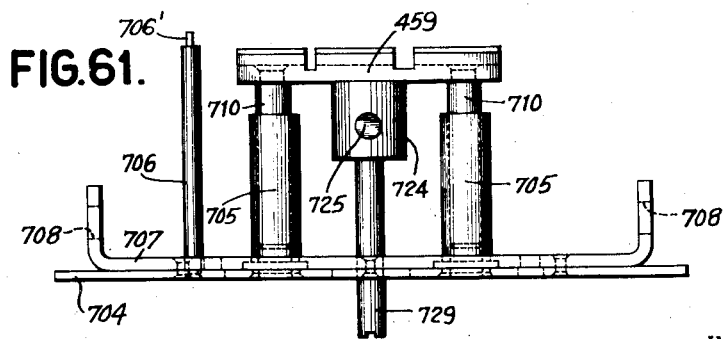

Patented June 14, 1938

2,120,373

UNITED STATES PATENT OFFICE 2,120,373

WEIGHT CONTROLLED MACHINE

Frederick Quintus Rast, New York, N. Y., assignor to International Business Machines Corporation, New York, N. Y., a corporation of New York Application February 5, 1935, Serial No. 5,026

80 Claims. (Cl. 235—58)

This invention concerns a combination weighing scale and recording, registering machine.

In the following parts of the specification, the terms "auxiliary means" or "auxiliary mechanism" will be used to signify any mechanism auxiliary or supplementary to the scale proper but under its control partly or fully and such auxiliary mechanism may mean a selector mechanism or any part of it by which the load on the scale is interpreted, the recording or registering mechanisms or any part thereof for recording or registering the load or any data or value relating to the load, the control mechanism for interassociating the recording or registering means with the selecting mechanism, the other mechanisms supplementary to the scale and cooperating with the selecting, recording, registering, or control mechanism.

The terms "recording mechanism" or "recorder" are to be applied in their broad sense as meaning indicating, registering, or printing means.

The terms "registering mechanism" or "register" are intended to cover means for receiving an entry of data.

The terms "accumulator", "accumulating mechanism" or "total register" are intended to cover means for receiving successive entries and registering the resultant of the successive entries.

The terms "subtracting" or "descending register" are to cover means for receiving successive entries and for subtracting the last entry from the preceding total on the register.

The terms "translating means" or "translator" are used to signify the mechanism intermediate the weighing scale and the operating means for the recording or registering mechanisms and which controls operation of the latter mechanisms according to the load alone, or the load plus an additional, settable, factor to determine or compute a price or value, according to a classifying factor.

The part of the translating means which selects the load or other associated factors to be transmitted by the translating means to the registering, recording means may be broadly termed herein the selector or selecting mechanism.

The part of the translating mechanism which is controlled by the selecting mechanism and takes a reading from the latter may be termed the reading mechanism.

The term "weighing scale" is to include all of the parts by which the weight is indicated or determined.

The term "weighing mechanism" is to cover any part or parts of the scale which respond to the load.

The description and claims are not to be confined to above terms and where convenient other appropriate and suitable terms will be used to explain and define the invention.

The objects of the invention, briefly stated, are:

1. To provide novel means for setting auxiliary mechanism under control of weighing mechanism according to the load on the scale, but independently of the load force.

a. To include in such setting means an intercontrol between the weighing and auxiliary mechanism which has no reactive or deterrent effect on the weighing mechanism at any point of the weighing range of the latter, such intercontrol to comprise a part on the weighing mechanism and a cooperating part on the auxiliary mechanism located in the same plane but out of engagement prior to or during weighing operation.

b. To effect above object by restricting the range of the weighing mechanism intercontrol part, which is rotatable, to less than a full revolution and to locate the other intercontrol part in the part of the revolution completely out of the range of the first-mentioned part.

c. To provide an adjustment for the scale intercontrol part in the direction of its movement under the load force to vary its point of coaction with the auxiliary intercontrol part.

2. To provide auxiliary mechanism movable independently of but in accordance with the load in one direction and settable in another direction according to an additional factor.

a. Specifically, the part of the auxiliary mechanism to be controlled as above according to the two factors is to comprise the selector mechanism.

b. Such selector mechanism to comprise a plurality of stepped, selector disks mounted on a shaft which is independent of the weighing mechanism but settable according to and under control of the weighing mechanism and such disks to be settable along the shaft according to a factor independent of the load value.

3. To prevent repetition of a registering or recording mechanism under a single load setting of auxiliary selector means which controls the registering, recording mechanism.

a. To prevent such repetition, as above stated, by requiring as a preliminary to the registering, recording cycle at least two successive control operations of the intercontrol between the weighing and selector mechanisms before the latter is stopped in load position, whereby, if the selector mechanism remains set in load position after a single registering, recording operation, the first of the successive control operations will be lacking, thereby obviating repetition of the registering, recording cycle.

4. To provide a one-revolution or single cycle actuating mechanism for effecting registering, recording operations and to initiate said cycle by the stopping of the selector mechanism in load position.

a. To stop the selector mechanism by a latch which when moved to operative position actuates means for initiating the cycle.

5. To provide a variable speed drive for auxiliary mechanism to move the latter according to the load position of the weighing means.

a. To drive such auxiliary mechanism at an initial high speed and at a reduced speed as it approaches the load point.

b. To return such auxiliary mechanism to home position.

c. To change the driving speed under control of aforesaid intercontrol parts.

d. To frictionally couple the driving means to the auxiliary mechanism whereby the change in speed of the latter will occur instantly upon a change in speed of the driving means.

e. To prevent stopping of the auxiliary means in load position unless the speed reducing means has first operated.

f. To provide a two-way clutch connection in the low speed driving train for preventing delay in action of the latter train.

g. After stopping of the auxiliary means by the aforementioned latch, by reason of the shape of the latch and its coacting part of the auxiliary means to cause the frictional drag of the driving means on the auxiliary means to firmly hold the latch in operative position.

6. To positively release the above latch from arresting engagement with the selecting means after the reading means has functioned.

a. To set a stop in position to arrest the selector means in home position under control of the same means which releases the latch from the auxiliary means.

7. To set and lock the weighing mechanism in an even pound position under control of means actuated by the auxiliary mechanism.

a. To maintain the secondary setting and locking means in actuated position if the auxiliary means goes past the load position without first having been stopped by the latch and without the aforesaid single cycle driving means having been set in operation.

b. To return the secondary setting means under control of the single cycle driving means.

c. To provide in the secondary setting means a sharply pointed knife edge movable into any one of the notches of a load-responsive notched disk and to undercut or relieve the notches by recesses to thereby prevent the point of the knife edge from engaging the bottom of a notch.

d. To move the knife edge into a notch by yieldable or flexible pressure.

8. To initiate operation of the auxiliary mechanism by a manually actuated or controlled operating bar which is locked in position against return until the selector part of the auxiliary mechanism completes its cycle or returns to home position.

a. To also prevent return of the operating member unless the one-revolution drive has been set in operation.

b. To provide means to normally hold the selector mechanism in home position and which is released by the operating bar to permit the selector mechanism to be driven to a load position.

9. To prevent arrest of the selector mechanism by its arresting latch in any position but the one exactly corresponding to the even pound set position of the weighing mechanism.

a. To effect the latter object by causing the intercontrol parts between the weighing and selector mechanisms, cooperation of which sets the stop latch in operation to move out of cooperation with each other should the selector mechanism pass the load point without being arrested by the latch.

10. To provide a reading mechanism between the selector means and the registering, recording mechanism which is operated by the single cycle drive to read the selector means after the latter is set in load position.

a. To set, by the operation of the reading means, control members which remain in set position after restoration of the reading means.

b. To effect by above object, release of the selector means by the reading means while maintaining the control members in their set position, whereby the selector means may be returned to home position immediately after the reading operation and prior to the registering, recording operation.

c. To couple said control members to the reading means for common, unitary, forward operation while the reading is taking place and to lock only the control members in set positions at the end of said reading operation.

d. To provide means to prevent relative movement between the reading means and control members during the reading operation, which means is released upon the locking of the control members in set positions.

e. To return the reading means to initial position while the control members are still set and by such return to tension springs for subsequently, upon unlocking of the control members, relaxing to return the control members to home position.

f. To latch the reading means to the control members for common movement during forward, reading operation only after the reading means reaches the first, outermost position of the selector mechanism.

11. To control the registering, recording mechanism by positioning elements positively but releasably coupled, to the control members for a common operation with the latter.

12. To provide control means for the recording, registering mechanism, which are differentially settable by the aforesaid positioning elements without possibility of play between the elements and said control means during the setting operation.

a. To actuate the control means according to its setting by a device which is separable from but comes into contact with the control means after the latter has been set and to prevent the impact of the device and this means causing transverse movement of the latter out of position.

b. To permit play, for preventing binding, between the positioning elements and the control means after the latter has been set in motion by its actuating device.

13. To provide novel means for taking an imprint from the recording means according to its weight and price setting.

a. The above object to comprise guide elements spaced apart to receive the record blank and then compressed towards each other after receiving the blank and prior to the printing operation to facilitate the making of a clear impression.

b. To provide an additional guide cooperating with one of said guide elements to guide into printing position a duplicate record blank and to move this guide towards the cooperating guide element prior to the printing operation to cause a clear imprint to be made on the duplicate.

c. To provide duplicate inking ribbon strips, one above the original record blank and one above the duplicate record blank which ribbons are compressed against the blanks prior to the printing operation.

d. To move the record blanks, guides therefor, and ribbon strips towards each other and towards the type wheels prior to the operation of the printing hammer whereby a clearer imprint may be made on the blanks.

14. To provide the registering and recording mechanism within a meter unit removable from the machine and to cause a void-marked record to be printed should the machine be operated while the meter unit is out of the machine.

a. To automatically set a shield before the recording mechanism in the meter when removing the latter from the machine.

b. To provide novel registering devices to register the price of which the load is a factor.

c. The above object to include means in the register device to prevent overthrow of the latter due to its own momentum.

15. To provide an interlock between means for setting the selector mechanism along its shaft and the aforesaid manual operating bar so as to prevent operation of the bar during the operation of said setting means and to prevent operation of the setting means after operation of the bar.

Other objects will be clear from the accompanying description and from the drawings.

The principles of the present invention are of general application to machines for recording or registering data relating to a load on a scale but for the purposes of the present disclosure, the invention will be explained in connection with a parcel post machine.

Parcel postage depends on the weight of a package and the zone to which it is to be mailed. The machine forming the subject of this case weighs the package and issues a stamp therefor. This stamp has printed on it the postage paid, the zone, the weight of the package, and additional related classifying data. Whenever a stamp is issued, the machine registers the postage. A total register accumulates the successive amounts of postage. A subtracting register subtracts the last amount paid from the previous reading of the latter register. The subtracting register is initially set at a certain figure by the post office and the user of the machine charged with this amount of postage. When this charged postage has been used up, the subtracting register indicates a zero or negative amount and the machine is then automatically locked up to stop issuing stamps until the subtracting register is re-set. The total and subtracting registers, the zone, weight, and amount printing means and related mechanisms are contained in a meter unit which, for convenience, is separable as a unit from the rest of the machine. The meter can thus be conveniently brought to the post office for re-setting or can be locked up in a safe when the machine is not in use, to prevent unauthorized issue of stamps.

Each meter has an individual classifying number and individual, distinctive locking means which cooperate with companion locking means in the machine to lock the meter in the machine. Access to the locking means, when it is desired to remove or insert the meter, is had through a door having a lock the key to which is distinctive and in the possession of the owner of the machine.

In addition to the data printed by the meter, the machine has means outside the meter for printing the classification indicia appertaining to a United States postal stamp. When the meter is out of the machine, the postage cannot be printed on the stamp and the machine if operated when the meter is out will issue a stamp bearing the classifying data and marked Void. This stamp is invalid and cannot be used. The purpose of this is to prevent the issue of a stamp bearing classification data and which by means other than the meter belonging to the machine may be later and fraudulently imprinted with postage, zone, and weight indicia.

In the drawings:

Fig. 6 is a section along line 6—6 of Fig. 1;

Fig. 7 is a detail of the operating bar which initiates operations of the machine with the bar shown in actuated position;

Fig. 9 is a section along line 9—9 of Fig. 1;

Fig. 9a is a detail of the interlock between the zone setting device and the operating bar;

Fig. 10 is a detail view of the secondary setting means for the weighing mechanism;

Fig. 11 is a detail end view of the load indicator and the intercontrol between the indicator and the selector mechanism;

Fig. 11a is a detail of the secondary setting means showing its operated position;

Fig. 12 is a plan view of the portion of the indicator and the sight window of the casing through which the indicator reading is viewed;

Fig. 13 is a detail view of the variable speed actuating mechanism for the selector mechanism;

Fig. 13a is a detail of the driving connection between the variable speed drive and the selector mechanism;

Fig. 13b is a detail face view of the shiftable clutch member of the variable speed drive and its spring;

Fig. 13c is a detail, face view of the low speed driving clutch member;

Fig. 17 is a view of the reading mechanism after the restoration of the feelers and while the control members are still in differential positions;

Fig. 17a is a view looking in the direction of the arrows 17a in Fig. 17;

Figure 24:
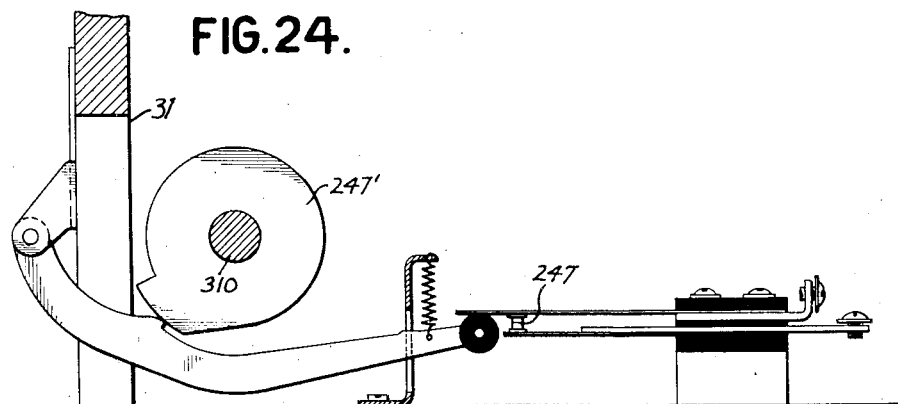
Figure 4:
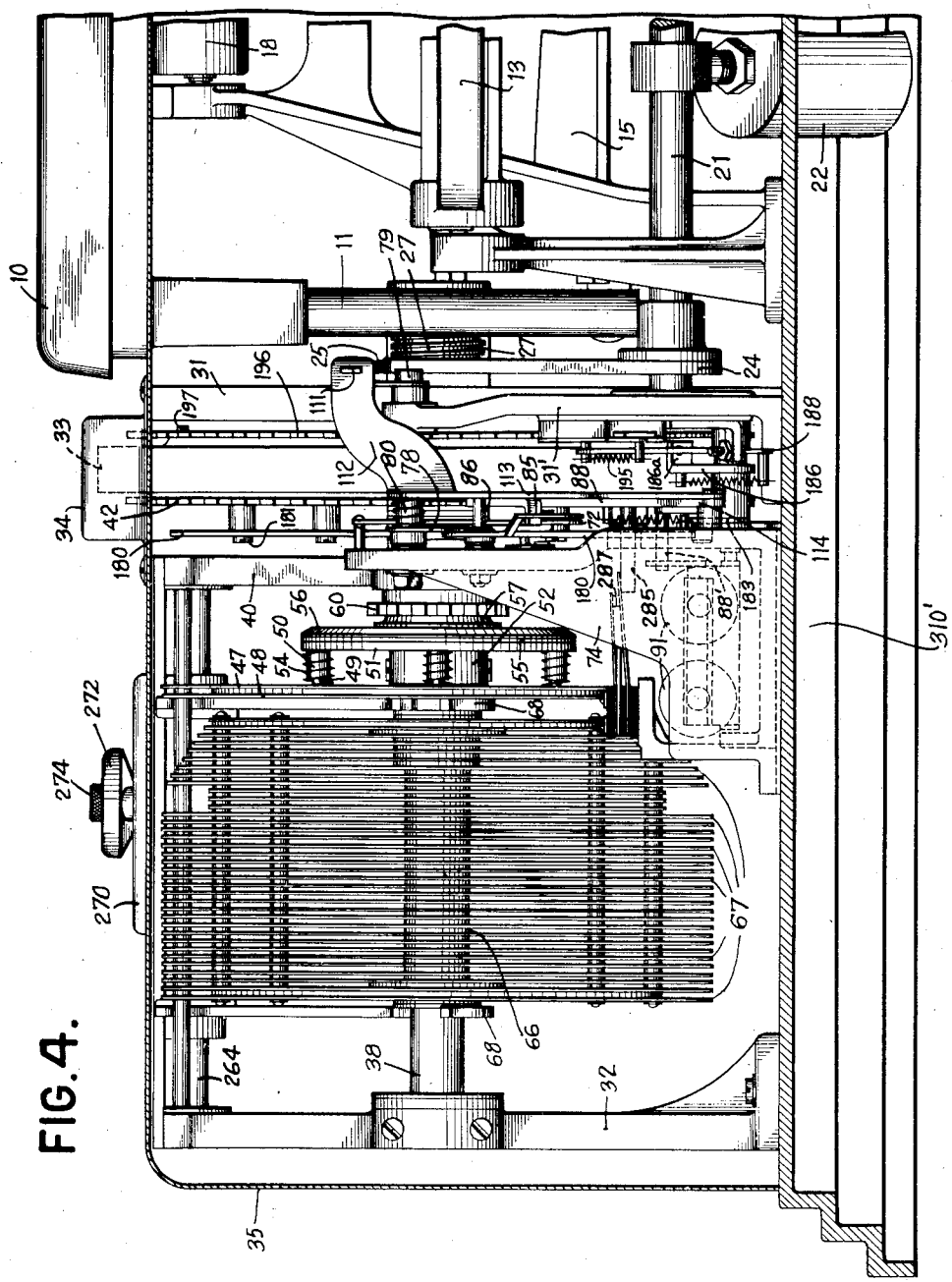
Fig. 4 is a section along line 4—4 of Fig. 1.
Figure 23:
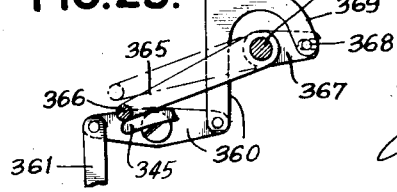
Figure 26:
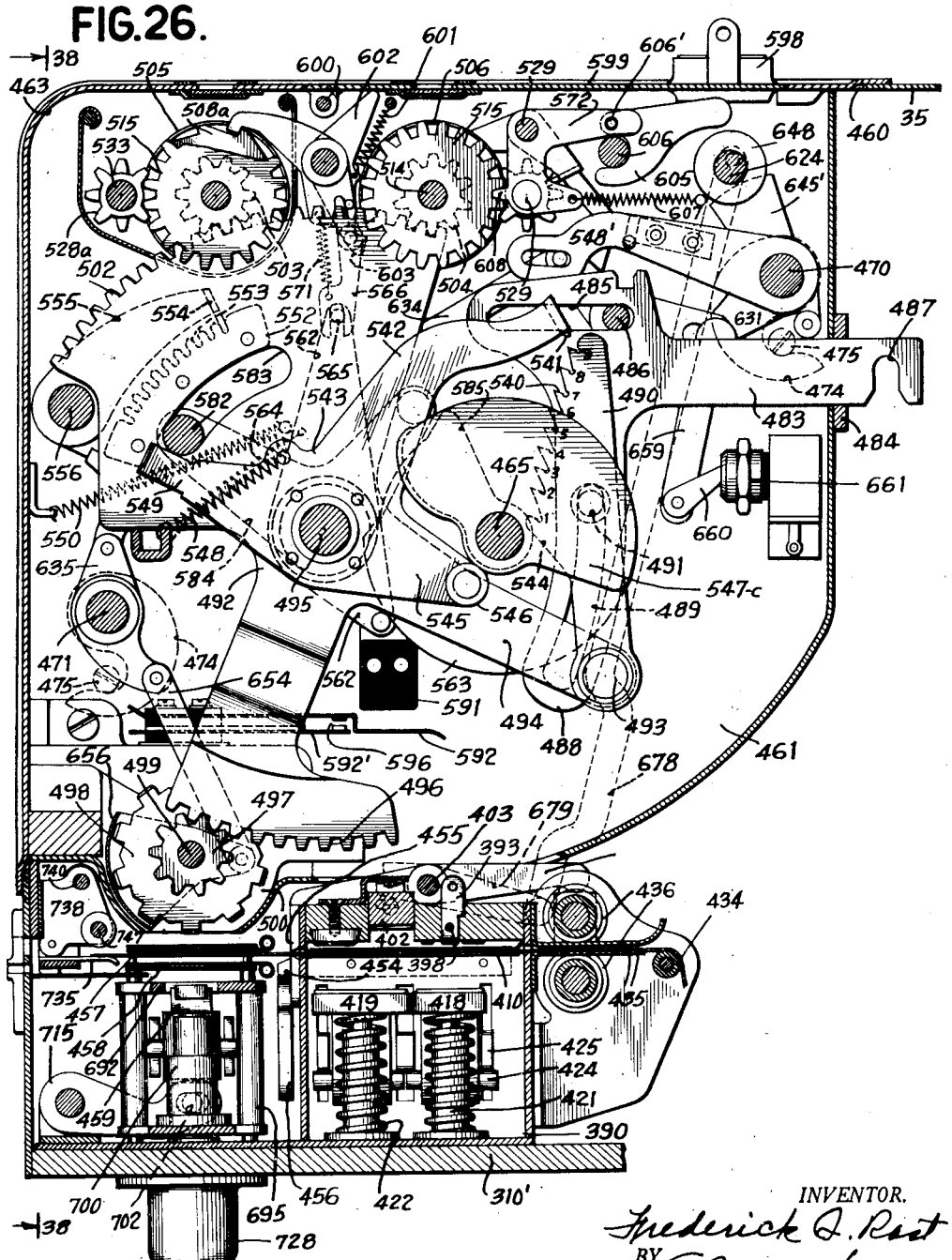
Figure 27:
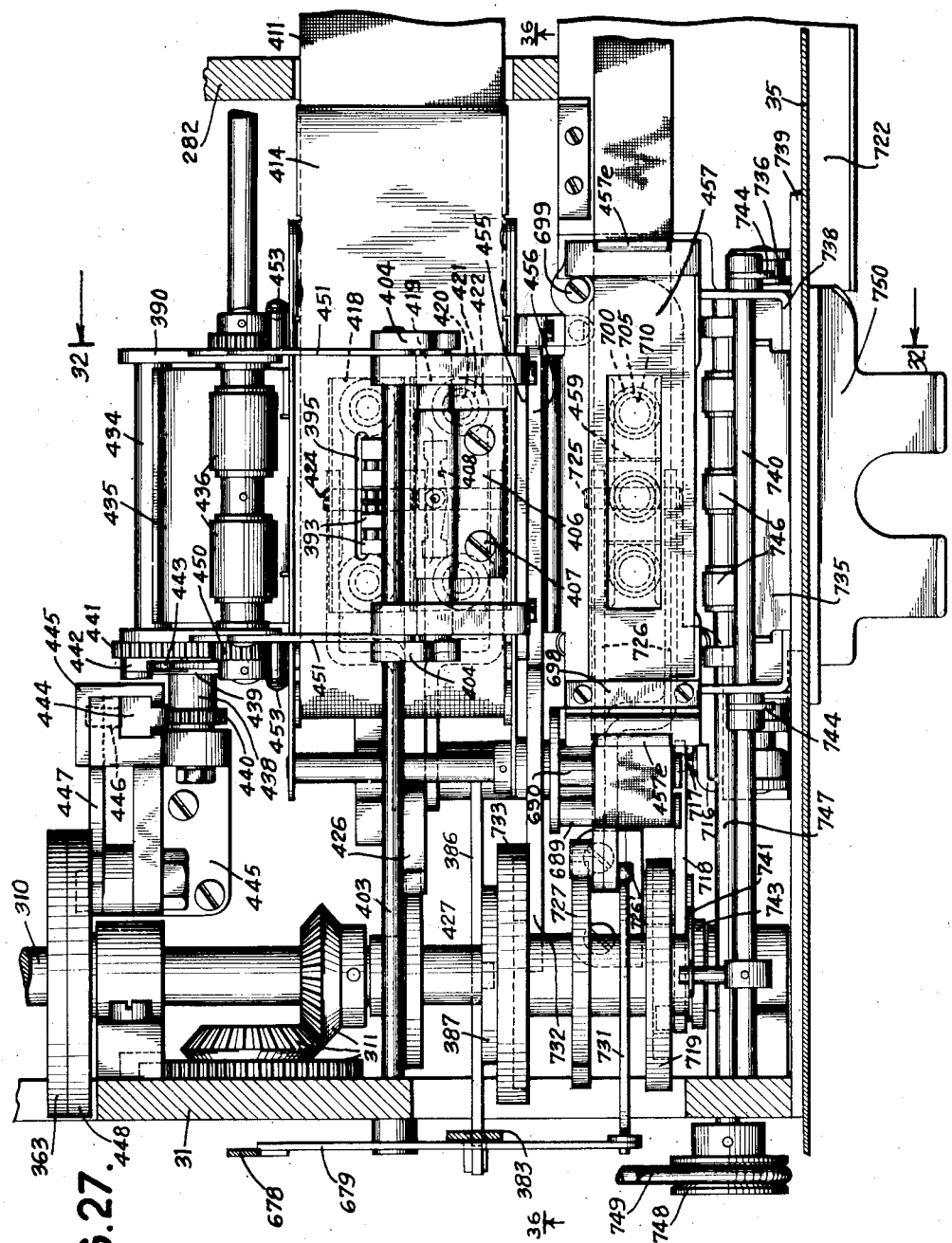
Figure 28:
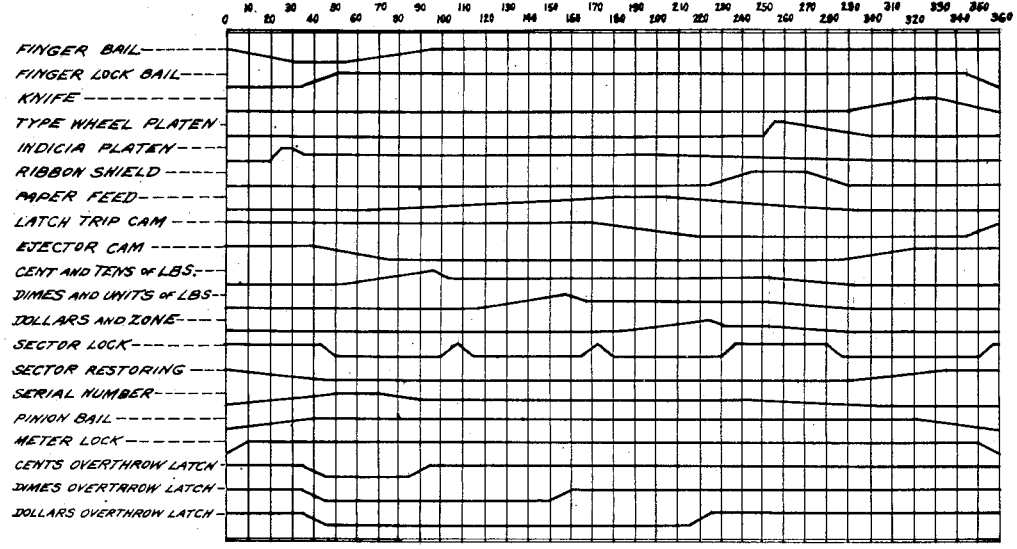
Figure 29:
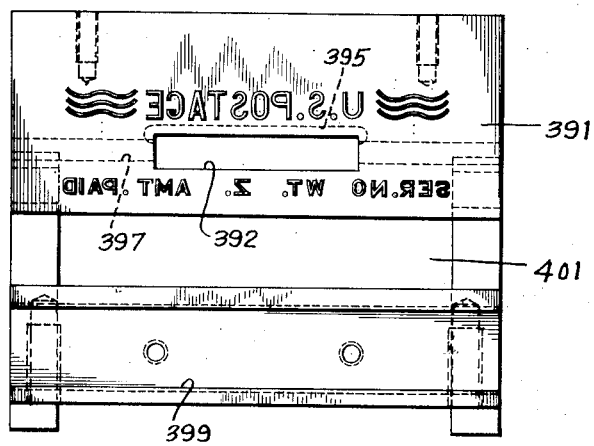
Figure 30:
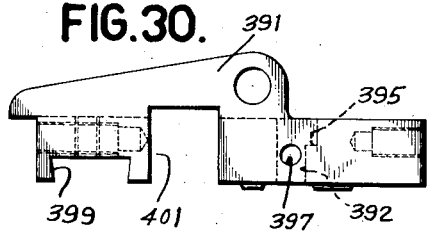
Figure 31:
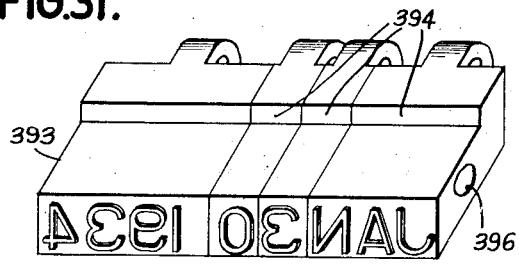
Figure 32:
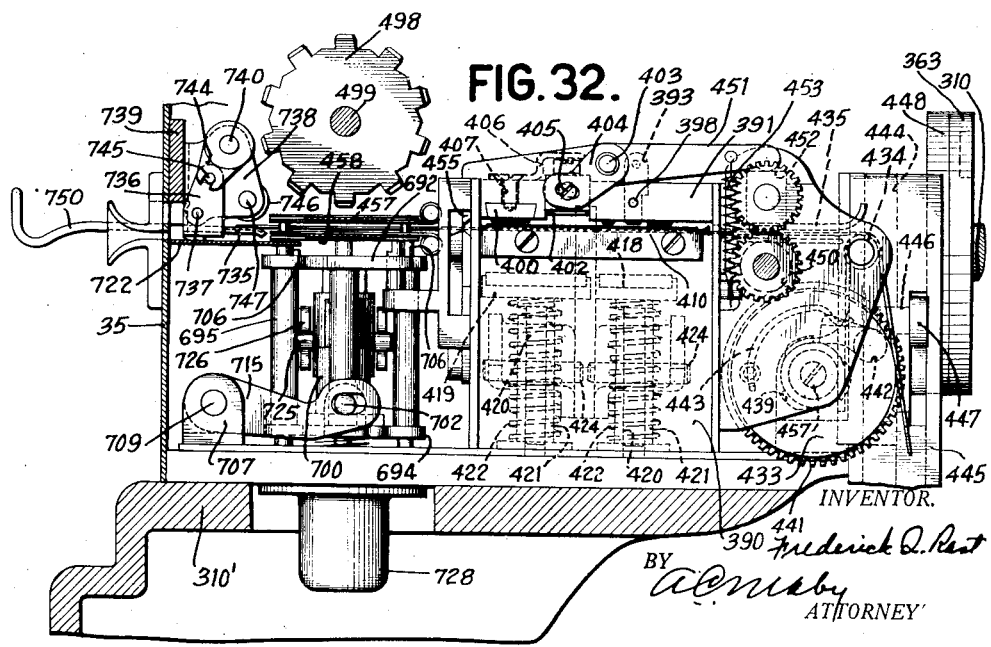
Figure 38:
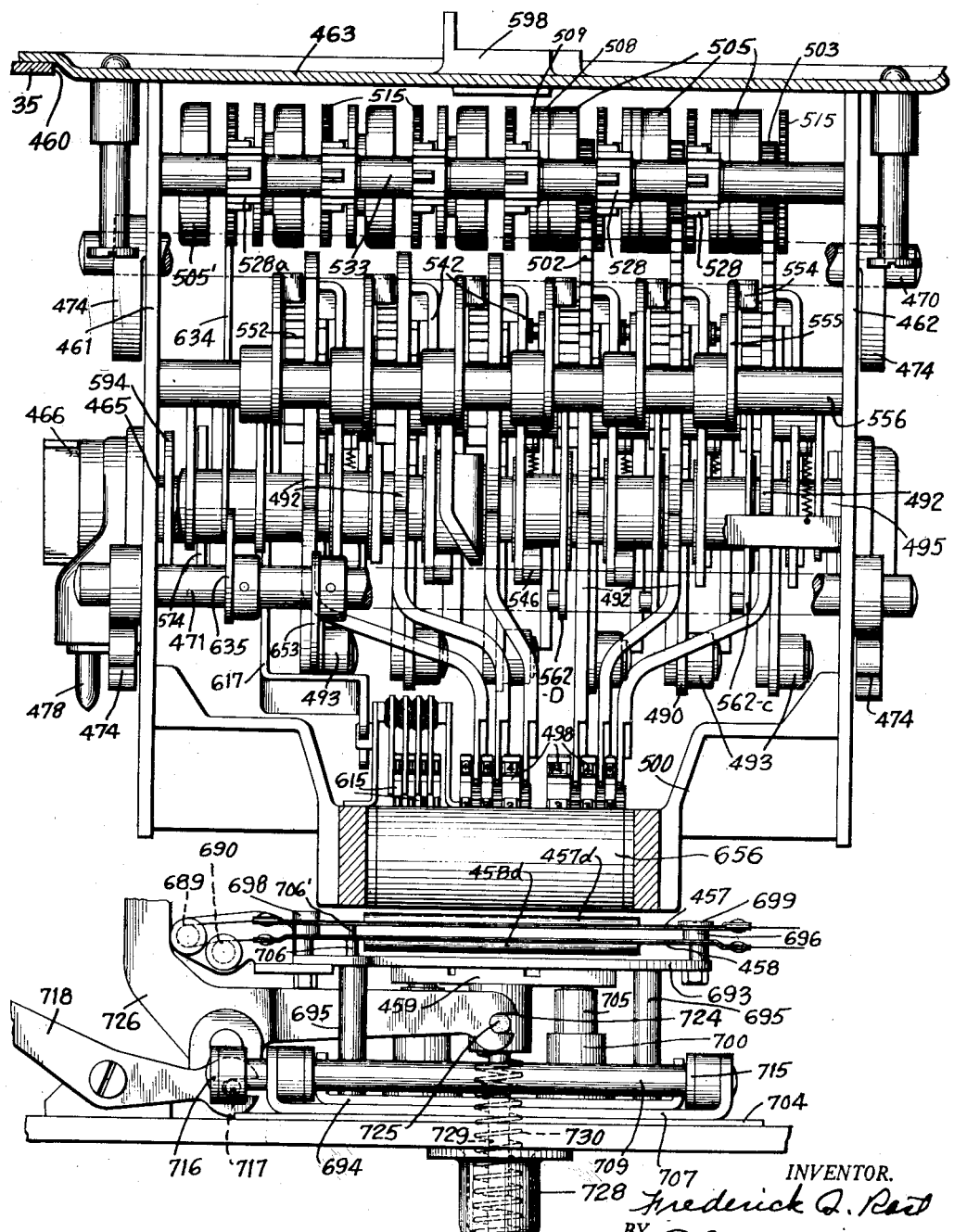

Figs. 18, 19, and 20 show the value selector disks of the eighth zone;

Fig. 21 is a detail of the weight selector disks;

Fig. 22 is a circuit diagram of the machine;

Fig. 23 is a detail view of part of the reading mechanism;

Fig. 24 is a detail view of a cam contact used in the machine;

Fig. 25 is an enlarged detail view of a portion of Fig. 4;

Fig. 26 is an end section through the meter;

Fig. 27 is a plan view of the stamp imprinting mechanism;

Fig. 28 is the timing diagram;

Fig. 29 is a plan detail of the fixed indicia carrier block;

Fig. 30 is a side view of the latter block;

Fig. 31 is a perspective view of the date type blocks;

Fig. 32 is a section along lines 32—32 of Fig. 27;

Fig. 33 is a detail view of the meter and post-office printing block;

Fig. 34 is a detail of the void printing block;

Fig. 35 is a detail plan sectional view of the operating means for the fixed indicia platen;

Fig. 36 is a section along lines 36—36 of Fig. 27;

Fig. 37 is a vertical section through the meter showing the locking means, part of the variable indicia printer, and associated mechanisms;

Fig. 38 is a section on line 38—38 of Fig. 26;

Fig. 39 is a detail of the coupling between the meter cam shaft and an operating shaft of the machine;

Fig. 40 is a section on line 40—40 of Fig. 39;

Fig. 41 is a position view of the register and recorder operating mechanism of the meter;

Fig. 42 is a detail view of the meter cam shaft;

Fig. 43 is a vertical section through the descending register;

Fig. 44 is a section along line 44—44 of Fig. 43;

Fig. 45 is a plan view of the two lowest orders of the descending register;

Figs. 46, 47, and 48 are detail position views of the overthrow preventing means of the registers;

Fig. 49 is an enlarged view of operating means for the registers and recorder of the meter;

Fig. 50 is a detail view of the locking means for the rack sectors of the meter;

Fig. 51 is a detail view of the operating means for the pinion ball;

Fig. 52 is a section on line 52—52 of Fig. 43;

Fig. 53 is a detail view of the serial number printing means;

Fig. 54 is an end view of the meter locking means;

Fig. 55 is a front view of the key shafts of the meter;

Fig. 56 is a position view of part of Fig. 54;

Fig. 57 is a plan detail view of the upper shield of the variable indicia printing means;

Fig. 58 is a plan detail view of the lower shield of the latter printing means;

Fig. 59 is a detail, vertical view of the carrier assembly for the shields;

Fig. 60 is a plan view of the assembly of Fig. 59;

Fig. 61 is a vertical, detail, view of variable indicia platen;

Fig. 62 is a view showing the shields in compressed positions; and

Figure 63:
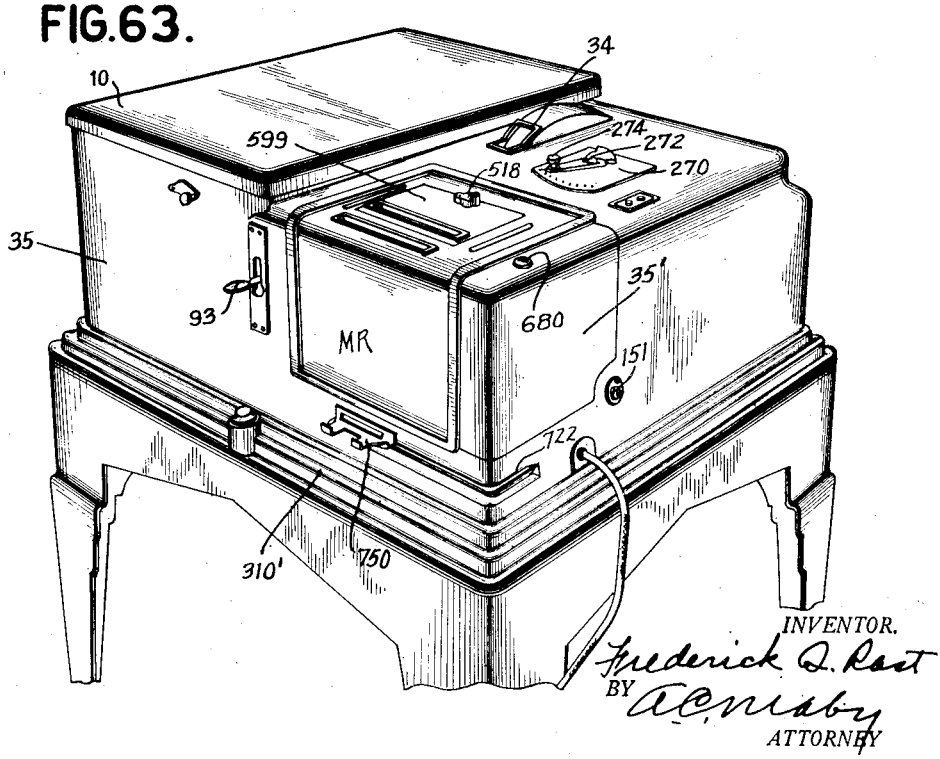

Fig. 63 is a perspective view of the entire machine.

Weighing mechanism

Figure 3:
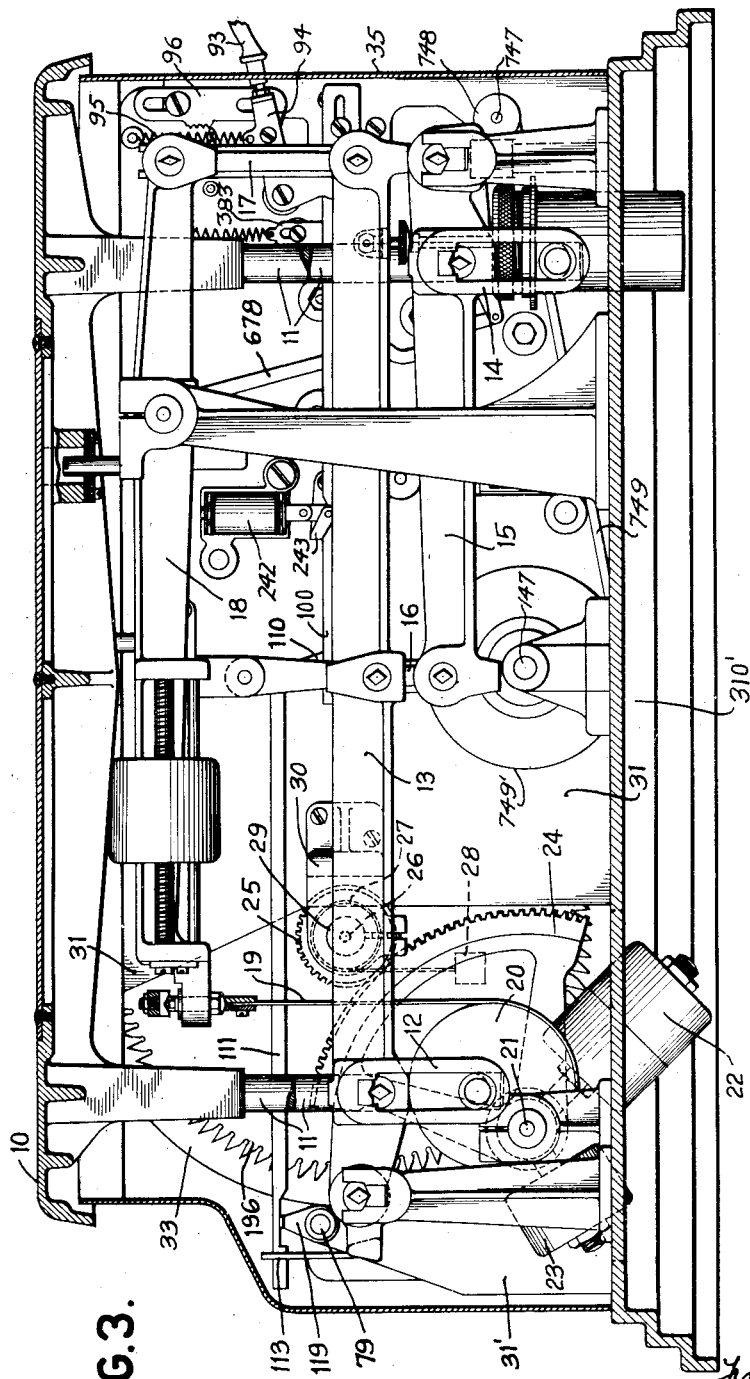
Fig. 3 is a section along line 3—3 of Fig. 1.

Referring to Fig. 3, the weighing mechanism comprises a load platform 10 with four depending corner posts 11, the two at the left hand end being suspended by yokes 12 from long lever 13 and the two at the right hand end being hung by yokes 14 from short lever 15. The levers 13 and 15 are connected by link 16 and the long lever 13 is further connected at its right hand or nose end to a link 17 which acts on the right hand arm of a first order lever 18. The other arm of lever 18 is connected by a depending ribbon 19 to an eccentric hub 20 fixed to shaft 21 which carries pendulum 22 and weighted balancing arm 23. At its left hand end (as viewed in Fig. 4) shaft 21 carries a rack sector 24 meshed with a pinion 25 on a weight indicator shaft 26. The pinion is formed with a spirally grooved hub 27 from which is hung a small weight 28 the purpose of which is to resist rotation of pinion 25 by rack 24 under a load, thereby holding the teeth of the rack and pinion in mesh without play during the weighing operation.

Figure 2:
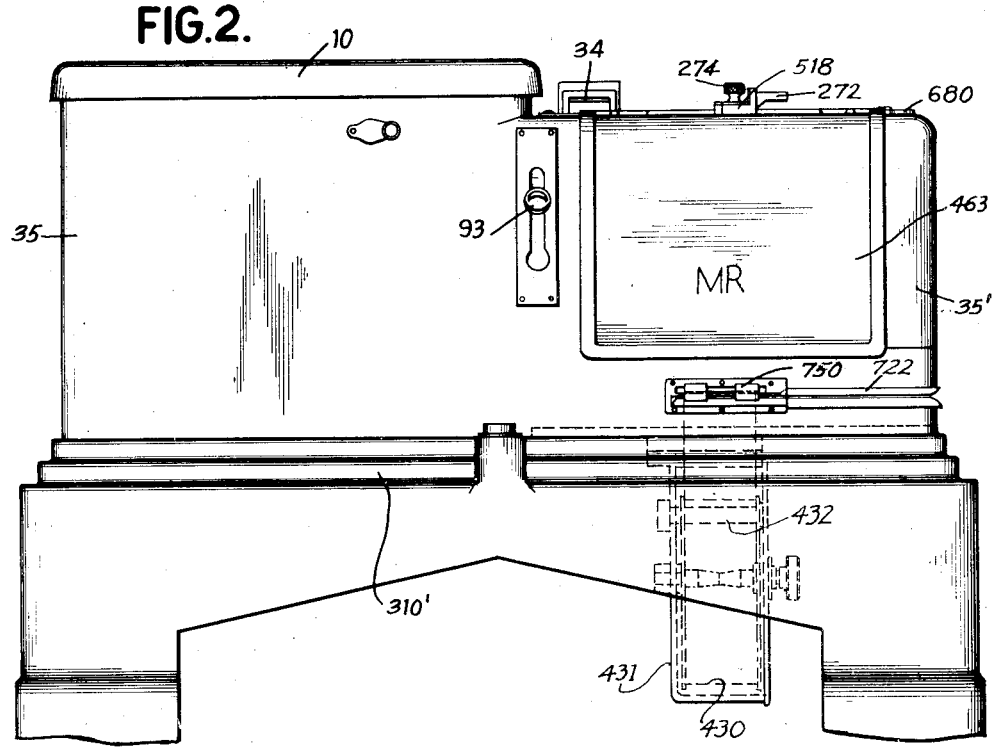
Fig. 2 is a front view of the machine.

Shaft 26 is journaled at its left hand end (as viewed in Fig. 8) in a ball bearing 29 carried by a bracket 30 secured to a vertical frame plate 31 mounted on base 310' and nearest the right hand side of platform 10 as viewed from the front of the machine (see Fig. 2). At its other end, shaft 26 is similarly journaled on standard 32 mounted on base 310'.

At the side of frame plate 31 opposite platform 10, weight shaft 26 carries a cup-shaped indicating chart 33, the rim of which is graduated for 270° of its circumference in ¼ lb. increments and marked with weight-denoting figures at each pound graduation (see Fig. 12). The chart is viewed through a sight window 34 formed at the top of outer casing 35 (see Figs. 1, 2 and 6) and is indexed by hair line 36.

The operation of the weighing mechanism is as follows: A load applied to platform 10 rocks levers 13, 15, and 18 to raise tape 19 and thereby rock pendulum shaft 21 counterclockwise (as viewed in Fig. 3). The pendulum shaft rocks until pendulum 22 balances the load. The angle through which the shaft rocks is proportional to the weight of the load. As shaft 21 moves through this weight-proportional angle, its rack sector 24 actuates pinion 25 to rotate weight shaft 26 through a similar angle, in a clockwise direction, as viewed in Fig. 3, or a counter-clockwise direction, as viewed in Figs. 6, 9, 10, and 11 also through a weight-proportional angle. Chart 33 on shaft 26 will then indicate the weight through sight window 34.

When shaft 26 reaches a position of rest under the load, it is ready to control the movement of auxiliary selector mechanism to a position corresponding to the load.

Selector mechanism

Figure 8:
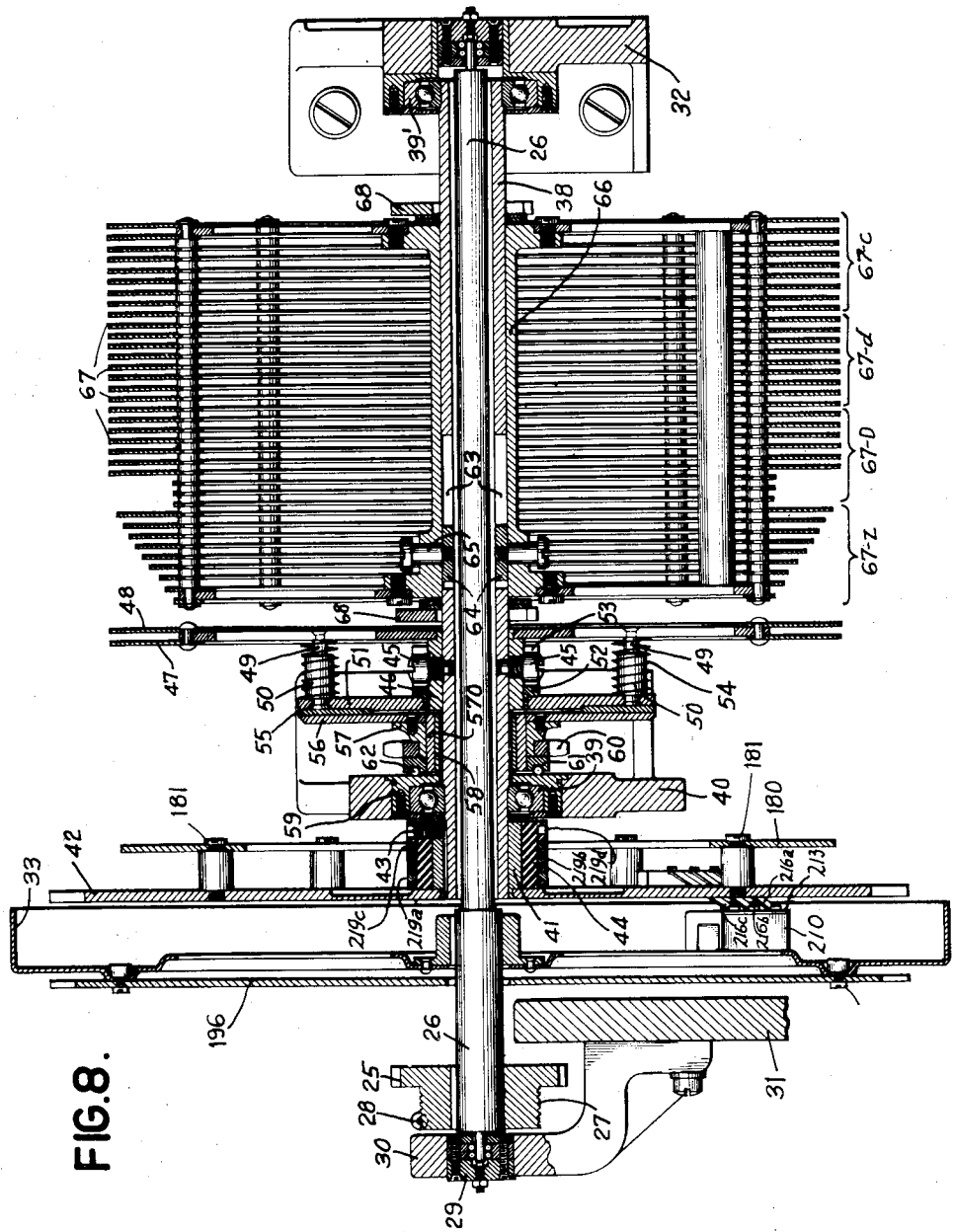
Fig. 8 is a detail plan sectional view of the selector mechanism.

Referring principally to Fig. 8, the selector mechanism is mounted on a sleeve shaft 38 (see Figs. 4, 6, 9, and 14). The sleeve shaft surrounds shaft 26 with clearance, and is journaled at the left hand end in a ball bearing 39 carried by a vertical frame 40 mounted on base 310' and located between end frames 31 and 32. At the right hand end, sleeve shaft 38 is journaled in a ball bearing 39' carried by frame 32. The left hand end of the sleeve shaft extends past frame 40 and has keyed to it a hub 41 which rigidly carries a toothed disk 42. This disk is flush with the end of the sleeve shaft and adjacent weight indicating chart 33.

Mounted on hub 41 and secured to it by screw 43 is a commutator 44. At the right side of frame 40 (Fig. 8) screws 45 secure a collar 46 to shaft 38. To the right end of this collar is fastened the hub of a pair of stepped disks 47 and 48 respectively controlling the making of a weight record in tens and units of pounds denominational orders. Secured to the sides of these disks and extending toward the left (Fig. 8) are horizontal pins 49. Slidably receiving these pins are socket members 50 secured to the side of a clutch disk 51. The hub 52 of this clutch disk is sleeved on collar 46 and has elongated slots 53 receiving the heads of screws 45. The heads of screws 45 and slots 53 coact to restrain rotation of clutch disk 51 relative to shaft 38 but permit slidable, axial, movement of the clutch disk along the shaft. Coil springs 54 surround socket members 50 and lie between stepped disk 47 and clutch disk 51 to constantly urge the clutch disk towards the left. The left face of the clutch disk has a reduced circular shoulder for loosely mounting and centering a non-metallic friction ring 55. Facing clutch disk 51 and friction ring 55 is a driving clutch disk 56 the hub 57 of which is pressed onto a bushing 570 rotatably carried by a collar 58 surrounding shaft 38, with clearance, and extending from one side of the cage 59 of ball bearing 39. Hub 57 also carries a sprocket wheel 60. Also carried by bushing 570 is a disk 61 having an annular channel in the side to receive balls 62 which engage the side of bearing cage 59. Bushing 570 and the parts 56, 60, and disk 61 carried by it, are capable of axial movement along collar shaft 58.

Clutch disk 51 which is urged to the left by springs 54 acts through friction ring 55 to thrust clutch disk 56 and its hub 57 and bushing 570 to the left and balls 62 engage the side of cage 59 to form an anti-friction thrust bearing for limiting the axial movement of the clutch disks under the force of springs 54.

At the right of stepped disk 48, shaft 38 has elongated, axially extending slots 63 in which key blocks 64 ride. These blocks are rigidly secured by screws 65 to a tubular shaft 66. Rigidly mounted on shaft 66 are stepped selector disks 67. Engaging opposite ends of shaft 66 are the sides of the lower, forked ends 68 of arms 69 (see Figs. 4, 9, and 14) which straddle sleeve shaft 38. Arms 69 are rigidly connected and shifted by means to be hereinafter described, along shaft 38 to correspondingly shift stepped disks 67 according to the parcel post zone to which the package on platform 10 is to be mailed.

Briefly summarized, on auxiliary sleeve shaft 38 are mounted for rotation with the shaft a stepped disk 42, a commutator 44, a driven clutch disk 51, weight selector stepped disks 47 and 48, and postage data selector stepped disks 67. Further clutch disk 51 and stepped disks 67 are movable axially but independently of each other along shaft 38. Clutch disk 51 is to be driven by a driving clutch disk 56 rotatably carried by a collar 58 surrounding shaft 38.

The actuation of disk 51 by disk 56 rotates sleeve shaft 38 and the parts carried by it counterclockwise, as viewed in Fig. 6. The angle through which shaft 38 is rotated is controlled by the angular position of shaft 26 under the load. Initially, however, shaft 38 is held stationary by the following means:

Referring to Fig. 6 which shows the initial normal position of the parts on shaft 38, disk 42 on the shaft has a laterally extending pin 71 (see also Figs. 5, 9, 14, and 25) which is engaged at one side by a detent 70 and at the opposite side by a rebound latch 72. Both detent 70 and latch 72 are rotatably mounted, side by side, on a stub shaft 73 carried by the vertical side of a frame 74 standing on base 310'. Rebound latch 72 is connected at its upper end by a spring 75 to a stud 76 carried by frame 74. The spring urges latch 72 to rock clockwise (Fig. 6) into the path of movement of pin 71.

Detent 70 is connected by a link 77 to a plate 78 rigidly carried by a shaft 79 journaled between frame 74 and side frame 31'. Surrounding shaft 79 and connected to the shaft and frame at opposite ends is a torsionally wound coil spring 80 constantly urging shaft 79 clockwise (as viewed in Fig. 6). Through plate 78 and link 77, clockwise movement of shaft 79 actuates detent 70 clockwise until a pin 81 extending transversely from the side of the detent (see Figs. 5, 6, 9, and 25) engages the hook of a stop member 82. This stop member is adjustably secured to the vertical side of frame 74 by screws 83, passing through an elongated slot 84 in the member. Thus, the position of member 82 may be horizontally adjusted to determine the clockwise limit of detent 70. This limit position of the detent also determines the limit of movement of all the parts operated by shaft 79 under the force of spring 80.

Plate 78 which is rigidly dependent from shaft 79 has a pin and slot connection (Figs. 5 and 6) to a lever 85 pivoted on pin 86 extending from frame 74 (see Figs. 4 and 25). The lower, free end of lever 85 is in the form of an upturned hook normally engaging the front of a transverse lug 87 of a latch 88 pivoted to frame 74 by pin 89.

Latch 88 has a pin 88' at its lower end engaged in the slotted, upper end of pivoted armature 90 of a double coil magnet 91. The tooth-shaped nose 92 of latch 88 is in the plane of disk 42. When the latch is in retracted position, latch nose 92 is free of and remote from the teeth of disk 42.

The upturned hook end of lever 85 is in front of lug 87 of latch 88. When shaft 79 is in its clockwise position (Fig. 6), the hook end of lever 85 is engaged with lug 87 of latch 88 to hold the latter in retracted position.

Figure 1:
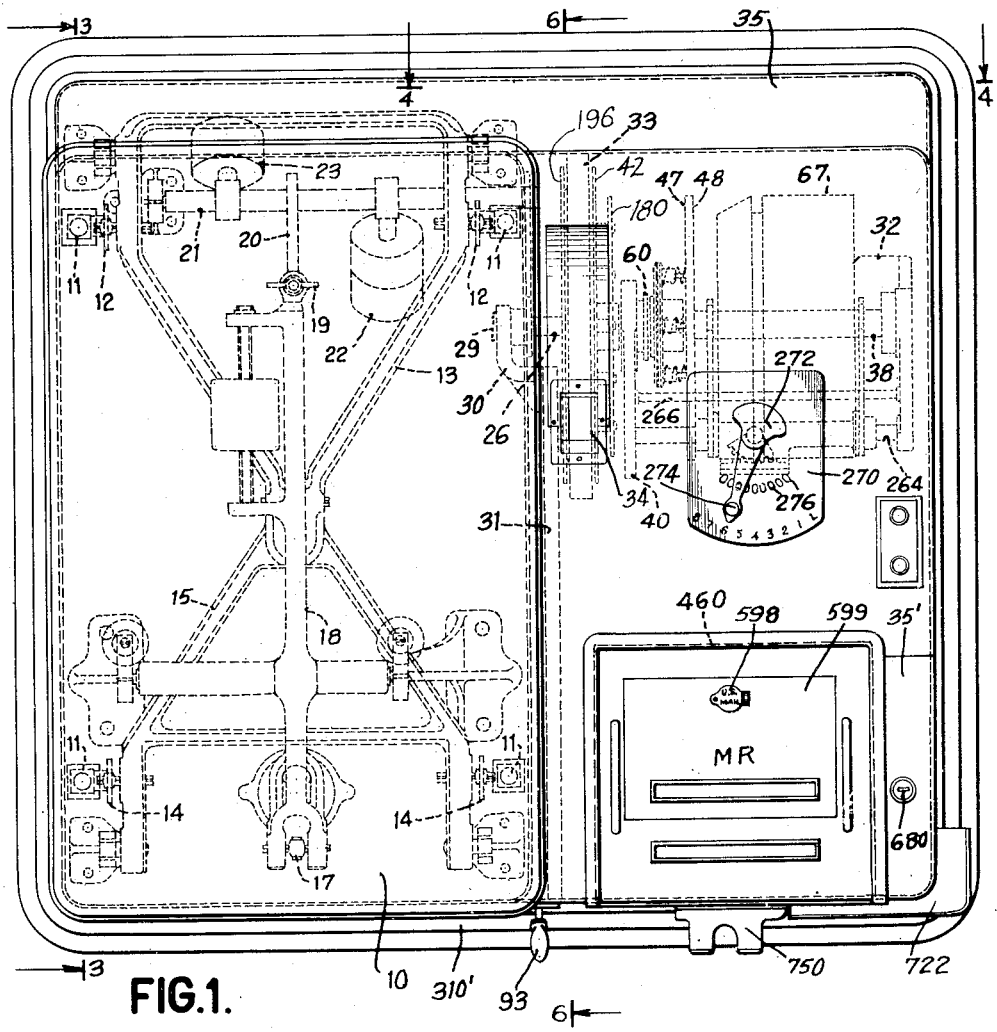
Fig. 1 is a plan view of the machine.

In the initial position of the above parts, shaft 79 is at a normal clockwise limit (as viewed in Fig. 6) holding detent 70 in front of stud 71 of disk 42 and through pivoted hook lever 85 positively holding latch 88 retracted. After weight shaft 26 has come to rest under a load, disk 42 must be released for rotation to follow shaft 26 in a counterclockwise direction (Fig. 6) to its load position. In order to release disk 42, detent 70 must be withdrawn counterclockwise (Fig. 6) out of the way of stud 71 of disk 42. The withdrawal of detent 70 is effected as follows:

After the scale has come to rest under a load, the operator depresses a handle 93 which is at the outside of the front of the machine (see Figs. 1, 2, and 6). This handle projects into the casing 35 and is rigid with the horizontal arm of a bell crank lever 94 pivoted to frame plate 31 and located at the same side of the frame plate as the weighing mechanism. When handle 93 is depressed, it rocks lever 94 counterclockwise (as viewed in Fig. 6) against resistance of a spring 95. The horizontal arm of the lever is pivotally connected to a vertical slide 96 the right hand edge of which has teeth 97 coacting with a full-stroke pawl 98 held in a central position by a spring 99.

The pawl 98 coacts with teeth 97 to prevent return of slide 96 and thereby lever 94 unless the latter have been moved through a complete stroke. Thus, handle 93 must be manually depressed for a complete stroke and automatically returned by spring 95 for a full stroke. The vertical arm of lever 94 is pivotally connected to a horizontal operating bar 100, which has horizontal slots 102 coacting with studs 103 carried by frame 31 to mount bar 100 for slidable horizontal movement on frame 31. When handle 93 is depressed, lever 94 rocks counterclockwise and moves bar 100 forward, or to the right, as viewed in Fig. 6. The lower end of bar 100 is formed with a notch 104 for receiving the tooth end 105 of a latch 106 (see Figs. 6 and 7) pivoted to frame 31. At the end of the forward stroke of bar 100, notch 104 overlies tooth 105 and a spring 107 connected to the latch rocks the latch counterclockwise and snaps the tooth into the notch. The tooth now holds bar 100, at the limit of its forward stroke, against return movement.

The forward end of bar 100 has a stud 108 seated in the forked, lower end of a lever 110. The upper end of lever 110 is pivoted to the rear end of a horizontal bar 111. At its forward end bar 111 slidably passes through a slot in the transversely extending arm 112 of a vertical rod 113 (see Figs. 4, 5, and 6). The rod is pivoted at its lower end to the horizontal arm of a bell crank lever 114 and intermediately has a vertical slot 115 through which pivot pin 82 of hook lever 81 passes. Rod 113 is thus vertically slidable along pivot pin 82. A spring 116 connected at its upper end to rod 113 normally holds the latter in lower position. Rod 113 in its lower position maintains the forward end of bar 111 depressed with the bottom of a recess 117 in the bar sitting on top of the transversely bent-over end 118 of an upwardly extending arm 119 secured to shaft 79.

In the normal position of shaft 79, under the influence of spring 80 and as limited by engagement of pin 81 of detent 70 with stop 82, lug 82 of arm 19 is in front of and spaced from an abrupt shoulder 120 formed at the right hand end of recess 117 of bar 111. Now as operating bar 100 is moved to the right, through coaction of pin 108 with lever 110, bar 111 is moved to the left and in this movement, shoulder 120 of bar 111 engages lug 118 and rocks arm 119 and its shaft 79 counterclockwise (Fig. 6) against resistance of spring 80. Since bar 100 is retained by latch 106 in advanced position, bar 111 also remains in actuated position to maintain shaft 79 at its counterclockwise limit.

Figure 5:
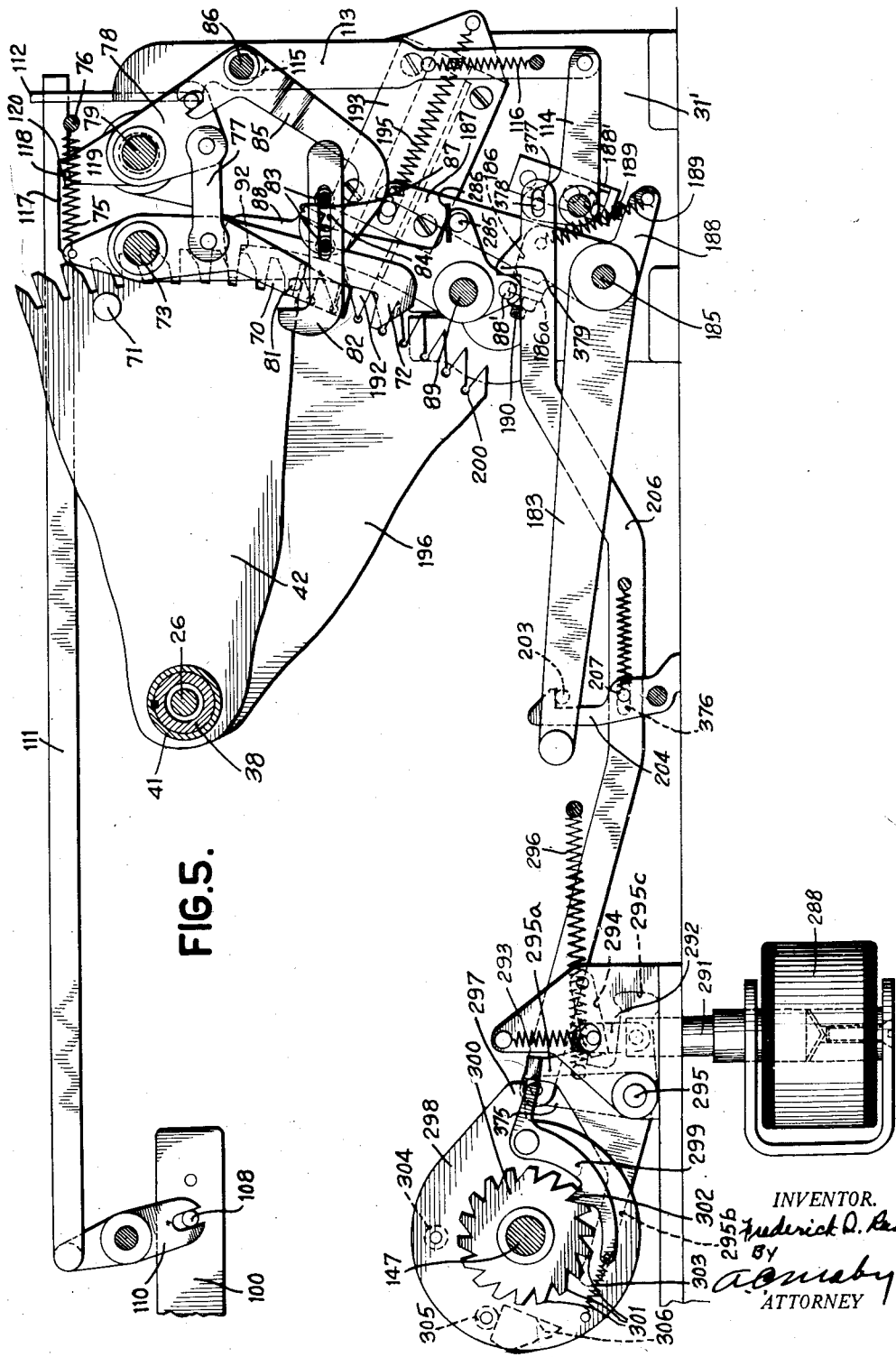
Fig. 5 is a detail side view of a portion of the load translating mechanism.

The latter position is shown in Fig. 5. In such position, plate 78 has swung to the right and through link 77 moved detent 70 to the right out of the way of stud 71 of disk 42. Further, hook lever 85 has been rocked clockwise to place its upturned hook end at a distance from lug 87 of latch 88. The latter is now free to move towards disk 42 but is still held in retracted position by gravity.

With detent 70 out of the way of stud 71, disk 42 and its shaft 38 may now be rotated counterclockwise to reach a position corresponding to the load-actuated position of shaft 26. As previously stated, rotation of shaft 38 is effected by the friction coupling between a driven friction disk 51 on shaft 38 and a driving friction disk 56. The latter is fast on hub 57 which also rigidly carries sprocket wheel 60. This wheel is connected by a driving chain 121 to a sprocket wheel 122 (Figs. 9, 13, and 13a) of substantially the same diameter as wheel 60. The hub 123 of wheel 122 is journaled for rotation (and held against axial movement) on a sleeve bearing 124 carried by the left end frame post 125 of a frame 126 mounted on base 310'.

Extending from the side of hub 123 of wheel 122 is an eccentrically located pin 127 passing through the forked end of a crank arm 128 secured to the left end of a shaft 129. Rotation of shaft 129 is transmitted through crank arm 128 and pin 127 to sprocket wheel 122. At the same time, the driving connection 127—128 between shaft 129 and wheel 122 permits the shaft to be shifted axially with respect to the wheel without breaking the driving connection. The advantage of the above driving connection is that shaft 129 does not carry the weight of the wheel and can be shifted with less inertia and momentum effects.

Shaft 129 passes freely through sleeve bearing 124; it is lower than and parallel to shaft 38 and is journaled at opposite ends in end standards 125 and 130 of frame 126. Between standards 125 and 130 are intermediate vertical posts 131 and 132 in which are fixed bushings 133 and 134, through which shaft 129 freely passes. Rotatably carried on bushings 131 and 132 are gear wheels 135 and 136 and clutch disks 137 and 138, respectively. Between the clutch disks is a central clutch member 139 pinned to shaft 129. The right hand face of clutch member 139 (as viewed in Fig. 13) has ratchet teeth 140 for coacting with ratchet teeth 141 of clutch disk 138. The left hand face of member 139 has a series of arcuately arranged projecting pins 142 (Fig. 13b) adapted to enter similarly shaped and spaced notches 143 (Fig. 13c) in the face of clutch disk 137. Between the opposite faces of clutch member 139 and the opposing faces of clutch disks 137 and 138 are disposed, about shaft 127, light spring washers 144 which normally maintain member 139 centrally between disks 137 and 138 with the opposing clutch faces out of contact.

Gears 135 and 136 are respectively meshed with gears 145 and 146 both fast on a shaft 147 journaled in frame 126 and extending below and parallel to shaft 129. At its left end, shaft 147 is connected by bevel gearing 148 to vertical shaft 149 driven by reduction gearing (not shown) in gear box 150 secured to motor M. The motor and gear box are below base 310' and carried by the bottom of the base.

Motor M is set in operation by closing of main switch 151 (Fig. 63) preferably at the beginning of a series of weighing and registering operations so that it is not necessary to start and stop the motor each time a package is to be weighed and a stamp issued. Referring to the circuit diagram, Fig. 22, closing of switch 151 which is of double blade construction, forms the motor circuit as follows:

*Motor circuit.*—From one side 152 of a 110 A. C. volt supply, through one blade of switch 151, normally closed relay contacts 153a, motor M, normally closed relay contacts 153b, and through the other blade of switch 151, to the other side 154 of the supply.

Motor M, being normally, continuously, running, shaft 147 geared thereto is also constantly rotating. Through gearing 135—145, shaft 147 is constantly rotating clutch disk 137 and through gearing 136—146, shaft 147 is constantly rotating clutch disk 138. The ratio of gearing 135—145 is different than the ratio of gearing 136—146.

In the present case, gearing 135—145 drives clutch disk 137 at 20 R. P. M. while gearing 136—146 drives clutch disk 138 at 60 R. P. M.

Normally, central clutch member 139 is held by spring washers 144 at a distance from clutch disks 137 and 138 and is not driven by either. But if member 139 is moved axially towards the right (Fig. 13), its teeth 140 will engage teeth 141 of disk 138 to be driven at 60 R. P. M. If moved to the left, pins 142 of member 139 will enter notches 143 of clutch disk 137 to cause the latter to drive member 139 at 20 R. P. M. Rotation of member 139 at the selected rate is imparted to its shaft 129 which through driving connection 127—128 rotates sprocket wheel 122. Through chain 121, wheel 122 drives sprocket wheel 60 and friction disk 56. The latter frictionally rotates disk 51 and its shaft 38. Thus, rotation of shaft 129 at either 20 or 60 R. P. M. is communicated to auxiliary shaft 38 at substantially the same rate, when disk 42 is released for rotation as above described.

Initially, while shaft 147 is constantly running to constantly rotate clutch disks 137 and 138, shaft 129 is stationary because its clutch member 139 is held by spring washers 144 separated from both disks 137 and 138. However, should shaft 129 be accidentally or unintentionally rotated, its rotation will not be transmitted to shaft 38 as the latter is initially locked by engagement of pin 71 of disk 42 with detent 70 and the friction coupling 56—51 permits shaft 38 to remain at rest although disk 56 is in rotation.

When detent 70 is moved away from pin 71 of disk 42, shaft 38 is free to be rotated by clutch disk 56. To set disk 56 in rotation, its driving shaft 129 must be shifted axially in one direction or the other to move its clutch member 139 into cooperation with either clutch disks 137 or 138.

Shaft 129 is shifted axially by a pair of solenoids 156 and 157 (Fig. 13) carried by brackets 158 secured to end posts 125 and 130. Solenoid 156 surrounds the left hand portion of shaft 129 and has a hollow core 159 pinned to the latter portion of shaft 129. Solenoid 157 surrounds the right hand portion of shaft 129 and its core 160 is pinned to the latter portion of the shaft. Initially, both solenoids are deenergized and shaft 129 is in central position with its clutch member 139 free of the clutch disks 137 and 138. After the weighing operation, handle 93 (Fig. 6) is depressed to move operating bar 100 forward, as previously explained. This forward movement of bar 100 causes energization of solenoid 157 to produce initial rotation of shaft 38 at 60 R. P. M. The manner in which this is done will now be explained. Referring to Figs. 6 and 7, bar 100 has intermediate its ends a pair of pins 161 and 162 at opposite sides of the rigidly connected handles 163 of toggle switches 164 and 165 arranged side by side and mounted on frame plate 31. When bar 100 is moved forward, and before bar 111 becomes effective to cause detent 70 to release disk 42 for rotation, pin 161 on bar 100 operates handles 163 to close switches 164 and 165.

Switch 164 is in the 110 volt line and, referring to Fig. 22, when closed, forms the following circuit through high speed solenoid 157:

*Circuit A*.—From +110 volt terminal 166, through line 167, switch 164, terminal 168 of bus bar 169, terminal 170 of the bus bar, line 171, normally closed relay contacts 172a, line 173, solenoid 157, line 174, and line 175 to −110 volt terminal 176.

The above circuit energizes solenoid 157 which attracts its core 160 to move shaft 129 to the right (Fig. 13). The shaft being extremely light responds instantly and couples clutch member 139 to clutch disk 138 to set shaft 129 in rotation at 60 R. P. M. The forward movement of operating bar 100 causes supplementary bar 111 to release shaft 38 for rotation by removing detent 70 from the path of pin 71 of disk 42, as previously explained. The release of shaft 38 follows energization of solenoid 157. Energization of the solenoid has set shaft 129 rotating at 60 R. P. M. and since shaft 38 is now free to rotate through the friction drive between shafts 129 and 38 the latter is now set in rotation at 60 R. P. M. Rotation of shaft 38 is counter-clockwise as viewed in Figs. 5, 6, and 9.

As already brought out in the objects of the invention and in the brief, general outline of the machine, the purpose of the machine is to weigh packages for shipment by parcel post and to issue a stamp to be affixed to the package. The denomination of the stamp varies with the parcel post zone to which the package is to be mailed and with the weight of the package. The maximum weight of package mailable at present by parcel post is 70 lbs. Accordingly, the weighing mechanism of the machine has been limited to a total capacity or weighing range of 70 lbs. Further, the cost of the postage is figured by the postoffice on an even pound basis and a fraction of a pound is given the same effect as a whole pound in calculating the postage. Thus a package weighing X pounds Y ounces takes the same value stamp as a package weighing X+1 pounds.

The stamp issuing means is controlled in a manner to be later explained by stepped disks 47, 48, and 67 on shaft 38 which are in turn set according to and under control of the weight shaft 26 by means to be shortly described. Accordingly, since the weight factor of the stamp value must be an even poundage, weight shaft 26 which primarily controls the entry of the weight factor into the stamp value must be set at an even pound position. Thus, if a package weighs exactly to the even pound, then the setting of the shaft 26 by the weight of the package will not be altered. Should the package weigh a fraction of a pound above an even poundage, then the setting of shaft 26 by the package will be supplemented by a secondary setting which will advance shaft 26 a distance equivalent to a fraction of a pound to position the shaft at an even pound position. For instance, if the parcel weighs 14 pounds 3 ounces, it will set the weighing mechanism and shaft 26 accordingly. Subsequent to this primary load setting, shaft 26 will be advanced, by a secondary setting and locking means, a distance equivalent to 13 ounces to an even 15 pound position.

Referring to Figs. 4, 5, 6, 10, 11a, and 25, the secondary setting and the locking means for shaft 26 comprises a disk 180 fastened to the left side of toothed disk 42 by threaded elements 181 (Fig. 4). Disk 180 is circular for the greater part of its periphery and has a single cam recess 182. In the initial, normal position of shaft 38, the free end of arm 183 of a bell crank lever 184 is seated at the bottom of the recess. The bell crank lever is journaled on a short shaft 185 carried between the adjacent vertical sides of frames 31' and 74 and has a vertical arm 186.

Also journaled on shaft 185, at the side of arm 186 is a lever 187, the tail 188 of which is connected by a spring 189 to arm 186 (Fig. 10). Spring 189 normally holds lever 187 with its left hand edge (Fig. 10) in contact with the end of a screw 190 threaded into the transversely bent end 191 of arm 186. Adjustment of screw 190 serves to vary the initial position of lever 187. The upper end of lever 187 abuts a pin 191 projecting from the side of a knife edge latch 192. The latch is slidably mounted in a hollow bracket 193 secured to frame 31' and the outer side of the bracket has a slot 194 through which pin 191 projects outside to be engaged by lever 187. A spring 195, connected at one end to the bracket 193 and at the other end to pin 191, normally holds the pin against lever 187. Spring 195 also serves, through its action on pin 191 to bias lever 187 clockwise (as viewed in Fig. 10) and the lever 187 through spring 189 urges lever 184 clockwise to urge the free end of arm 183 into contact with the wall of cam recess 182 of disk 180. Spring 189 is stronger than spring 195 so that when lever 184 is rocked counterclockwise, spring 189 causes lever 187 to move similarly and stretch spring 195 while moving knife edge 192 forward.

The knife edge is in the same plane as a ratchet-notched disk 196. This disk is fixed to the outside of the base of cup-shaped indicating chart 33 on weight shaft 26 by means of screws 197 passing through arcuate slots 198 in the chart base (Fig. 11). By loosening the screws, the disk may be adjusted circumferentially with relation to the chart. As stated previously, the chart has pound graduations and corresponding indicating figures on its rim which are indexed by sight line 36 extending across sight window 34 of casing 35.

Disk 196 has sharply pointed teeth 199 spaced apart angular distances corresponding to the angular spacing of the pound graduations of chart 33. The teeth are radially directed at one side and extend angularly to a radial direction at the opposite side to form triangular-shaped tooth notches 200. Since the teeth are pound distances apart, each notch covers the equivalent of a pound increment of load on the scale. Knife edge 192 is adapted to move into a notch 200 to set and lock disk 196 in an even pound position. The knife edge is of the same shape and size at its front end as a notch 200 and must fully enter the notch at the completion of the disk locking and positioning operation. Accordingly, each notch must lie squarely in front of knife edge 192 when an even pound graduation of the chart is in register with sight line 36. For this reason, the previously described circumferentially adjustable mounting of disk 196 on chart 33 is provided.

Knife edge 192 as positioned in bracket 193 (Fig. 10) has one side extending radially of disk 196 and its slidable mounting in the bracket is such that the radially directed side moves radially of the disk. The point of the knife edge must be sharp in order to accurately pass the point of a tooth 199. In order to prevent blunting of the knife edge when it fully enters a notch 200, the bottom of the latter is relieved by a recess 201 so that when the knife edge is moved into a notch, the point of the knife edge does not strike the bottom of the notch.

When the scale comes to rest under a load, if the latter is an even poundage, then a notch 200 will lie squarely in front of knife edge 192 with the radial side of the notch in line with the radial side of the knife edge, as indicated in Fig. 10.

If the load is above an even poundage, then a notch 200 will not lie squarely in front of the knife edge. However, as the knife edge is moved forward towards disk 196, it will engage the inclined side of the notch and cam it in a weighing direction (counterclockwise, as viewed in Figs. 10, 11 and 11a) until the knife edge is fully within the notch. Disk 196 will then occupy an even pound position above the position to which it has been moved by the load. Thus, assume the load to be exactly 9 pounds; notch 200—9 corresponding to this load will be directly in front of the knife edge. Now assume the load to be diminished by a fraction of a pound. Notch 200—9 will now be behind the knife edge. As the knife edge is moved towards disk 196, it enters notch 200—9 and cams against the inclined side of this notch to advance the disk until the knife edge is fully inside the notch. When this has been accomplished, disk 196 is set at an even 9 pound position and chart 33 will indicate 9 pounds at sight line 36.

Knife edge 192 is moved into a notch 200 under control of cam recess 182 of disk 180 fast to disk 42 which is carried by auxiliary shaft 38. After the scale comes to rest under a load, handle 93 is depressed, resulting in release of disk 42 and its shaft 38 for rotation in a counterclockwise direction (Fig. 10) by the friction coupling 51—56 (Fig. 8) as previously explained. During the first part of the rotation of shaft 38, the left side of cam depression 182 of disk 180 moves arm 183 down, rocking bell crank lever 184 counterclockwise (Fig. 10). The lever through spring connection 189 moves lever 187 similarly to force knife edge 192 towards disk 196 and into a notch 200 to set and lock disk 196 in an even pound position.

The resilient connection 189 between bell crank 184 and lever 187 relieves and absorbs the shock of engagement between the knife edge and the disk 196. When the knife edge is fully seated in a notch 200, spring 189 stretches, permitting bell crank 184 to move without requiring movement of the knife edge. To prevent undue spring pressure being exerted on the knife edge as spring 189 stretches at the end of the stroke of the bell crank 204, an adjustable screw stop 188' is provided on the frame to engage the tail 188 of lever 187 and positively stop movement of the lever under the pull of spring 189. The screw stop 188' is adjusted to permit the knife edge to fully enter a notch and after this has been done, then the further pressure of spring 189 is exerted through lever 187 on stop 188' instead of acting solely against the knife edge and disk 196.

Arm 183 is fully depressed when it rides on bump 202 of cam disk 180. When fully depressed a pin 203 on arm 183 (Figs. 5, 6, 9, and 10) catches under the hook of a latch 204 which thereupon retains the arm in lowermost position with its free end spaced from the periphery of disk 180 following bump 202. When latch 204 is subsequently released from arm 183, as will be hereinafter explained, the free end of the latter may ride on the circular portion of disk 180 following the bump 202 before it moves into the cam recess 182. However, while the arm 183 is riding on this circular periphery, it is not depressed sufficiently to move under the hook of latch 204 and will therefore not be latched down by the latter so that when cam recess 182 reaches arm 183, the latter may freely move into this recess.

The purpose of latching arm 183 when it is actuated to cause movement of knife edge 192 into a notch 200 will be later explained.

Disk 196 is now set in an even pound position and accordingly chart 33 is similarly set and is now ready to control the positioning of shaft 38 in a corresponding even pound position. For this purpose, the following intercontrol between shafts 26 and 38 is provided: Carried by the inner side of the base of the chart is a block 210 of insulating material (see Figs. 8 and 11). The block is secured to the chart base by screws 211 threaded into the block and passing through arcuate slots 212 in the chart base which permit adjustment of the block circumferentially relative to the chart. Fixed into block 210 is a contact plate 213, the face of which projects slightly above the face of the block.

The contact block may be considered, as indicated in Fig. 22 by dot and dash lines, as divided into three circumferentially extending portions 213a, b, and c, lying side-by-side.

Secured to the back of disk 42 which is fast to shaft 38 is a block 215 of insulating material (Figs. 8 and 11) carrying three separate leaf spring brushes 216a, b, and c. The brushes are bent to pass through a hole 217 in disk 42 so that their free ends project in front of the disk. These free ends are curled to form smooth wiper portions. The wiper portions of brushes 216a, b, and c are respectively in circumferential alinement with and adapted to engage and wipe along contact portions 213a, b, and c.

Initially, as shown in Fig. 11 with no load on the scale and disk 42 in home position, the brush ends are at an appreciable angular distance from contact 213. The position of disk 42 which may be termed its zero position, corresponding to no load position of the scale is in advance of the home position of the disk. If chart 33 were locked in zero position and disk 42 moved counterclockwise (as viewed in Fig. 11) the disk would reach its zero position when brush 216c engaged the middle of contact portion 213c. To accurately locate this zero position, contact portion 213c is circumferentially adjustable. The adjustment is made by loosening screws 211 which secure block 210 to chart 33 and then shifting the block circumferentially with the screws moving along slots 212 of the chart until the contact portion 213c carried by the block is in desired, predetermined position, at the correct initial distance from brush 216c.

Brushes 216a, b, and c, are respectively connected by wires 218 to contact rings 219a, b, and c of commutator 44, insulated from each other by disks 220, and respectively wiped by commutator brushes 221a, b, and c. There is also a short contact plug 219d on the commutator which is wired to contact ring 219a and which is engaged by a brush 221d when shaft 38 is in home position. Brushes 221a and c are carried by a lower block 222 secured to the side of vertical frame 40 while brushes 221b and d are carried by an upper block 222' also carried by the side of frame 40.

When shaft 38 is in home position, plug 219d of commutator 44 engages brush 221d. As explained in connection with circuit A, bar 100 before it causes release of detent 70 from disk 42 closes toggle switches 164 and 165. Thus, shaft 38 is still in home position and closing of switch 165 forms the following circuit (see Fig. 22):

Circuit B.—From +24 volt terminal 223, through line 224, switch 165, line 225, +24 volt bus bar 226, terminal 227, line 228, brush 221a, contact ring 219a, plug 219d, brush 221d, line 229, terminal 230, line 231, relay 232, line 234, terminal 235, and line 236 to —24 volt terminal 237.

Energization of relay 232 closes its armature contacts 232a to form the following circuit:

Circuit B'.—From —110 volt terminal 178, through line 240, contacts 232a, line 241, solenoid 242, to +110 volt bus bar 169.

The latter circuit energizes solenoid 242. Referring to Figs. 6 and 7, this solenoid is above operating bar 100 and when energized raises its plunger 242' to lift a latch arm 243 pivoted to frame 31. The transversely bent end 243' of arm 243 rides on the upper edge of bar 100. When the bar is in final advanced position, latch end 243' is directly above a notch 244 in the bar and is adapted to drop into the notch to lock the bar in advanced position. Energization of solenoid 242 by circuit B' just before shaft 38 starts off from home position holds latch end 243' clear of notch 244. But as soon as shaft 38 leaves home position, commutator plug 219d separates from brush 221d to break circuits B and B'. Solenoid 242 is therefore deenergized, allowing latch 243' to drop into notch 244 and hold bar 100 in advanced position. When shaft 38 after the selecting operation returns to home position, contact plug 219d again engages brush 221d to cause energization of solenoid 242 and release of latch 243' from bar 100. Thus, the function of latch 243 is to prevent release of bar 100 until and unless shaft 38 has been fully restored, even though latch 106 be released from notch 104 of the bar.

When circuit B is formed, a shunt circuit C is also formed through a relay 245 which is across terminals 230 and 235. The energization of relay 245 closes its armature contacts 245a and b. Contacts 245a when closed form a holding circuit C' for relay 245 from — terminal 237, through line 236, terminal 235, relay 245, terminal 230, contacts 245a, line 246, normally closed cam contacts 247, and line 248 to bus bar 226.

The purpose of circuit C' is to maintain contacts 245b closed until a one-revolution clutch circuit is established subsequently as will be later explained.

A brief summary of the operations thus far described will now be given.

A load placed on the scale moved the weighing mechanism to position chart 33 according to the load. When the chart came to rest, the operator depressed handle 93 (Fig. 6) to move operating bar 100 on its forward stroke. Through a lever connection 110, bar 100 simultaneously moved a supplementary bar 111 towards the front of the machine. At the end of the advance of bar 100, the connected bar 111 has succeeded by engagement of its shoulder 120 with arm 119 of shaft 79 in releasing detent 70 from pin 71 of disk 42. Shaft 38 of the disk is now free for counterclockwise rotation. At the same time, operation of shaft 79 counterclockwise moved the upturned hook end of a lever 85 in front of and at a distance from the lug 87 of a pivoted latch 88, the nose 92 of which is in the plane of toothed disk 42. The pivoted latch 88 is now free to be subsequently moved by energization of magnet 91 towards disk 42 to engage the teeth of the disk for stopping shaft 38 in a position corresponding to the load.

At an intermediate point of the advance of bar 100 its pin 162 closed switches 164 and 155. The closing of switch 164 resulted in energization of a solenoid 157 (Fig. 13) which thereupon shifted a driven clutch member 139 (Fig. 13) into coaction with a clutch member 138 to rotate shaft 129 of the driven clutch member at 60 R. P. M. Through a sprocket wheel 122 and chain 121, rotation of shaft 129 is transmitted to a friction clutch disk 56 surrounding shaft 38.

Immediately after disk 56 has been set rotating, detent 70 released shaft 38 for rotation whereupon disk 56, becomes effective, through friction ring 55, to drive friction disk 51 of shaft 38. Shaft 38 is thus set in rotation counterclockwise (Figs. 6 and 11) at 60 R. P. M. During the first portion of rotation of shaft 38, its cam disk 80, (Figs. 6 and 10) depresses arm 183 of a lever 184 to cause a knife edge 192 to enter a notch 200 of disk 196 carried by chart 33 and to thereby set the latter load responsive elements in an even pound position. Arm 183 is held by latch 204 in depressed position to retain knife edge 192 in locking engagement with disk 196 for a predetermined period.

Chart 33 is now locked in an even pound position and its contact plate 213 is in a corresponding position spaced from its zero load position a distance equivalent to an even pound load on the scale.

The angular distance between brushes 216 and contact plate 113 when the chart 33 is in zero position and disk 42 in home position is greater than the angle through which shaft 38 moves to cause knife edge 192 to lock chart 33 in advanced position. Accordingly, chart 33 and its contact plate 213 are already locked in position by the time brushes 216 reach their zero load sensing positions.

The total range of indications on chart 33 for the 70 pounds capacity covers 270° of the chart circumference. Therefore the maximum angular movement of the chart which would occur under a load of 70 lbs. would only move the chart 270° from its zero position.

It follows that block 210 will also have a maximum angular movement of 270°. At the end of this movement, contact plate 213 would still be appreciably spaced from the wiping ends of brushes 216, as indicated in dot and dash lines in Fig. 11. Thus, although the brush ends and block 210 and its contact plate are located in substantially the same plane, at no point of the operation of the weighing mechanism, whatever the load, will there be any engagement between block 210 or contact plate 213 and brushes 216. As there is no possibility of any engagement between any other part of the weighing mechanism and any other part of the auxiliary mechanism during the weighing operation, it is clear that the weighing mechanism is entirely free to seek its position of equilibrium under a load without any interference by any part of the auxiliary mechanism. Due to the absence of any frictional or other retarding effects on the operation of the weighing mechanism, it responds sensitively to the force of the load and its load position accurately corresponds to the load. This is extremely important in the present case since the slightest deviation from the correct weight may cause an error of almost a pound upon the secondary setting operation of chart 33. Thus, if the chart under a load of 5¾ lb. should take a position equivalent to 6 1/12 lb., the secondary setting operation will move the chart to a 7 lb. position instead of to the required 6 lb. position.

Chart 26 and therefore contact plate 213 are now locked in an even pound position and shaft 38 is moving counterclockwise (Fig. 11) at 60 R. P. M. to carry brushes 216 to the contact block.

First, brushes 216a and b simultaneously engage contact portions 213a and b. This engagement controls means for reducing the speed of rotation of shaft 38. Moving at this reduced speed, shaft 38 carries brush 216c toward contact portion 213c. Cooperation of the latter elements controls means for stopping the shaft. Since the engagement of brush 216c with contact portion 213c occurs while shaft 38 is moving at the reduced speed, its arrest will be effected less abruptly and with less shock than if it were moving at the initial high speed. Further, the shaft due to its reduced speed will be stopped more positively in a position exactly corresponding to that of chart 33.

The means for effecting reduction of the speed of shaft 38 upon engagement of brushes 216a and b with contact portions 213a and b will now be explained: Referring to the circuit diagram (Fig. 22) engagement of brushes 216a and b with contacts 213a and b forms the following circuit:

*Circuit D.*—From +24 volt bus bar terminal 227, through line 228, commutator brush 221a, commutator ring 219a, brush 216a, contact portion 213a, contact portion 213b, brush 216b, commutator ring 219b, commutator brush 221b, line 249, change speed relay 172, line 250, normally closed cam contacts 251, and line 252 to −24 volt terminal 237.

Relay 172 which is mounted on frame block 126 (Fig. 13) below solenoid 157, is energized by above circuit to open its normally closed armature contacts 172a and to close its normally open armature contact pairs 172b and 172c.

Closing of contacts 172c forms a holding circuit for relay 172 independently of brushes 216a and b and contacts 213a and b. The holding circuit is as follows:

*Circuit D'.*—From bus bar 226, through line 253, contacts 172c, relay 172, line 250, cam contacts 251, and line 252 to − terminal 237.

Thus, when brush 216a passes contact portion 213a, to open circuit D, relay 172 remains energized by circuit D'.

The closing of contacts 172c also establishes a parallel circuit through a relay 254, as follows:

*Circuit E.*—From bus bar 226, through line 253, contacts 172c, line 255, relay 254, line 256, line 250, cam contacts 251, and line 252 to − terminal 237.

The purpose of circuit E is to energize relay 254 to close its armature contacts 254a which are in the circuit to be subsequently made through brushes 216b and c, as will be described.

Energization of relay 172 by circuit D also opened contacts 172a and closed contacts 172b. It will be recalled that contacts 172a are in circuit A which energized solenoid 157. Opening of contacts 172a at this time therefore breaks the circuit of solenoid 157. At the same time, the making of contacts 172b closes the following circuit through low speed solenoid 156.

*Circuit F.*—From terminal 170 of the +110 volt bus bar 169, through line 171, contacts 172b, solenoid 156, and line 175 to −110 volt terminal 176.

The above circuit energizes solenoid 156. Solenoid 156 is effective to shift clutch element 139 to the left (Fig. 13) to engage pins 142 with notches 143 of driving clutch element 137 which is rotating at 20 R. P. M.

Shaft 129 is thus set in rotation at 20 R. P. M.

and through its connections to shaft 38 now rotates the latter at the reduced speed of 20 R. P. M.

At this point, the reason for providing the one-way driving connections 140—141 between clutch members 139 and 138 while providing a two-way pin and socket connection 142—143 between clutch members 139 and 137 will be made clear. As clutch member 138 picks up clutch element 139 when the latter is at rest, the flat sides of the teeth 140 and 141 engage positively and without slipping to drive element 139. When solenoid 157 is deenergized, the spring washer 144 between elements 138 and 139 instantly moves these elements apart while at the same time solenoid 156 is energized to further move element 139 against clutch element 137. When released by the 60 R. P. M. disk 138, clutch element 139 still rotates at substantially the latter speed when it engages 20 R. P. M. disk 137 and is therefore moving faster than the latter element. Accordingly, if a one-way ratchet tooth connection were provided between elements 138 and 139, the latter would merely slip along the former with the inclined portions of the clutch teeth camming element 139 away from element 138. This would be the case until friction reduced the speed of element 139 to 20 R. P. M. whereupon element 138 would be effective to drive element 139. The reduction in speed of shaft 38 which depends on the speed of clutch element 139 must, however, occur rapidly as brush 216c is only a short distance from load point contact portion 213c when the speed reducing control operates.

Further, it is not desirable to make contact portions 213a and b any longer than is absolutely essential as this would entail reduced speed of shaft 38 for a longer period which would lengthen the time required for the shaft to reach load position. For these reasons, the two-way positive driving connections 142—143 (Figs. 13b and c) are provided between 20 R. P. M. clutch disk 137 and driven clutch element 139. Even though the latter when shifted towards disk 137 is moving faster than the latter, it cannot slip along the disk because as soon as its pins 142 register with notches 143 of the disk, the pins will enter the notches and positively clutch element 139 to disk 137 to be instantly driven at the same speed as the disk.

Shaft 38 is now rotating at 20 R. P. M. and brushes 216a and b are wiping along contact portions 213a and b. Contact portion 213a is of such length that brush 216a will ride off it before brush 216c reaches contact portion 213c. Thus, no circuit connection can be made between brushes 216a and c. This prevents making of the circuit through brush 216c directly from the +24 volt line 235 but forces the circuit to be routed through change speed relay contacts 172c and relay contacts 254a. One reason for this arrangement is to make the circuit through brush 216c only in case the change speed relay has functioned properly. The chief reason, however, is to prevent repeated operations of the machine should the auxiliary shaft 38 stick in position, a contingency which while extremely remote, is taken care of.

The manner in which repeating of machine operations is avoided will be more fully explained hereinafter.

Referring to Fig. 22, the circuit formed through brush 216c when it meets contact portion 213c is as follows:

Circuit G.—From + volt bus bar 226, through line 253, contacts 172c (now closed), line 249, commutator brush 221b, commutator ring 219b, brush 216b, contact portion 213b, contact portion 213c, brush 216c, commutator ring 219c, commutator brush 221c, line 257, relay contacts 254a (now closed by circuit E), line 258, latch magnet 91, line 259, normally closed cam contacts 260, and line 261 to —24 volt terminal 237.

Above circuit energizes latch magnet 91 to attract its armature 90. It will be recalled that the hook end of lever 85 moved away from lug 87 of pivoted latch 88 due to the counterclockwise rocking of shaft 79 (Fig. 6). Therefore, when armature 90 is now attracted by magnet 91, it is free to rock latch 88 counterclockwise to move its nose end 92 into engagement with teeth 420 of disk 42. This latter position is indicated in Fig. 5. As previously explained, the zero load position of disk 42 is the point of its travel at which brush 216c reaches the zero position of the middle of contact 213c. When the brush 216c moves from this zero position to the actuated and locked position of the middle of contact 213c, disk 42 will have traversed the same angle as chart 33 and will be in a position corresponding to the load to the even pound.

When disk 196 is in locked, even pound position, it is an even or integral number of notches 200 from its zero position. Notches 421 of disk 42 are spaced apart the same angular distances as notches 200; i. e., at pound distances apart. When disk 42 reaches zero position, a notch 421 thereof is in position to receive latch nose 92. Since disk 42 moves from this zero position on angular distance equal to that moved by the disk 196 (fixed to chart 33) and since notches 421 are spaced similarly to notches 200, at the end of this movement of disk 42, disk 42 will again have a notch 421 in latch receiving position. Brush 216c engages the rear of contact 213c before disk 42 reaches its even pound load position. This engagement at once establishes circuit G to move latch nose 92 towards disk 42. At this point, the tooth 420 preceding the load equivalent notch 421 is in front of the latch nose and is engaged thereby. This engagement tends to slow down the speed of the disk due to frictional resistance. Disk 42 continues its rotation until the load equivalent notch is in line with the latch nose whereupon the latter moves into the notch and locks the disk in a position exactly corresponding to the actuated position of chart 33. By timing operation of latch nose 92 to engage the tooth 420 preceding the selected notch a maximum interval, corresponding to the travel of disk 42 between adjacent notches, is provided for the arresting mechanism of the disk to function properly. If the latch nose were operated precisely when the selected notch came opposite, then only about half this maximum interval would be available for the disk to be arrested and thereby the certainty of catching the correct notch would be reduced.

Although the possibility of latch nose 92 catching an incorrect notch 421 is extremely remote, this contingency is entirely eliminated because the circumferentially extending length of contact portion 213c is just slightly more than the width of a paired tooth and notch of disk 42. Brush 216c engages the rear end of contact 213c when the rear end of the top of a tooth 420 is opposite latch nose 92. If the latch should fail to catch the correct notch which follows, then the disk 42 will continue to rotate. The top of the next tooth 420 would then begin to move in front of latch nose 92 and at an initial point of the latter movement, disk 42 would carry brushes 216b and c off the front end of contacts 213b and c thereby breaking the latching circuit G. Since the latching circuit does not make, latch 88 will be in retracted position and latch nose 92 will not be in a position to catch a notch 421 of disk 42. Thus, the latching circuit can be made only in the interval of movement of disk 42 in which brush 216c is traversing contact portion 213c. During this interval, the correct notch 421 moves along latch receiving position. After this interval, should the latch fail to operate, then the correct notch will pass by the latch receiving position. But the latch circuit is broken after this interval so that the latch is not operative to catch any of the notches which follow the correct notch. In this manner, the possibility of stopping disk 42 in incorrect position is eliminated.

If the latch fails to catch the selected notch, then disk 42 will move all the way around again until brushes 216b and c reengage contacts 213b and c to reclose latch circuit G.

Disks 42 being set in load position, selector disks 47, 48 and 67 on shaft 38 are likewise in load position. The maximum load capacity is 70 lbs. and in moving under this capacity load, chart 33 covers an angle of 270°, as previously explained. Shaft 38 in following chart 33 to a maximum load position also moves 270° from zero position. Hence only 270° of the periphery of each selector disk is available for control purposes. This portion of the periphery of the selector disk is formed with steps 262 of different heights to represent different values. Referring to Figs. 15 to 21, the ten digit values 0, 1, 2, . . . 9 are represented by ten progressively increasing heights of steps 262—0, 1, 2, . . . 9. Weight selector disk 47 is in the tens order in which there are seven possible values 0 to 7 represented by wide steps 262—0 to 7, as indicated in Fig. 21. Units weight selector disk 48 has seven series of narrow steps 262—0 to 9, each series in coincidence with each of steps 262—0 to 6 of disk 47 and a short zero step 262—0 in coincidence with step 262—7 of disk 47 (see Fig. 21). If the load is any fraction above 69 pounds, chart 33 will be set by coaction of knife edge 92 and a notch 200 of disk 196 to a 70 pound position and selector disks 47 and 48 will correspondingly be locked in a 70 pound position with step 262—7 of disk 47 and step 262—0 of disk 48 in control positions.

There are four sets of selector disks 67 which may be distinctively characterized as disks 67—z, 67—D, 67—d, and 67—c. Each set has nine disks, making thirty-six in all.

Reading from left to right in Fig. 8, the first set of disks, 67—z, represents nine postal zones L, 1, 2, 3 . . . 8; the second set of disks, 67—D, represents the dollars value in the nine zones, the third set, 67—d represents the dimes values in the nine zones, and the last set, 67—c, represents the cents value in the nine zones.

Each of the zone disks has an uninterrupted circular periphery since only one value is represented by each such disk for all loads. Considering the local zone L as zone 0, the radii of the zone disks differ in length to represent values 0 to 8 in the same manner as steps 262—0 to 8. Thus, the first zone disk at the left represents zone L or 0 and has a radius equal to the radial height of a step 262—0 from center. The next zone disk has a radius equal to that of step 262—1 and represents zone 1, and so on.

The steps on the dollars, dimes, and cents disks are arbitrarily determined by the values to be represented for different loads and in different zones. Since, at the present time, the postage for a maximum load of 70 pounds in zones L, 1, and 2, is less than a dollar, the first three dollar disks from the left are completely circular with a radius equal to that of a step 262—0. Figs. 18 to 20 show the arrangement of steps of disks 67—D, d, and c in the eighth zone. The postage in the eighth zone for 70 pounds is $7.74. Thus disk 67—D in this zone has eight steps 262—0 to 7, dimes disk 67—d in this zone eight series of steps, with each series having its steps arranged according to the dimes values required for the different loads. The cents disk 67—c similarly has its steps arranged arbitrarily according to the cents values for the different loads in the eighth zone.

Thus, the postage of one pound in the eighth zone is 15 cents and the first pound increment of movement of disks 67, brings to control position, a zero step of the dollars disk, a 1 step of the dimes disk, and a 5 step of the cents disk.

Weight selector disks 47 and 48 are fixed against axial movement along shaft 38 since their readings do not differ in accordance with the zones. The selector disks 67 are shiftable axially in accordance with the zone to which the package is to be mailed. The nine disks 67 of each set are, reading left to right in Fig. 8, respectively, in zones 0 to 8. By shifting the disks axially a distance equal to that between adjacent disks 67, the disks are shifted from one zone to the next. In Fig. 8, the disks are set for zone 8 and the first disk from the right of each set is in a control plane. By shifting the disks from the position of Fig. 8 one step to the right, the second disk from the right in each set is brought into the control plane, and so on.

Referring to Figs. 4, 8, 9, and 14, the zone shifting is effected as follows: Disks 67 are rigidly mounted on tubular shaft 66 constrained to rotate with shaft 38 but slidable therealong. At opposite ends, shaft 66 is engaged by the lower ends 68 of upwardly extending arms 69. At their upper ends, arms 69 are fixed to the opposite ends of a sleeve 263 slidably carried by a shaft 264 parallel to shaft 38 and journaled between the upper ends of frame standards 32 and 40. To prevent rocking of the sleeve about shaft 264, the arms 69 have forwardly extending ears 265 slotted to ride along a rod 266 parallel to shaft 264 and also carried by standards 32 and 40.

Sleeve 263 is provided with rack teeth 267 meshed with gear sector 268 pinned to a short vertical shaft 269 which is journaled in a horizontal plate 270 fixed to the top of cross bars 270' carried by the frame. The upper face of plate 270 is located exteriorly of and above the top of casing 35, in view of the operator. Shaft 269 projects above the top of plate 270 and to the projecting end is pivoted a handle 272. The pivot connection 272' between the handle and shaft permits the handle to rock vertically but constrains the handle and shaft to rock together horizontally. The opposite arms of the handle are at an obtuse angle to each other, diverging with respect to the top of plate 270, to permit a limited rocking of the handle in a vertical direction. The rear arm of the handle has a knob 274 by which it is manipulated and a depending pin 275 which is seated in one of the notches 276 of plate 270 when the handle is in normal position (shown in Fig. 9). The pin and notch coact to hold the handle against sidewise movement unless the handle is first rocked forward. There are nine notches, opposite which are figures indicating the zones to which they correspond. The outer end of the rear arm of the handle is pointed to serve as an index for the zone indicating figures. When handle 272 has its pin 275 in a notch 276, the selector disks 67 are in the zone setting indicated by the figure opposite the notch. To shift the selector disks to another zone setting, handle 272 is rocked forward clockwise (Fig. 9) bringing pin 275 out of the notch 276. The handle can now be moved horizontally to rock shaft 269 and its gear sector 268. The latter operates rack 267 to shift sleeve 263 and the arms 69 rigid therewith along shaft 264, thereby moving disks 67 axially along shaft 38.

The handle 272 is moved horizontally until its rear, pointed, end is opposite the desired zone figure. The handle is then released to drop its pin 275 into the notch 276 corresponding to the selected zone. When this is done, disks 67 have been shifted to bring the disks 67 pertaining to the required zone in control positions and locked in such positions.

It is undesirable to operate bar 100 by depression of handle 93 while zone shifting is taking place or to effect zone shifting after the bar has been operated. To avoid simultaneous operation of bar 100 and the zone shifting means, the rocking of zone shifting handle 272 to a released position (clockwise, as viewed in Fig. 9) causes the forward end of the handle to depress a slidable link 277 which at the lower end is connected to arm 278 fixed to shaft 264. Also fixed to this shaft is a lock arm 279. When link 277 is depressed, shaft 264 is rocked clockwise to move arm 279 against resistance of a spring 279' to an upper position in which its blunt end is directly above the upper side of a horizontally extending arm 280 fixed to sleeve 281 which is journaled on a stationary shaft 281' carried between frame 31 and a right hand vertical frame 282 (as viewed in Fig. 14). When arm 279 is above arm 280, sleeve 281 cannot be rocked counterclockwise (Fig. 9a). Sleeve 281 has a depending arm 283, the lower end of which is slotted to receive a pin 284 carried by operating bar 100. In its normal, rear, position, the bar through pin 284 and arm 283 holds sleeve 281 at its clockwise limit so that arm 280 is in lower position. In this position, arm 280 permits arm 279 to rock above it which occurs when zone shifting handle 272 is raised to effect zone shifting.

As long as zone shifting is taking place, handle 272 is elevated and arm 279 is above arm 280 preventing the latter arm, its sleeve 281, and arm 283 from being rocked counterclockwise. Hence operating bar 100 connected to arm 283 cannot be advanced at this time as such movement of the bar can take place only when the arm is free to move counterclockwise. In this manner, bar 100 is locked in normal position while zone shifting is taking place. When the zone setting has been completed, the operator releases handle 272 and spring 279' returns arm 279 to its lower position in which it is out of the path of movement of arm 280.

After bar 100 has been advanced, handle 272 cannot be raised to shift zones. This is because when the bar is advanced, it rocks arm 280 upwardly in front of arm 279. To shift the zones, handle 272 must first be raised, causing arm 279 to rock counterclockwise but if arm 280 is then in front of arm 279, the latter cannot be rocked counterclockwise and handle 272 cannot be raised to effect zone shifting.

In above manner, zone shifting is permitted only while the bar 100 is in unactuated position and advance of the bar cannot occur during zone setting.

Selector disks 47 and 48 are now in weight proportional positions while disks 67 have a weight and zone setting. Latch 88 is in forward position, its nose 92 engaged in a notch 421 of disk 42 holding shaft 38 stationary. The machine is now ready to take a reading from the selector disks to control entry of the values read from the selector disks into registering and printing devices. The reading of the disks and the entry into the registering, printing device are performed under control of a one-revolution drive. Thus, the next step following the arrest of the selector disks in load position is to set the one-revolution drive in operation.

*One-revolution drive*

Operation of the one-revolution drive is initiated under control of latch 88 when it rocks towards disk 42 to lock it in load position. Referring to Figs. 4, 5, 6, and 25, latch 88 has a pin 285 extending transversely below a spring blade 286 carrying one of the points of a switch 287, the other point of which is carried by an upper spring blade 286'. When latch 88 is rocked towards disk 42 to arrest the disk in load position, pin 285 moves upwardly and engages the lower spring blade 286 to move it towards the upper spring blade thereby closing switch 287. The closing of switch 287 completes a circuit through a clutch solenoid 288 (Figs. 5, 6, and 9) as follows, referring to the circuit diagram, Fig. 22:

*Circuit H.*—From —110 volt terminal 176, through clutch solenoid 288, switch 287, line 289, relay contacts 245b (now closed) and line 290 to the +110 volt bus bar 169.

Above circuit energizes solenoid 288 to depress its core 291 and a link 292 against resistance of a spring 293. Link 292 is connected to and rocks a pivoted latch 294 downwardly to release an upright arm 295a of shaft 295 for clockwise rocking (Fig. 5) by a spring 296. The upper, free end of arm 295—a thereupon moves to the right from under the ledge 297 of a driven clutch disk 298 and from under the tail of a clutch pawl 299 pivoted to disk 298. Referring to Fig. 13, clutch disk 298 is freely rotatably mounted on shaft 147 which is constantly driven by motor M, as previously explained. At the right side of clutch disk 298 is a driving clutch disk 300 with one-way driving ratchet teeth 301.

Clutch disk 300 is pinned to constantly rotating shaft 147. In the normal position of clutch pawl 299, its tooth 302 is outside the path of rotation of teeth 301 of disk 300. When arm 295a releases the pawl, a spring 303 connecting the free nose end of the pawl with disk 298 moves the pawl clockwise (Fig. 5) to seat its tooth 302 in a tooth 301 of driving disk 300. The latter thereupon rotates disk 298 clockwise, as viewed in Fig. 5. When disk 298 has made less than half a revolution, a pin 304 thereon engages the upper edge of the left hand horizontal arm 295b of shaft 295 and cams the arm downwardly. Pin 304 rides off arm 295b after disk 298 has made 210° of its one revolution but a following pin 305 on the disk maintains arm 295b depressed until the disk has gone through about 270° of its cycle.

Depression of arm 295b rocks shaft 295 counterclockwise (Fig. 5) thereby positively replacing vertical arm 295a in position to intercept ledge 297 of disk 298 and the tail of clutch pawl 299 when the disk has completed one revolution.

Shaft 295 when rocked counterclockwise raises its right hand arm 295c to positively kick latch 294 upwardly into operative latching position. When the tail of pawl 299 is intercepted, the pawl rocks counterclockwise, thereby withdrawing its tooth 302 from between the teeth 301 of driving disk 300. Engagement of ledge 297 by arm 295a then arrests disk 298 in a definite home position.

Near the end of the cycle of disk 298, its pin 305 engages a rebound latch 306 and as it passes the latch, cams it to the rear against resistance of spring 307. When the disk 298 has completed its revolution and been stopped by arm 295a, pin 305 sits on top of rebound latch 306 which prevents rebound of the clutch disk from its home position.

Disk 298 is fast to a bevel gear 308 (see Figs. 13 and 14) which is also rotatably mounted on shaft 147. Meshed with bevel gear 308 is the bevel gear 309 of a cam shaft 310 which extends horizontally at right angles to shaft 147 (see Figs. 6, 13 and 14). Gears 308 and 309 are in one-to-one ratio so that shaft 310 makes one revolution each time disk 298 is clutched to shaft 147. Through one-to-one gearing 311, shaft 310 drives a supplementary short cam shaft 315 journalled in frame plate 31 and located at the side of the latter remote from the weighing mechanism (see Fig. 14).

The one revolution of cam shafts 210 and 315 will hereinafter be referred to as the cycle.

On shaft 310 is a cam 247' (Figs. 6 and 24) which opens cam contacts 247 at 25° of the cycle. The opening of contacts 247 breaks the holding circuit C of relay 245, causing contacts 245b in clutch circuit H to open. Thus, the clutch solenoid 288 is deenergized to release latch 294 at 25° of the cycle. Pins 304 and 305 depress arm 295b between 150° and 270° of the cycle causing arm 295a to return to de-clutching position and also causing arm 295c to positively kick the latch upwardly to retain arm 295c in declutching position for the rest of the cycle.

In above manner, operation of latch 88 to arrest disk 42 in load position, initiates the one-revolution cycle of cam shafts 310 and 315.

Short, supplementary cam shaft has a round disk 316 (Fig. 6) formed with a single notch 317 engaged by a roller 318 of a pivoted arm 319 when the cam shaft is in home position. Spring 320 connected to arm 319 holds the roller 318 in notch 317 to impositively maintain cam shaft 315 and its connected cam shaft 310 in initial or home positions.

As the shafts begin rotating, the side of notch 317 cams the roller 318 out. When shaft 315 has finished its cycle, roller 318 again seats in notch 317 to impositively retain the cam shafts in home position.

Figure 15:
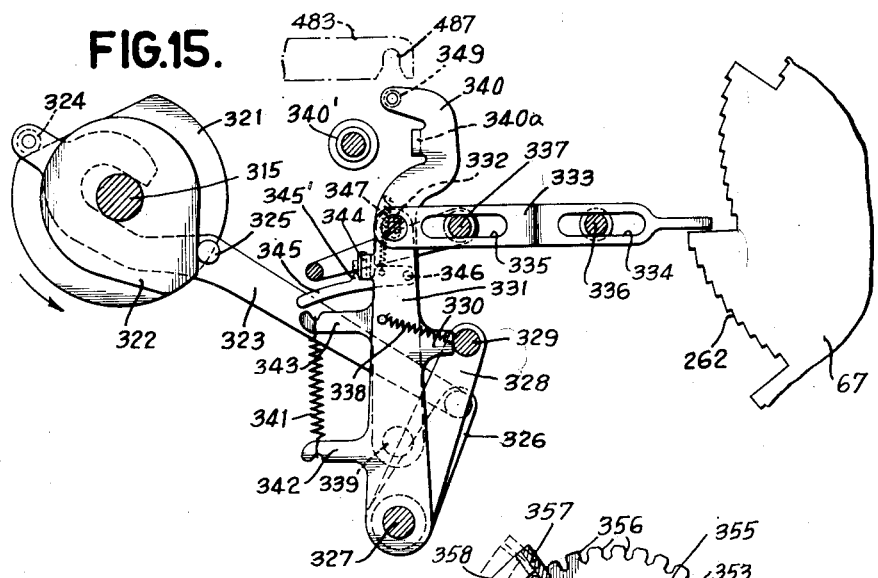
Fig. 15 is a position view of the reading mechanism which reads the selector mechanism.
Figure 16:
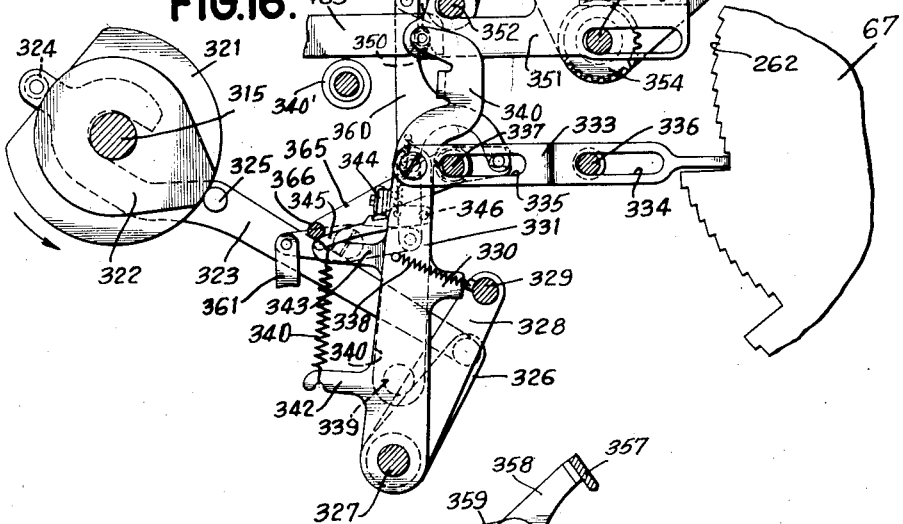
Fig. 16 shows the reading mechanism and locking means for the control members of the latter in their advanced positions.

Also carried by cam shaft 315 are cams 321 and 322 (see Figs. 6, 15 and 16).

During the first 95° of the cycle, cams 321 and 322 move a link 323 downwardly and then upwardly to operate the reading mechanism of the selector disks.

*Selector disk reading mechanism*

The reading mechanism will be explained with particular reference to Figs. 9, 14, 15, 16, 17 and 17a. Link 323 is located between cams 321 and 322 and is forked to straddle shaft 315 to be guided thereby for substantially rectilinear movement. Link 323 has an upper pin 324 engaging cam 321 and an intermediately located pin 325 engaging cam 322. The lower end of the link is pivotally connected to an arm 326 fast to a shaft 327 journalled between vertical frames 31 and 282 (see Fig. 14). Shaft 327 rigidly carries arms 328 supporting between them a horizontal, cross rod 329. The rod extends across the front of lugs 330 of a series of six arms 331 freely rotatably mounted at their lower ends on shaft 327. Each arm 331 has a pin and slot connection 332 at its upper end to one of six, horizontally disposed, selector disk sensing or reading fingers 333. The front end of each finger 333 is reduced in width to less than the width of a single step 262 of the selector disks 47, 48, and 67. Fingers 333 have horizontally disposed slots 334 and 335, respectively coacting with a rod 336 and a shaft 337 to guide the fingers for strictly horizontal sliding movement. Rod 336 is rigidly carried by the upper ends of the vertical arms 125, 130, 131 and 132 of frame block 126 (see Fig. 13). Shaft 337 is journalled between frame plates 31 and 282.

Each of the six sensing fingers, at its front end, is in line with one of the six selector disks in control positions. Reading left to right in Fig. 14, the first sensing finger is alined with tens order weight selector disk 47; the second finger is in line with units weight selector disk 48, the third finger, with selected zone disk 67—z, the fourth finger (nine disks distant from the third) is in line with selected dollar disk 67—D, the fifth with selected dimes disk 67—d, and the sixth with selected cents disk 67—c.

When cams 321 and 322 are in home positions shown in Fig. 6, link 323 is at its upper limit and shaft 327 has been rocked to bring bail 329 furthest to the left (Figs. 9, 15, and 16). The bail is therefore positively holding arms 331 and their connected sensing fingers 333 in retracted position, outside the path of rotation of the stepped, selector disks as indicated in Fig. 9. Cam shaft 315 now starts its rotation and cam 322 acts on pin 325 to positively depress link 323. An initial stage in the depression of the link is shown in Fig. 15. When the peak of cam 322 rides on pin 325, the depression of link 323 is completed, this stage being shown in Fig. 16. The peak of cam 322 is arcuate for about twenty degrees to permit link 323 to dwell in lower position for a brief interval.

As link 323 is depressed, shaft 327 is rocked clockwise causing bail rod 329 to swing to the right (Figs. 15 and 16). Through individual springs 338 connecting the rod to each arm 331, the latter are likewise drawn to the right to move sensing fingers 333 towards the selector disks. The fingers will move until stopped by engagement with the steps 262 of the disks located in control positions. As the steps are of different heights, the fingers are arrested in different positions by steps representing different values.

As shown in Fig. 9, fingers 333 when in home position are about half a step differential removed from the outer circle of the selector disks. The top of a step 262—9 is flush with this outer circle so that a finger 333 in sensing a 9 step 262 moves only half a step differential. To sense the next lower step 262—8, the finger would have to move one-and-a-half step differentials, and so on until it moves nine-and-a-half step differentials to sense a step 262—0, when the latter is in control position, as shown in Figs. 15 and 16. Thus, steps 262—0, 1, . . . 9, respectively, control fingers 333 to move 9½, 8½ . . . ½ step differentials.

Since the engagement of a finger 333 with a step 262 is effected by moving the finger through the pull of a spring 338, the shock of the engagement will be absorbed by the spring. After a finger is arrested in position by a step, its spring 338 stretches permitting bail 329 to continue its forward stroke for moving the other fingers to their positions of arrest until when the bail is at the end of its stroke, all six fingers have been differentially set by steps 262.

The differential positions of fingers 333 also determine the differential positions of their operating arms 331. Each arm 331 has a pin 339 for freely pivotally mounting an arm 340 on the arm 331. The arm 331 and the arm 340 carried thereby may be referred to as paired or companion arms. The paired arms are further connected by a spring 341 secured at opposite ends to rearwardly extending projections 342 and 343 of arms 331 and 340, respectively.

Arm 331 has a transverse lug 344 at the rear of the back edge of the companion arm 340. The home position of arms 331 is fixed by the counterclockwise limit of restoring bail 329 while the home position of arms 340 is determined by the engagement of a fixed cross rod 340' with lugs 340a of arms 340. In the respective home positions of paired arms 331 and 340 (see Fig. 9), lug 344 is to the rear of the back edge of arm 340 by a distance equal to about half a step differential of arm 331 or by the distance required for arm 331 to effect sensing by its finger 333 of a step 262—9.

An arm 331 in moving the fractional step differential equivalent required to sense a 9 step 262 brings its lug 344 into engagement with the back of the paired arm 340. Thus, the 9 sensing movement of arm 331 effects no movement at all of the companion arm 340. But from then on as arm 331 moves forward through successive increments required to sense the 8, 7, 6, 5 . . . 0 steps 262, lug 344 is held engaged by spring 341 with the back of arm 340 to move the latter bodily with arm 331 and as an effectively rigid or integral part of the latter.

The companion arms 331 and 340 thus move together in unison, after the 9 sensing position is passed, until arm 331 engages a step 262—0 to 8 in control position and is arrested. When an arm 331 is thus arrested, it is possible that the companion arm 340 may continue moving due to momentum. To prevent arms 340 from moving ahead of arms 331, each of the former arms has a horizontally disposed latch 345 pivoted to it at 346 and urged to upper position by a spring 347 between the latch and its carrying arm. In the home positions of paired arms 331 and 340, the tooth 345' of latch 345 is engaging the bottom of lug 344. When arm 331 has moved to 9 sensing position, lug 344 has moved ahead of the latch tooth sufficiently to permit the latter to hook behind the lug under the influence of spring 347.

For the remainder of the sensing stroke of arm 331, latch 345 engages the back of lug 344 to prevent arm 340 from moving ahead of arm 331.

As explained before, arms 340 do not start moving till the 9 position of the selector disks is reached by finger 333. Accordingly, an arm 331 moving through ½, 1½, 2½ . . . 9½ step differentials required to sense steps 262—9, 8 . . . 0 causes its paired arm 340 to move 0, 1, 2 . . . 9 step differentials.

The upper end of each of the six arms 340 has a transversely projecting pin 349 extending into a slot 350 at the rear end of a horizontal slide 351. There are six such slides, each connected to one of the six arms 340. Extending through horizontal slots of all the slides 351 is shaft 281 (previously mentioned in connection with the interlock between operating bar 180 and the zone shifting device) and a second shaft 352 journalled between frame plates 31 and 282.

Each slide 351 rigidly carries a rack bar 353 meshed with a pinion 354 freely rotatably mounted on shaft 281. Fast to the side of each pinion 354 is a notched sector plate 355 having ten notches 356. With arms 340 in initial position, slides 351 are at the left hand limit (Fig. 9) and all the rack sectors 355 have their first, uppermost notch in line with the V-end of a common lock bail 357. The arms 358 of the lock bail are fast to shaft 352 which has an arm 359, connected by linkage 360 to a vertical link 361 (see Fig. 6) forked to straddle cam shaft 310 so as to be slidably guided by the latter. Link 361 has a follower 362 coacting with box cam 363 on cam shaft 310. Initially cam 363 holds link 361 in raised position so that the link through linkage 360 has positioned arm 359 and its shaft 352 at the counterclockwise limit, with lock bail 357 remote from sectors 355, as indicated in Fig. 9.

Movement of an arm 340 through a single step differential operates its slide 351 to rock the associated sector 355 clockwise through an angular distance equal to that between successive notches 356. If arm 340 is in a position resulting from the sensing by finger 333 of a 9 step 262, uppermost notch 356 of sector 355 will be alined with lock bail 357. If arm 340 is positioned according to the reading of a 0 step, then the lowest notch of sector 355 will be in line with the lock bail.

After thirty-five degrees of the cam shaft cycle has been covered, the forward movement of arms 331 and therefore of arms 340 is completed and the reading operation of the disks is finished. Each of the six sectors 355 now has a notch in line with lock bail 357. While follower 325 of link 323 is idling along the peak of cam 322, box cam 363 lowers link 361 to cause clockwise rocking of shaft 352, thereby moving lock bail 357 into the alined notches of sectors 355. This action is completed at 50° of the cycle. If the notches are slightly out of line, the coaction between the inclined sides of teeth 356 and the V-shaped edge of the lock bail when the latter moves towards the sectors brings the notches into strict alinement with the lock bail. When the lock bail is seated in the alined notches, the slides 351 are locked in position. Since these slides are connected to arms 340 by pins 349 engaged in vertical slots of the slides, the pins 349 of the arms 340 will be locked in position. These pins are thus set at 50° of the cycle in exact, predetermined, differential positions in accordance with the values taken from selector disks 47, 48 and 67. The registering and recording operations may now be controlled by the pins 349 in accordance with their differential positions, in a manner which will be later described.

Since the selector disks 47, 48 and 67 have now completed their function of converting or translating the load and zone values into equivalent positions of pins 349, the disks may now be returned to home position. The restoration of the weighing and selecting mechanism to home position is begun after the reading operation and before the recording, registering operations begin. The return of the selecting mechanism to home position may be completed either before or substantially at the same time as the recording and registering operations are completed. Thus, by the time a record and registration is made of a load on the scale, the weighing and selecting mechanisms will be restored and ready for the next load. In this way, a time saving is effected which is appreciable in proportion to the total time required to go through the entire series of machine operations for each load. If the restoration of the selecting mechanism were to begin after the recording and registering operations, it would add to the total time required for the series of machine operations. The desirability of starting the return of the selecting and weighing means to home positions before the recording and registering operations begin or are completed is thus clear. But, while the selector disks are to be restored, pins 349 of arms 340 must retain their differentially set positions through the registering, recording operations and this is done by maintaining lock bail 357 in locking cooperation with sectors 355 during the registering and recording operations.

While pins 349 are thus locked, arms 331 must be restored to retract the sensing fingers 333 from their reading positions in which by contact with the sides of steps 262, they would prevent rotation of the selector disks.

To restore arms 331, they must move to the left (Figs. 9 and 15) to the rear of arms 340. In order to do this, latches 345 must be released from lugs 344. For this purpose, cross shaft 337 (one of the guides of reading fingers 333) has bail arms 365 at each end carrying between them a cross rod 366 disposed over all the latches 345 (see Fig. 14).

Shaft 337 also has an arm 367 extending to its right (Figs. 15 and 23) which is forked at the outer end to receive a pin 368 projecting from a lateral extension 369 of vertical link 360' of the operating linkage 360 of lock bail shaft 352.

Initially, bail shaft 352 is at the counterclockwise limit (Fig. 23) holding bail 357 free of notches 356 of sectors 355. In moving shaft 352 to this position, follower arm 361 was raised by cam 363, causing link 360' to move downwardly to rock arm 359 of the shaft counterclockwise. As link 360' moved down, its lateral extension 369 acted on arm 367 to rock shaft 337 clockwise, thus raising cross rod 366 to a position, shown full in Figs. 9 and 15 and in dotted lines in Fig. 23. In this position, rod 366 is clear of latches 345.

At 50° of the cycle, the disk reading operation has been completed and bail shaft 352 has been rocked clockwise to cause lock bail 357 to lock sectors 355 and thereby pins 349 of arms 340 in differential positions. To rock bail shaft 352 clockwise, link 361 was depressed, and link 360' raised. As link 360' rises, its extension 369 acts on arm 367 to rock shaft 337 counterclockwise to move cross rod 366 to a lower position, shown full in Figs. 17 and 23. When rod 366 moves to the lower position, it engages all the latches 345 to depress them and unhook their teeth 345' from lugs 344. Arms 331 can now move to the rear of arms 340.

At 55° of the cam shaft cycle, follower 325 of link 323 rides off the peak of cam 322 and follower 324 of the link begins to move along the ascending half of cam surface 321a of cam 321, causing the link to rise. Through arm 326, this movement of the link rocks shaft 327 counterclockwise. Assisted by springs 338, the restoring bail 329 thereupon moves arms 331 to the rear until at the end of the restoring operation at 95° of the cycle, the bail is again engaged with the lugs 330 of all the bars 331.

During return movement of an arm 331, pin 349 of its companion arm 340 is firmly locked in a differentially set position by the coaction of bail 357 and sectors 355. As arms 331 return, they therefore rock arms 340 about the pins 349 as pivots, springs 341 stretching during the movement of the arms 331 to the rear of arms 340. The positions of arms 331 and 340 at the end of the restoring operation of arms 331 are as indicated in Fig. 17. (Near the end of the cycle when lock bail 357 releases sectors 355 to unlock pins 349, springs 341 relax to restore arms 340 to initial position, with lugs 340a engaged with stop rod 340'.)

At 95° of the cycle, arms 331 and their associated fingers 333 are fully restored.

Restoration of the selector disks 47, 48, and 67 may now be effected without interference from reading fingers 333.

*Restoration of selecting mechanism*

At 100° of the cycle, after restoration of arms 331 of the reading mechanism, cam disk 375 (Fig. 6) on shaft 310 opens cam contacts 251 and 260. Cam contacts 251 are in circuits D' and E and when the contacts are opened, both these circuits break. Circuit D' is the holding circuit of change speed relay 172 and when this circuit breaks, relay 172 is deenergized to open contacts 172b and c and to permit contacts 172a to close.

Opening of contacts 172b breaks circuit F which operates the low-speed control solenoid 156 while making of contacts 172a re-establishes circuit A through the high-speed control solenoid 157. Shaft 129 and friction disk 56 are therefore set rotating at 60 R. P. M. for the second time in the total cycle of operations. Disk 56 is now ready to restore shaft 38 at a high speed to its home position. To permit this, latch 88 must be withdrawn from disk 42.

As stated above, circuit E includes contacts 251. This circuit also contains contacts 172c. As both these contacts open at 100° of the cam cycle, circuit E is broken and therefore relay 254 is deenergized, to cause contacts 254a to open.

Contacts 172c, 254a, and cam contacts 260 are all in circuit G. All of these contacts open at 100° of the cam cycle. Accordingly, circuit G then breaks and latch magnet 91 is deenergized. However, this does not cause latch 88 to withdraw from disk 42 because there is no spring or other force sufficient to retract the latch upon deenergization of magnet 91. On the contrary, the latch is firmly held in operative locking position by the continual pressure against latch nose 92 of the lower wall of the notch 421 in which nose 92 is now seated. This pressure results from the drag on disk 51, fixed to shaft 38 of friction disk 56 which continues to rotate after disk 42 is arrested by latch 88. The shape of teeth 420 and latch nose 92 and the positions of nose 92 and the lower wall of the notch 421 in which it is seated are such that the continual pressure of the lower wall of the notch retains latch 88 in actuated position although its actuating magnet 91 is now deenergized.

To release latch 88 from disk 42, the latch must be positively kicked out. This is done at 180° of the cam cycle by means which includes driven clutch disk 298. As explained in connection with the one-revolution actuator, disk 298 has pins 304 and 305 which from 150° to 270° of the cycle depress arm 295b of shaft. 395 to positively return the de-clutching arm 295a to stop position and the latch 294 to latching position with respect to arm 295a. Shaft 295 also has an upright arm 375 pivotally connected to the left end of a horizontal link 206 (see Figs. 5, 6, and 13).

Link 206 has an intermediate, horizontal slot 376 through which pin 207 of latch 204 passes and a second horizontal slot 377 at the right end through which pin 378 at the upper end of bell crank 114 passes. The coaction of these pins and slots slidably guides link 206 for substantial horizontal movement. Near its right end, link 206 is formed with an upwardly extending lug 379 facing pin 88' of latch 88.

The normal position of link 206 shown in Fig. 6 is determined by the normal, home, position of shaft 295, the position in which it is located prior to the clutch release. In this position of shaft 295, its arm 375 is in position to hold link 206 with the right end of slots 376 and 377 respectively engaging pins 207 and 378 and with lug 379 spaced from pin 88', latch 88 not having been operated yet. While link 206 is in this normal position, latch 88 is rocked counterclockwise to engage a notch 421 of disk 42 and arrest shaft 38 in load position. The angle through which latch 88 moves counterclockwise when it arrests disk 42 is such as to bring pin 88' against lug 379 without moving link 206. When latch 88 arrests disk 42, its pin 285 closes contacts 287 to form circuit H through clutch solenoid 288. The solenoid releases latch 294 from arm 295a which is then moved clockwise by spring 296. Arm 295a releases driven clutch disk 298 for a one revolution cycle. As arm 295a rocks clockwise, its shaft 295 moves link 206 to the right. The positions of the parts are then as shown in Fig. 5.

When the driven disk 298 has moved through about 150°, pin 304 engages arm 295b of shaft 295 and starts depressing it to rock shaft 295 counterclockwise. This moves link 206 to the left. When in this movement, the link reaches normal position, the right ends of slots 376 and 377 and the left end of lug 379, respectively re-engage pins 207, 378, and 88', the parts being then once more in the relationship to each other shown in Fig. 6 except that pin 88' has moved to the right due to operation of latch 88.

The action of pins 304 and 305 on arm 295b rocks shaft 295 not only back to normal position but past the normal position. This occurs at 180° of the cycle. Due to this overthrow in the return direction of shaft 295, link 206 moves to the left beyond its normal position and through engagement of slot 376 with pin 207, kicks latch 204 away from pin 202 of arm 183, through engagement of slot 377 with pin 378 rocks bell crank 114 counterclockwise and through engagement of lug 379 with pin 88' rocks latch 88 clockwise.

Rocking of latch 88 clockwise by lug 379 positively disengages latch nose 92 from teeth 420 of disk 42. The latch 88 is now restored to normal position.

Rocking of bell crank 114 counterclockwise by coaction of slot 377 and pin 378, elevates vertical bar 113 against resistance of spring 116. Bar 113 in turn raises the right end of bar 111, thereby releasing its shoulder 120 from arm 119 of shaft 79 and permitting spring 80 encircling the shaft to rock it clockwise. Acting through plate 78 and link 77, the shaft thereupon returns detent 70 to position for intercepting pin 71 of disk 42 to arrest shaft 38 in home position. At the same time, plate 78 rocks lever 85 counterclockwise to bring its hooked end against lug 87 of latch 88 to hold the latter in retracted position.

Link 206 also has released latch 204 from pin 203 of arm 183. When arm 183 is released, it engages the circular periphery of disk 180 which follows cam bump 202 and as previously explained, while riding on this circular periphery, it is not depressed sufficiently to permit its being re-latched by latch 204. Thus, when link 206 returns to normal position (Fig. 6), latch 204 does not re-latch arm 183 now riding on the circular periphery of disk 180.

While the arm 183 is thus riding along the circular periphery of disk 180, it is still holding the knife edge 192 engaged in the notch 200. When sleeve shaft 38 and its parts return to normal, the cam recess 182 comes opposite arm 183 and the latter is free to move into the recess. This movement is effected by spring 195 (Fig. 10) acting through pin 191 of the knife edge 192; the pin in turn rocking lever 187 clockwise (Fig. 10) which through spring 189 moves arm 183 counterclockwise into initial position at the bottom of the cam recess 182. By the time this occurs, the spring 195 has succeeded in restoring knife edge 192 to initial, retracted position, thereby releasing notched disk 192 and the weighing mechanism. Thus, only when the auxiliary, selector, mechanism on shaft 38 has returned to home position, is the weighing mechanism unlocked for the next loading operation.

At 270° of the cam shaft cycle, pin 305 passes arm 295b and shaft 295 returns under the pull of spring 296 to normal position as determined by engagement of arm 295a with latch 294 which has returned to upper, latching position. Accordingly, link 206 also is returned to normal position.

When latch 88 releases disk 42, the latter is free to resume rotation counterclockwise in the same direction as when it rotated to load position. The return of shaft 38 is at 60 R. P. M. since solenoid 157 was again energized and solenoid 156 deenergized at 100° of the cycle, as explained previously.

When shaft 38 reaches its home position, pin 71 is engaged by the restored detent 70 to stop the shaft while driving disk 56 continues its rotation until toggle switch 164 (which is in circuit A) is opened at about 350° of the cycle when operating bar 100 is restored, as will be explained later.

When shaft 38 reaches home position, commutator brush 216d reengages contact plug 210d to reestablish circuit B which in turn makes circuit B'. The latter circuit now energizes solenoid 242 (Figs. 6 and 7) to release latch 243 from slot 244 of operating bar 100. The bar however remains locked in position by latch 106 which is not released until about 350° of the cycle.

The reason for latching arm 183 in down position may now be explained. When operation of handle 93 caused bar 111 to release detent 70, shaft 38 began rotating and disk 180 movable with the shaft depressed arm 183 to move knife edge 192 into a notch 200 of load-responsive disk 196. Then when brushes 216b and c engage contacts 213b and c, magnet 91 is energized to move latch 88 into locking engagement with disk 42.

Suppose, however, that latch 88 fails to operate to stop disk 42 due perhaps to a break in the winding of magnet 91 or because the latch nose did not catch the selected notch, or because of some trouble in the latch magnet circuit G. Shaft 38 will therefore continue rotating and each time cam recess 182 of disk 180 passed arm 183, the arm would move in and out of the cam recess and knife edge 192 would move into and out of the notches 200 of disk 196. Each time the knife edge moved out, disk 196 would be released. As a result of repeated engagement and disengagement of the knife edge with the teeth of disk 196, the knife edge, which must retain its sharp edge in order to accurately perform its function would be subject to undue wear. Further, the load may be taken off platform 10 as soon as chart 33 is locked in even pound position. Hence, under above described conditions, each time knife edge 192 released disk 196, the disk would start moving back to zero position. As a result, the knife edge when it was again moved towards the disk, would strike the disk while the latter was in motion. This would injure both the knife edge and the teeth 199 of the disk by blunting or bending the points of the teeth 199 and of the knife edge.

To avoid these undesirable results, arm 183 when once operated is held down by latch 204. Now if latch 88 fails to operate to stop disk 42, it will also fail to close contacts 287 and as a result clutch circuit H will not be made and the disk 298 will not be set in rotation. Accordingly, pins 304 and 305 will not operate link 206 to release latch 204 from arm 183. In its latched position, arm 183 holds knife edge 192 in locking position so that although shaft 38 should continue to rotate without interruption latch 192 does not move in and out of engagement with disk 196.

The reason for routing circuit G of magnet 91 through relay contacts 254a is to prevent more than one recording and registering operation taking place under a single load setting of shaft 38. Relay contacts 254a were closed by circuit E, which was formed when brushes 216a and b engaged contacts 213a and b to first make circuit D. Then circuit D' maintained circuit E closed. After brush 216a rode off contact 213a, brush 216c engaged contact 213c. Circuit G was then made through the relay contacts. This circuit operated magnet 91 to cause latch 88 to arrest shaft 38 in load position. A reading was then taken from the selector disks on shaft 38. At 100° of the cycle, circuits D' and E were broken, opening relay contacts 254a to break circuit G. At 180° of the cycle, latch 88 was retracted to release shaft 38 for return to home position. By the end of the cam cycle, a recording and registering operation will have taken place under control of the reading taken from the disks on shaft 38. Assume, that because of a failure in the driving means of shaft 38, the latter although released, stays in load position with brushes 216b and c still engaging contacts 213b and c. A second cycle cannot be started although shaft 38 maintains its setting because circuit G cannot be made again until relay contacts 254a are reclosed which cannot happen because circuit E cannot be made again until brush 216a now off the leading end of contacts 213a goes all the way around again to re-engage contact 213a. For brush 216a to do this, shaft 38 must depart from its load set position. However, since shaft 38 according to our assumption, stays in load set position although it has been released by latch 88, brush 216a cannot repeat its engagement with contact 213a and hence circuit E cannot be re-established to re-close contacts 254a of circuit G.

Accordingly, circuit G cannot be made a second time when shaft 38 stays in load position and latch 88 cannot be operated to close switch 287 for repeating circuit H. Since the latter circuit is not made, the cam shafts are not re-leased for a second cycle to repeat the reading, recording, and registering operations.

Thus, a condition precedent to the initiation of a cycle by circuit G is the temporary formation of a circuit D by brushes 216a and b to initiate closure of relay contacts 254a in circuit G.

By above construction and arrangement, repeat cycles under a single, maintained setting of shaft 38 are prevented.

The reason for providing two latches 106 and 243 to hold operating bar 100 in advanced position will now be explained. When the bar is operated by depression of handle 93, shaft 38 is still in home position and commutator plug 219d is engaged with brush 221d to cause circuit B' to close and energize solenoid 242. This holds latch 243 in inoperative position. In the absence of latch 106, if the operator should release handle 93 before latch 243 drops down again, there would be nothing to prevent retraction of bar 100. By providing latch 106 to lock the bar independently of latch 243, the release of handle 93 before latch 243 becomes effective does not cause retraction of the bar.

A further duty of latch 106 is to prevent release of bar 100 and its return to home position before the cam cycle is completed and before the operations carried out during the cam cycle are completed. Thus, when the selector mechanism returns to home position before the completion of the cam cycle, the bar 100 is released by latch 243, as explained above.

In the absence of latch 106, the bar would be restored. When this happens, it is possible for the operator to rock handle 93 again to move bar 100 forward before the cam cycle is completed. The forward movement of bar 100 will thereupon cause release of latch 70 from pin 71 of disk 42, permitting movement of the selector mechanism. The disk 180 and bump 202 thereof will thereupon actuate arm 183 to cause knife edge 192 to lock the weighing mechanism in a load position, and the latch 88 may operate again, and a further series of undesirable operations may occur. To avoid these undesirable occurrences, latch 106 is provided, in addition to latch 243. The latch 106 is not released until near the very end of the cam cycle and therefore effectively prevents restoration of bar 100 and a second operation thereof until the cycle is completed. The operation of releasing latch 106 from bar 100 begins at 350° of the cycle.

Thus, by providing the two latches 106 and 243, the former under control of the cyclically operating mechanism (shaft 310, etc.) and the latter under control of the selector mechanism (shaft 38, etc.), bar 100 remains in actuated position until the selecting mechanism is restored to home position and the cam cycle is completed.

The means for releasing latch 106 are as follows: When operating bar 100 is in normal position (shown in Figs. 6 and 7a) the tooth 105 of latch 106 is held by spring 107 against the lower edge of the operating bar. Below the tooth 105, the latch is formed with a transversely or horizontally bent lug 380. At the left side of the lug 380 is located the lower end of a pawl 381 pivoted intermediately at 382 to a vertically slidable link 383 and connected by a spring 384 to the link.

Figure 7A:
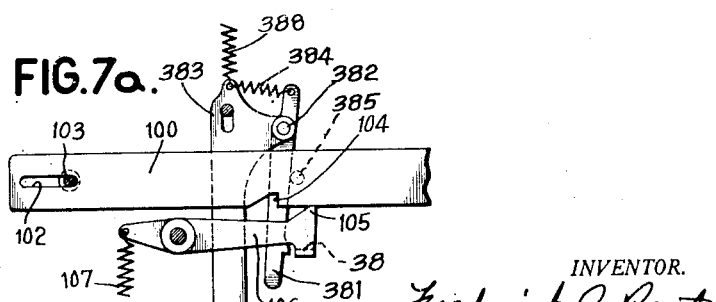
Fig. 7a is a detail of the operating bar in initial position.

The spring tends to rock the pawl 381 counter-clockwise. In the initial position of the operating bar, a pin 385 on the bar is engaged with the side of the pawl and holding the pawl to the left against resistance of spring 384 so that the lower end of the pawl is clear of the side of lug 380. Link 383 is pivoted at its lower end to a lever 386 (Figs. 6 and 27) which follows the periphery of latch trip cam 387 on shaft 310. To the upper end of the link 383 is connected a spring 388 which urges the link upwardly and holds lever 386 against cam 387. As indicated on the timing diagram, Fig. 28, the latch trip cam 387 has a high dwell portion from the beginning of the cam cycle till 170°, then begins to recede. When engaged with high portions of the cam 387, lever 386 and link 383 are depressed and consequently pawl 381 is initially in lower position, shown in Figs. 6 and 7a. Now when operating bar 100 is advanced to initiate operations, then pin 385 departs from pawl 381 and spring 384 rocks the lower end of the pawl against the vertical side of lug 380 of latch 106. When bar 100 has been fully advanced, spring 107 snaps latch tooth 105 into notch 104 to lock the operating bar in advanced position. The pawl 381 is still engaged with the side of lug 380. At 170° of the cam cycle, cam 387 starts to recede and consequently spring 388 raises link 383 and its pawl 381 until at 220° of the cycle (see Fig. 28), the pawl 381 is fully raised and as shown in Fig. 7, spring 384 has moved the lower end of the pawl above the top of lug 380 of the latch 106. The pawl remains in this position untitl 345° of the cycle have elapsed and then cam 387 starts to rise and consequently depresses link 383 and its pawl 381.

As the pawl descends, its lower end abuts the top of lug 380 and starts to rock the latch 106 downwardly. At about 357° of the cycle, the latch tooth 105 clears notch 104 of bar 100. In this manner, at the end of the cam cycle, after all the other cycle operations have been accomplished, latch 106 is released from bar 100. This makes it impossible to return bar 100 and operate it again until after the cycle is completed.

When latch 106 releases bar 100, it is free to return provided the selecting mechanism on shaft 28 has returned to home position and released latch 243. Only when both latches have been released is the bar 100 free to return automatically under the impulse of spring 99.

As the bar returns, pin 385 re-engages the side of pawl 381 and releases its end from the top of lug 380. Spring 107 thereupon raises the latch against the lower edge of bar 100 and the top of lug 380 passes the lower end of pawl 381. The pawl then engages the side of the lug. Thus, by releasing the pawl from lug 380 when bar 100 has returned, latch 106 is freed for re-latching the bar upon the next operation of the bar.

*Fixed indicia printing*

Figure 1B:
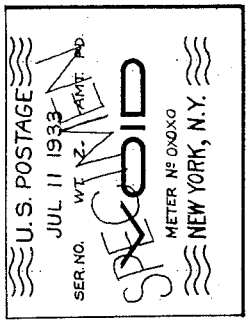
Fig. 1b is a void or invalid stamp issued by the machine.
Figure 1A:
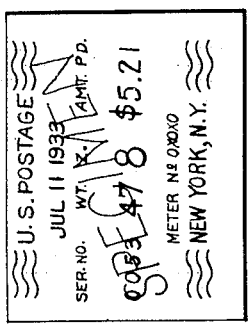
Fig. 1a is a specimen valid postage stamp issued by the machine.

Fig. 1a shows a valid stamp regularly issued by the machine. The first line of the stamp reads U. S. Postage, the next gives the date, the third line has the headings Ser. No., Wt., Z., and Amt. Pd. Under these headings are printed the serial number of the stamp, and the weight, zone, and postage of the load. This is followed by the meter number and the post-office district. The weight, zone, postage, and serial number of the stamp comprise the variable data dependent on the amount of load, the zone, and the order of the stamp in a series. The remaining items comprise the classifying or fixed data independent of the zone or load.

In Fig. 1b a void or invalid stamp is shown. In place of the variable data, the invalid stamp bears the imprint Void.

While a reading is being taken from the selector disks, the fixed or classifying data imprint is made on a stamp blank which was fed into printing position during the preceding stamp issuing operations.

The means for printing the classifying or fixed indicia comprises a sub-frame 390 at the upper end of which is secured a carrier block 391 bearing fixed type for printing U. S. Postage and the headings Ser. No., Wt., Z., and Amt. Pd. (see Figs. 26, 27, 29 and 30). Between these items, block 391 has an oblong hole 392 in which are set four date printing blocks 393 (Fig. 31) one for the year, another for the month, a third for tens of days, and the fourth for units of days. With each machine is supplied one or more year blocks; twelve month blocks, one for each month; four tens of days blocks, one being blank and acting merely as a spacer, and the other three for printing "1", "2", and "3" in the tens order of the day; and ten units of days blocks, one for each of the digits 0 to 9.

At the beginning of each day, the operator selects the four proper date blocks 393 and sets them in hole 392 of carrier block 391. When set in position, a shoulder 394 on each block rests on a shoulder 395 formed in block 391 near the upper end of hole 392. The sides of the hole and the coacting shoulders hold the four selected date blocks squarely in position, with holes 396 therein in alinement with holes 397 through the sides of block 391. A pin 398 is then inserted through the alined holes to releasably lock the date blocks to the carrier block, in position for printing (see Figs. 26 and 32).

The carrier block also has near the front end a dovetail slot 399 in which is inserted a correspondingly shaped type block 400 having type for printing the meter number and the post-office district, as New York, N. Y. for example (Fig. 33). The block 400 may be removed and replaced by another with different post-office indicia.

Between the type for printing the headings of the variable data and the meter number block 400, carrier block 391 has an oblong slot 401 in which is vertically slidably guided a type block 402 (Fig. 34) bearing type for printing Void. Journalled on block 391 is the end of a shaft 403 which is provided at opposite sides of the block with crank arms 404 slotted to receive pins 405 extending from the sides of the void printing block. A plate 406 is secured to the top of block 391 by screws 407 which also thread into the top of block 400 to secure the latter against sidewise shifting. Plate 406 has a portion overlying the top of the void block 402 and spaced therefrom. To this portion of plate 406 is fastened the middle of a flat spring 408, the ends of which bear on the top of the void block and tend to depress it into printing position with its type in the same plane as the type of the carrier block, the date blocks, and the meter number and post-office block. However, the normal position of the void block is up with its type removed to a plane above the printing plane to prevent an impression being taken therefrom. The normal inoperative position of the void block results from the fact that shaft 403 is under normal operating conditions at its clockwise limit (Figs. 26 and 32). Only under certain conditions to be described later is shaft 403 rocked counterclockwise to positively cause the void block to be lowered to operative printing position. Spring 408 merely serves to hold the void block steady after it has been lowered by crank arms 404 and to take up the play in the slotted connection between the crank arms 404 and pins 405 of the void block upon a printing operation.

Below the above-described type blocks, sub-frame 390 carries a horizontally disposed paper guide plate 410 cut out for the greater part and under which the stamp blank or paper to receive the imprint is positioned. Above guide plate 410 are two folds of an ink ribbon 411. The ink ribbon extends downwardly from one of the two ribbon spools 412 at the side of the machine (see Figs. 14 and 36) passes around a guide roller 413, then under a ribbon guide plate 414 rigidly extending from the sub-frame 390, over the guide plate 410, around a roller 415 carried by the front and back of the sub-frame, then back again over plate 410, under plate 414, around the other guide roller 413, and upwardly to the other ribbon spool 412 (see Figs. 26, 27, and 36). The ribbon is fed once per cycle of cam shaft 310 by means actuated from the cam shaft. The particular means for feeding the ribbon will not be described herein as it is not made part of the present invention and may be replaced by any other suitable ribbon feed. The arrangement of the ribbon spools, one above another, and at one side of the machine is believed new and part of the invention, and has the advantage of economizing on the horizontal room required for locating the ribbon mechanism with respect to the printing means.

Beneath paper guide plate 410 is a pair of platens 418 and 419, the former being below the type "U. S. Postage," the date blocks, and the headings for the variable data and the latter being below the void block and the meter number and post-office block. The platens move simultaneously and are merely separated for convenience of manufacturing and assembly and also to render unnecessary the exact alinement of the platen and type blocks over the entire area in which the fixed indicia printing occurs. Each platen has a long depending pin 420 at each end which is slidably mounted for vertical movement in a vertical sleeve 421 extending upwardly from the base of sub-frame 390.

Compression springs 422, surrounding the fixed sleeves 421, engage the bottoms of the platens and urge the latter upwardly to strike the fixed indicia type. Also depending from the platens are ears 423 from which pins 424 extend horizontally. These pins are engaged at the top by the three branches 425 (Fig. 35) of the right hand arm of a bell crank lever 426. The other arm of lever 426 is engaging a cam 427 on cam shaft 310 (see Figs. 6, 35 and 36). When the lever is on a high point of the cam, the ends of branches 425 engage the pins 424 to hold the platens down against operation by springs 422. Between the twenty and thirty degree points of the cycle, just before the completion of the forward stroke of the reading mechanism, cam 427 allows the left end of lever 426 to drop abruptly, causing the lever to rock counterclockwise (Fig. 36) and springs 422 to move platens 418 and 419 upwardly. The platens thereupon impel the stamp blank against the ink ribbon and the fixed indicia type to receive the fixed indicia imprint therefrom.

The cam then causes the platens to recede from the uppermost print-effecting position only sufficiently to permit unimpeded advance of the stamp blank but so as to provide a restricted, guide-way in conjunction with paper guide plate 410 for the stamp blank. The platens stay in this position until about 200° of the cycle, when they are restored to lower position.

After receiving the fixed indicia imprint, the partially completed stamp is fed towards the variable indicia printing means and in this operation, a new stamp blank is fed to the fixed indicia printing means.

The feeding means advances the partially printed stamp blank while the platens 318 and 319 are still near the upper limit of their movement so that the platens serve in conjunction with the paper guide plate 410 to guide the paper as it is fed out of the fixed indicia printing position.

*Feeding mechanism*

The stamp blanks are cut from a narrow web of paper gummed on the reverse side to facilitate attachment of the stamp to a parcel. As indicated in Fig. 2, the web is supplied as a roll 430 contained in a bracket and housing 431 rigidly hung from the bottom of the machine base. Referring to Figs. 9, 26, 27 and 32, the paper from the supply roll is led over guide rollers 432, into the interior of the machine, over a large roller 433, a small guide roller 434, between guide plates 435, and into the grip of upper and lower feed rollers 436. The rollers 433, 434 and 436 and the guide plates are carried by the sub-frame 390. One end of shaft 437 of roller 433 projects beyond the side of the roller and rotatably carries a bushing 438 formed with a three-toothed ratchet disk 439 and a pinion 440. Shaft 437 rigidly carries a gear 441 to the side of which is pivoted a dog 442 held against ratchet-toothed disk 439 by a bent spring 443 secured to the side of gear 441. Pinion 440 of bushing 438 is meshed with a rack bar 444 guided for vertical sliding, movement in a frame block 445 carried by the base of the machine. The back of the rack bar has a pin and slot connection 446 with one end of the bell crank lever 447 pivoted to the frame block. The other end of lever 447 rides in a box-cam 448 on cam shaft 310 (see Figs. 6, 27, 32, and 36).

At 60° of the cycle and after the fixed indicia printing operation is completed, cam 448 rocks lever 447 counterclockwise (Fig. 36), thereby depressing rack bar 444 to rotate pinion 440 and its bushing 438 clockwise (Fig. 32). Ratchet toothed disk 439 thereupon, acts on dog 442 to rotate gear 441 one-third of a revolution. When cam 448 subsequently restores rack 444, ratchet disk 439 rotates counterclockwise and simply rides past dog 442 without imparting rotation to gear 441. Each reciprocation of rack bar 444 therefore causes rotation for one-third of a revolution to gear 441 which is on shaft 437 of roller 433. Gear 441 meshes with a pinion 450 on the lower feed roller 436 which in turn is geared at each end to the upper feed roller 436. The feed rollers 436 are thus positively driven for slightly more than a single revolution at each operation of rack bar 444. To prevent retrograde movement of the feed rollers, shaft 403 which actuates the void printing block rotatably carries, at opposite sides of block 391, a pair of pressure arms 451 which bear at their outer ends on the flat sides of nuts 452 fixed to the shaft of the upper feed roll 436. A spring 453 is connected to each pressure arm to hold it against the nut 452 engaged thereby.

Feed rollers 436 advance the partially printed stamp, bearing a fixed indicia imprint, through a slit 454 in sub-frame 390, past knife blades 455 and 456, and to variable indicia printing position between a pair of guide shields 457 and 458 located above the variable indicia printing platen 459 (see Figs. 9 and 26).

In feeding the partially printed stamp blank to the variable indicia printing position, the next blank is fed into fixed indicia printing position ready for the succeeding cycle of the machine.

Before explaining the variable indicia printing means, the means for setting this printing means in accordance with the reading taken from the stepped, selector disks will be described. This involves an explanation of the meter, generally denoted as MR. in Figs. 1, 2 and 63.

The meter

The meter will be explained with particular reference to Figs. 9, 14, 26, 37, and 38. The meter is a self-contained, separately assembled unit and is bodily removable and insertable as a whole from the rest of the machine. The casing 35 of the machine has an opening 460 through which the meter is inserted into the interior of the machine. The frame of the meter comprises two side plates 461 and 462 and a front and top cover 463, the top forming a continuation of the top of machine casing 35 when the meter is in place.

Side plates 461 and 462 journal between them a cam shaft 465, the left end of which (Fig. 38) extends past side plate 461 and is provided with a coupling element comprising a normally vertically disposed tongue 466 provided with a groove 467 at the bottom (see Figs. 39 and 40). When inserting the meter into the machine, it is moved vertically down through opening 460 of casing 35. As the meter moves down, tongue 466 slides into a normally vertically disposed socket 468 carried by the outer end of short, supplementary cam shaft 315 (see also Fig. 6) and the groove 467 engages the sides of a stud 469 extending from shaft 315 and located at the lower end of socket 468. By above means, when the meter is inserted in the machine, its cam shaft 465 is coupled directly to cam shaft 315. When the latter is set in rotation for a one-revolution cycle, in the manner previously explained, then the meter cam shaft is likewise set in operation for a single revolution cycle.

The meter when inserted in the machine is located in proper position and releasably locked in place by the following means:

Side plates 461 and 462 journal between them upper and lower shafts 470 and 471. These shafts extend at opposite ends past the side plates to the outside of the meter frame. When the meter is moved down into position, the exteriorly projecting ends of shafts 470 and 471 move into sockets 472 and 473 and come to rest on the bottoms of the sockets. Sockets 472 are provided on machine side frame plate 31 (see Fig. 6) and sockets 473 are provided on machine side frame plate 282 (see Fig. 9). After the shafts 470 and 471 are seated in sockets 472 and 473, the meter is locked in inserted position by the following means:

The externally projecting ends of shafts 470 and 471 rigidly carry cam hook latches 474. By means which will be described later, shaft 470 is rocked counterclockwise and shaft 471 rocked clockwise (Fig. 26) after insertion of the meter. The latches 474 thereby move under studs 475 projecting from frames 31 and 274 and located directly below the sockets 472 and 473, respectively carried by said frames. As the latches move beneath studs 475, the inner eccentric surfaces of the latches cam against studs 475 to draw the projecting ends of shafts 470 and 471 firmly against the bottoms of sockets 472 and 473, thereby positively and firmly locking the meter in inserted, operative, position.

Insertion of the meter also moves plug pins 477 and 478 carried by side plate 461 into a plug receptacle 479 to engage the bent ends of spring blade contacts 480 and 481 located in the receptacle (see Figs. 6, 22, 37, and 38). This connects the meter wiring into the motor control circuit to prevent motor operation unless the meter is first locked in position as will be hereinafter explained.

The meter has six slides 483 (Figs. 9, 14, 26 and 41) disposed in parallel vertical planes and having their forward or right hand ends (Fig. 26) extending exteriorly of the meter past the rear end of the latter. The slides are mounted for horizontal slidable movement. For this purpose, they pass near their forward ends through guide apertures in a cross bar 484 extending across the side plates 461 and 462 and are formed at the rear with horizontal slots 485 through which a shaft 486 journalled between the side plates passes.

When the meter is not in the machine, all its parts are in normal position. The normal position of slides 483 is their rear position, shown in Figs. 14 and 29. The externally projecting ends of the slides are formed with slots 487 open at the bottom.

When the meter is out, the parts of the machine proper are also in normal positions. The normal position of control pins 349 of the six arms 340 (Figs. 14 to 17) is their rear position, as previously explained in the description of the reading mechanism.

As the meter is moved down for insertion in the machine, slots 487 move over pins 349, the lower ends of the slots being flared to facilitate reception of the pins. When the meter is locked in inserted position, the sides of the slots are closely engaged by the sides of the pins 349. Each of the six slots is thus coupled for operation to one of the control pins 349 of the reading mechanism. During the reading operation, arms 331 and 340 moved forward till the sensing fingers 333 (Figs. 9, 15, 16, 17, and 17a) engaged steps 262 of selector disks 47, 48, and 67 on shaft 38. The pins 349 of arms 340 also moved forward and in so doing moved their coupled slides 483 to the right (Figs. 26 and 41).

At 50° of the cycle, the pins 349 were fully locked in their differentially set positions while arms 331 and fingers 333 were fully restored. Since pins 349 are locked in differential position, slides 483 are also locked in similar positions. As explained previously, pins 349 move 0 to 9 step equivalents for values 9 to 0 of the control steps 262 of the selector disks. Thus, slides 483 will be set in 0 to 9 differential positions for values 9 to 0.

Each slide has an integral, depending finger 488 provided with a substantially vertically disposed, elongated slot 489. Paired with each of the six slides 483 is one of six rack arms 490.

Each arm 490 has a pin 491 extending from its side into the slot 489 of the paired slide.

Each rack arm 490 is pivotally carried by a companion sector 492, being connected at its lower end by pivot pin 493 to arm 494 of the paired sector. There are six such sectors since there are six rack arms. The sectors are all rotatably mounted on a shaft 495 supported between the meter side plates. Each sector is formed at its lower end with rack teeth 496 meshed with a pinion 497 rigid with a type wheel 498. There are six such type wheels, one to each sector, and all the type wheels are rotatably carried by a shaft 499 journalled in the sides of a cross frame 500 secured to the meter side plates at the lower and front end of the latter (see Figs. 26 and 38). As viewed in Fig. 38, the first wheel 498 at the left is the tens order weight printing wheel, the next one is the units order printing wheel, the third from the left is the zone printing wheel, the fourth is the dollar printing wheel with each of its digit type preceded by a dollar sign type character, the fifth from the left is the dimes printing wheel with each digit type preceded by a decimal point type character, and the sixth is the cents printing wheel.

When the meter is out of the machine, the fixed indicia printing means as well as guide plates 457 and 458 and the ink ribbon 459 to which the partially printed stamp blank has been fed are exposed and accessible to the operator. When the meter is in the machine, type wheels 498 lie above the ink ribbon 459 and the plates 457 and 458 in position to effect printing on the stamp of the items below the headings Wt., Z., and Amt. Pd. already printed on the stamp.

For convenience, the three right hand sectors 492 (Figs. 38 and 42) which control the amount printing wheels will be characterized as sectors D, d, and c indicating that they relate respectively to the dollars, dimes, and cents orders. In addition to the lower rack teeth 496, the three sectors D, d, and c are formed at their upper ends with teeth 502 meshed at spaced points with pinions 503 and 504 relating, respectively, to adding and subtracting registers. Initially, the subtracting register is set by the post-office at a predetermined total, for example, $9999.99. The adding register is initially set at zero and is a total register. Now as the meter operates, the dollars, dimes, and cents sectors operate the subtracting register to subtract the postage of the load from the reading thereon and at the same time the sectors operate the adding register to add the postage. Thus, an observer can tell from the adding register the total postage used up by the machine and from the substracting register how much postage is left for use before the meter must be reset by the post office.

The subtracting and adding registers are of similar construction except that the former has six orders while the latter has seven orders. The register wheels 506 of the subtracting register move in the same direction as the register wheels 505 of the adding register but the numerals on the former are in descending order. Thus, if a subtracting register wheel reads 9 and 7 is entered therein, it will then read 2.

Since the two registers are generally similar in construction and operation, only one, the subtracting register, will be described in detail. Only the three lower orders, the dollars, dimes, and cents orders of a register are operated directly by the sectors 492, the higher orders being operated by a transfer mechanism. It may be noted here that the transfer in the total register takes place when a lower order wheel passes from 9 to 0 while in the subtracting register, a transfer takes place when an order moves the one step from 0 to 9. Otherwise the transfer operation is the same in both cases.

Referring particularly to Figs. 43 and 44, the subtracting register will be described in detail. Each of the three lower orders comprises a cup-shaped indicating wheel 506 fast to the right side of a carrier disk 508. Fast to the left side of the carrier disk is a smooth round transfer disk 509 the periphery of which is intercepted by a single notch 510. To the left side of disk 509 is secured a Geneva tooth element 511 having two teeth and a notch between them which is in line with the notch 510 of the transfer disk. Carrier disk 508 has a wide hub collar 512 which is rotatably mounted on a hub sleeve 513 in turn rotatably carried by the common, stationary shaft 514 fixed at opposite ends to the meter side plates. The right hand end of hub sleeve 513 extends beyond the end of collar 512 and rigidly carries a gear 515 having twenty teeth. The left end of sleeve 513 extends past the left side of collar 512 and is integral with a ratchet wheel 516. Rotatably mounted on collar 512 adjacent the base of the cup-shaped indicating wheel 506 is a ratchet wheel 517. Between the latter and gear 515 is the pinion 504 operated by teeth 502 of operating sector 492. Pinion 504 and ratchet wheel 517 are rigidly connected to each other to rotate together.

For convenience, the rigidly connected disks 506, 508, and 509 may be termed the indicating unit, ratchet wheel 517 may be termed the internal ratchet while ratchet wheel 516 may be termed the external ratchet. Pivotally carried by the base of indicator wheel 506 is a pawl 518 pressed by a hair spring 519 between the pawl and 518 against the teeth of the internal ratchet. A similar pawl 520 is pinned to disk 509 and pressed by hair spring 521 against the external ratchet. Referring to Figs. 43 to 48, each pawl is cut away adjacent its carrying member to provide a shoulder 522. Passing through alined holes 523, 524, and 525, respectively in elements 506, 508 and 509 is a triangular cam piece 526. Holes 523 and 525 are oblong to prevent sidewise motion of cam piece 526. Cam piece 526 extends past the oblong holes and its base rests at its ends on the shoulders 522 of the two pawls 518 and 520. With the pawls fully engaged in the teeth of their ratchets, the apex of the cam piece is appreciably spaced from the upper or outer ends of the holes and is free to rock its own plane but is restrained against movement transversely to its plane by the sides of the oblong holes 523 and 525.

The operating rack sector teeth 502 mesh with pinion 504 to rotate the latter and the internal ratchet 517 counterclockwise (as viewed in Fig. 44). Pawl 518 is engaged with a tooth of the internal ratchet and counterclockwise rotation of the latter is communicated through the pawl 518 to the rigidly connected indicator unit.

During this operation of the indicator unit, pawl 520 also moves with the indicator unit and rides over the teeth of the external ratchet which is at the time being held stationary by the transfer gearing as will be later explained. As pawl 520 rides over the teeth of the external ratchet, it is lifted as it passes the crest of a ratchet tooth and its shoulder 522 lifts its end of the cam piece 526, rocking it about the shoulder 522 of the other pawl 518. This position is shown in Fig. 47. The rocking of cam piece 526 is not interfered with by the walls of the alined openings 523, 524, and 525.

Referring to Figs. 26 and 44, transfer pinions 528 one for each order except the cents order are rotatably carried by a bail shaft 529. Each pinion is formed with four wide teeth 530 extending the full width of the pinion and intermediate each pair of the latter teeth, the pinion has four short teeth 531 extending less than the full width of the gear. The long teeth contact at the right hand end (Fig. 45) with the smooth periphery of disk 509 of one order and at the other end mesh with transfer gear 515 of the next higher order. The shorter teeth 531 do not engage disk 509 but are along a plane which includes the path of the Geneva transfer element 511 and also mesh with transfer gear 515. The latter as previously stated, has twenty teeth and the transfer pinion 528 has a total of eight teeth, four long teeth 530 and four short teeth 531. The periphery of disk 509 as the latter rotates rides between two long teeth 530 of the transfer pinion, thereby holding the latter against rotation. As a result, the transfer pinion, being meshed with transfer gear 515 also holds the latter and the external ratchet stationary.

Now, when a descending register order passes from 0 to 9, the notch 510 of disk 509 comes opposite the lower one of the two long teeth 530 engaged with the disk and the Geneva tooth element 511 engages a short tooth 531 and rotates the pinion 528. During this rotation, the long tooth 530 moves into notch 510, permitting rotation of the pinion 528 through two teeth before the long tooth moves out of the notch and again rides on the periphery of disk 509. The transfer operation results in rotation of pinion 528 through two teeth and when disk 509 has reached its 9 position after moving one step from 0, the long teeth 530 again engage the periphery of the disk to hold the transfer pinion stationary.—Thus far, this is ordinary Geneva transfer means.—As pinion 528 is rotated two teeth, its teeth being in mesh with the teeth of the gear 515 of the next higher order also rotates the latter through two teeth. Being rigidly connected to the external ratchet 516 of its order, the rotation of gear 515 is transmitted to the external ratchet. The pawl 520 coacting with this ratchet is then fully seated in a ratchet tooth so that rotation of the latter is communicated through pawl 520 to the indicating unit. This results in rotating the indicating unit one step, from one indicating numeral to another. The transfer operation is then complete.

During this transfer from a lower to a higher order, the pinion 504 and the internal ratchet of the higher order are stationary because their operating sector 492 is then stationary, as will be later brought out.

Pawl 518 which moves with the indicating unit of the higher order as the latter is operated by the transfer therefore rides over the teeth of the internal ratchet, tilting the cam piece 526 in the opposite direction to that shown in Fig. 47 without interfering with the movement of the register order.

The function of the cam piece 526 is to prevent overthrow during either the entering or transfer operations into the indicating unit. Its chief utility in the present case, is in relation to the transfer operation. Thus, the transfer gear 515 when it has completed its transfer movement will be stopped positively and accurately by engagement of its operating pinion 528 with disk 509 of the lower order. Disks 506, 508, and 509 constituting the indicating unit of the higher order which has been advanced by the transfer operation, tend due to momentum to continue their rotation beyond the one transfer step. At the time this overthrow rotation begins, however, the external ratchet is stationary because its rigidly connected gear 515 is then stationary. Also the internal ratchet wheel is stationary because its operating sector 492 is then stationary. When the indicating unit rotates with both of its associated ratchet wheels stationary, both pawls 518 and 520 simultaneously ride up on the teeth of the ratchet wheels engaging them and rise. As they do this, their shoulders 522 evenly lift cam piece 526 and before the pawls succeed in passing the crest of the ratchet teeth the crest of cam piece 526 contacts the upper or outer end of opening 524 in disk 508. This stops further rise of the cam piece, as shown in Fig. 48. This, in turn stops rising movement of the pawls and prevents their riding over the teeth of their ratchet wheels. Hence, overthrow of the indicating unit due to its own momentum, after the transfer action is completed, is eliminated.

In a similar manner, during the entering operation, when a rack sector 492 stops, the indicating unit may tend to continue rotation due to momentum. As both the internal and external ratchets will then be stationary, the overthrow of the indicating unit is prevented. However, additional means are provided for preventing overthrow on the entering operation, as will be explained later.

The descending and ascending registers are generally similar but differ in these respects: The carrier disks 508 of the descending register are smooth while the carrier disks 508a of the ascending register have ten ratchet teeth (see Figs. 26 and 38); the transfer pinions 528a of the ascending register are not mounted on a rock or bail shaft but are mounted on a fixed shaft 533; the descending register numerals run in descending order while the ascending register numbers are in ascending order; the transfer in the descending order is effected when a lower order passes from 0 to 9, and in the ascending register when the lower order passes from 9 to 0.

The orders of each register above the dollars order are not operated by the rack sectors 492, as previously stated. Each of these higher orders is operated only by transfer mechanism. As indicated in Fig. 43, each such higher order comprises an indicating cup-shaped number wheel 506' in the descending register (505' in the ascending register) rigidly connected to one side of the flange 535 of a hub 536 rotatably mounted on shaft 514. Fast to the other side of flange 535 is a Geneva transfer disk 509 having a notch 510 and a Geneva tooth element 511 similar to the corresponding elements in the three lower orders. The right hand end of hub 536 rigidly carries a transfer gear 515 which is in mesh with the transfer pinion 528 of the preceding, lower order.

When the lower order, for example, the dollar order passes through a transfer step (9 to 0 in the ascending and 0 to 9 in the descending register), its Geneva transfer disk 509 and its Geneva tooth 511 operate the pinion 528' which in turn rotates gear 515 of the next higher order, the tens of dollars order. Rotation of gear 515 rotates the rigidly connected hub 536, number wheel 506', and transfer disk 509 of the tens of dollars order. Since all these latter parts are rigidly connected, when the transfer pinion 528 stops at the end of its transfer movement, it positively arrests movement of gear 515, hub 536, disk 509, and number wheel 506'. Thus, in the higher orders, above the dollar order, there is no tendency to overthrow.

In the three lower orders, the indicating unit cannot be directly rotated by either the transfer or entering gear because the entry effecting sector 492 has a forward or entering stroke and a reverse, restoring stroke and it is necessary to prevent rotation of the register on the reverse stroke. Further, if the transfer pinion were directly geared to the indicating unit, it would prevent entering operation of the sector 492 as it would be fixed against rotation during entry operations. For these reasons, the ratchet drives were provided in the three lower orders and the overthrow preventing means devised.

The means for operating rack sectors 492 according to the differential positions taken by slides 483 during the reading operation will now be explained, with particular reference to Figs. 26, 38, and 41. As previously described, slides 483 have depending fingers 488 with slots 489 engaging pins 491 of rack arms 490.

Initially, each pin 491 is at the upper end of its slot 489. When a slide 483 is moved to the right (Fig. 26), the sides of slot 489 cam against pin 491 to rock arm 490 clockwise about pivot 493 connecting it to rack sector 492. If a slide is moved 0 to 9 steps to the right resulting from readings of 9 to 0 then arm 490 will be rocked 0 to 9 steps through distances proportional to the movements of the slide. Rack arm 490 is thereby set at different inclinations with respect to its initial position. The rack arm has nine notches 540 corresponding in value, from top to bottom, as marked alongside the notches, to 9 to 1 values. Slide 483 does not move from home position for a 9 value and therefore rack arm 490 will remain in home position, shown in Fig. 26. In this home position, its uppermost notch 540—9 is in the path of movement of the tooth end 541 of an arm 542 of a three-armed lever 543. When slide 483 moves one step for an 8 value, then arm 490 will be moved to an angular position in which the second notch 540—8 will be in position to catch tooth end 541. Similarly, for movements of slide 483 through 2 to 8 steps corresponding to values 7 to 1, the associated arm 490 will be moved to angular positions in which its notches 504—7 to 1 will be engaged by tooth end 541. When slide 483 moves 9 steps corresponding to a 0 value, then arm 490 will occupy an angular position such that tooth end 541 when moved towards it will pass freely beneath the lower end 544 of the rack portion of arm 490.

In Fig. 41, slide 487 has moved 5 steps for a 4 value and positioned arm 490 at an angle such that its notch 540—4 is engaged by tooth end 541 when lever 543 is rocked clockwise.

There are six each of slides 483, arms 490, and sectors 492. These are also six levers 543, each for coaction with a different arm 490. Levers 543 are rotatably mounted on shaft 495 which also rotatably carries sectors 492 (see Figs. 26, 41, and 42). Each lever 543 has an arm 545 provided with a follower roller 546 at its outer end which is engaged with a cam 547 rigid on cam shaft 465 (see Figs. 42 and 49). Springs 548 individually connected to arms 549 of the levers urge them counterclockwise to maintain their followers 546 in contact with cams 547. There are three pairs of these cams, making six in all, one for each lever 543. The contours of the cams of each pair are alike. To distinguish the various members such as 483, 490, 492, 543, 547, etc. from each other, their reference characters will be suffixed by a character indicative of the printing wheel controlled or operated thereby. Thus, the cam 547 for operating the cents wheels will be denoted as 547—c and the duplicate cam which operates the tens of lbs. wheel will be denoted as 547—W. Similarly, duplicate cams 547—d and 547—w respectively operate the dimes and units weight wheels, while duplicate cams 547—D and 547—Z, respectively operate the dollars and zones wheels.

Referring to Fig. 49, maximum rise of each of these cams is the same but the rises of the three pairs begin at different points around the cam shaft 465. The rise of each of duplicate cams 547—c and W begins at about 52° from 0 position, the rise of duplicate cams 547—d and w begins 65° later at 117°, and the rise of duplicate cams 547—D and Z 65° later than the previous cams or at 182°. The rise of each cam occupies 42° 30' of the cycle. Then there is a short dwell of about three degrees followed by a drop of about three-and-a-half degrees.

Following the short drop, each cam has a high, concentric, dwell portion. The dwell portions of each pair of cams while of different lengths, all terminate at the same point, namely at 252° of the cycle. After the dwell portions, each of the cams has a drop succeeded by a low dwell portion.

The reading operation is completed at 50° of the cycle, as previously explained. At this point of the cycle, slides 483 will therefore have set the six arms 490 each with a tooth 540 corresponding to the value taken from one of the six selector disks 47, 48, 67D, d, c, and Z in position to be engaged by the tooth end 541 of one of the six levers 543. At 52° of the cycle, cams 547—c and W begin to act on levers 543—c and W and during the next 42° 30' rock these levers clockwise. As the levers move clockwise, their tooth ends 541 will engage the notches 540 of arms 490 at different points of the cycle, depending on the angular positions of the arms which in turn determine which of their notches are in operative positions to intercept the tooth ends 541. The first portion of the movement of a lever 543 is lost motion taken up in bringing its tooth end to a 9 position. Thus, assuming a notch 540—9 of an arm 490—c to be in operative position, it will then be fully engaged by a tooth end 541 at the end of this lost motion. As the cam rise continues, the lever 543 now having its tooth engaged with a notch 540—9 of an arm 490—c moves further clockwise and actuates the arm downwardly. Arm 490—c being connected to rack sector 492—c, its actuation causes clockwise rocking of the rack sector against resistance of a spring 550 connected to the sector. Lower teeth 496 of the sector 492—c will then rotate the associated pinion 497 and printing wheel 499—c. The upper teeth 502 of the sector will at the same time rotate the associated pinions 503 and 504 of the cents orders of the ascending and descending registers.

Arm 490 being engaged at one point by tooth end 541 of lever 543 and connected at another point to sector 492, will be constrained to move concentrically of shaft 495 which mounts the lever and sector. Accordingly, pin 491 will move in an arc concentric of shaft 495. Slot 489 in which the pin moves is therefore curved generally concentric to shaft 495. The slot is narrow at the upper end to closely engage pin 491 and flares out towards the bottom. During the setting of arm 490, pin 491 is at the upper narrow end of the slot where it remains until the lever 543 starts actuating the arm. As a result of pin 491 having its initial position at the narrow upper end of the slot, the pin will have no play during the setting operation and arm 490 will be accurately positioned according to operation of slide 483. Further, when lever 543 strikes arm 490 preparatory to actuating it downwardly, the force of the engagement tends to move the arm to the right. Should the arm be free to move to the right, then before the arm rebounded, the tooth end 541 may have passed the proper notch 540 and may catch an incorrect notch which would result in an error in the register entry and printing operation. However, this error is prevented because arm 490 is positively held against lateral movement when engaged by tooth end 541 because at that time the pin 491 is still in the narrow upper end of slot 489.

However after arm 490 is fully engaged with a lever 543, it must be free to move concentrically of shaft 495 unimpeded by binding between pin 491 and slot 489. By flaring the slot towards the bottom while curving it concentric to shaft 495, the pin is free to move concentrically of the shaft without binding.

Levers 543c and W are now moving clockwise to cause clockwise rocking of sectors 492c and W. Sector 492c is entering the value corresponding to the notch 540 engaged by the lever 543c into both the descending and ascending registers. The entry operation of both registers being the same, only that of the descending register need be explained in full. As pinion 504 is rigid with internal ratchet 517, rotation of the pinion by sector 492 will correspondingly rotate the internal ratchet. Initially as indicated in Fig. 44, the abrupt side of a tooth of the internal ratchet wheel is spaced from the nose of its coacting pawl 518. Thus, the initial movement of the internal ratchet wheel takes up this clearance after which it operates through the internal pawl to rotate the indicating unit. The initial portion of the rise of the actuating cam 547 has been utilized to produce the lost motion of the arm 543 and the operation of the internal ratchet to take up the clearance between the flat side of the effective tooth and the pawl. The rise of the actuating cam 547 then has an entry-effecting portion which may be considered as divided into nine equal, successive, differential steps. This entry portion of cam 547 causes arm 543 to drive the rack sector and the indicating unit actuated thereby through nine steps, assuming a notch 540—9 to be engaged by arm 543. As a result, a 9 will be entered in the indicating unit. As the indicating unit moved the steps corresponding to the value entered, it moved its external ratchet pawl 520 along with it. Since the external ratchet 516 is now stationary, the external pawl will ride over the teeth of the external ratchet.

In order to make certain that the external pawl will not stop on the point of the last tooth traversed thereby but will fully seat in the proper tooth, the indicating unit and thereby the external pawl are given an overthrow movement by an additional rise of cam 547 following the entry portion of the cam. As a result, the external pawl positively passes into the proper tooth notch of the external ratchet so that during a transfer operation to the indicating unit from the next lower order upon a subsequent machine cycle, the external ratchet will not skip a step but will engage the external pawl to move the indicating unit for the full transfer stroke.

If instead of a notch 540—9 being in operative position, a notch 540—8 is in position, then the tooth end 541 of a lever 543 will enter the latter notch one step later and will cause entry of an 8 in the indicating unit. Similarly if notches 540—7 to 1 are in operative positions, the lever 543 will start entry operation of the sector and indicating unit after 2 to 8 steps of the entry portion of the cam rise have passed the follower of the lever 543 and values 7 to 1 will be entered. Should arm 490 be in the limiting, 0, position, then tooth 541 will pass beneath edge 544 of the arm and will not move it at all.

During this entry operation, should the cents order of the descending register move the descending step from 0 to 9, then its Geneva transfer disk 509 and tooth 511 will rotate the associated Geneva pinion 528 which will in turn operate the carry-over gear 515 of the dimes order to rotate the latter order one step and subtracting 1 therefrom.

While the cents order is being operated by sector 492—c under control of cam 547—c, the duplicate cam 547—W is causing its associated sector 492—W to rotate printing wheel 498—W according to the value of the notch 540, of arm 490—W, in operative position. The printing wheel 498—W is thus differentially positioned to print the tens order of the weight.

After the cams 547—c and W complete their rise and their high dwell portions are riding past arms 543, the rise of each of cams 547—d and w begins to take effect on the arms 543—d and w to enter the dimes value in the dimes orders and to position the units weight printing wheel according to the unit load value. After these latter operations have been completed, cams 547—D and Z take effect to cause entry in the dollars order and to position the zone printing wheel according to the selected zone.

The successive operation of the cams is only of utility in connection with the registers and is required to prevent entry into a register order while it is receiving a transfer from the lower order.

If a transfer were made to a register order while a value was being entered therein by operation of its rack sector, then the transfer would not take effect since the register order would then be in motion and the external pawl would not be effectively engaged for rotation by its external ratchet. For this reason, the entry into one order and the transfer into the next higher order takes place before the latter is operated by its rack sector.

After the entry operation into the registers, the rack sectors 492 have been overthrown to provide overthrow of the registers, for reasons explained above.

The rack sectors must now be restored the amount of said overthrow to bring them into proper position with respect to the printing wheels also operated by them. For this purpose, each cam 547 has a short drop following the peak of the rise. This permits springs 548 to return levers 543 and springs 550 to restore sectors 492 the amount they have been overthrown. However to positively effect this return without relying on the springs, the following means is provided. Each rack sector has, at one side, a short supplementary rack bar 552 with ten tooth notches 553, the sides of which are inclined at the upper ends. Adapted to enter the notches of each such member is the tooth end 554 of an arm 555, there being one such arm for each of the six rack sectors. The six arms 555 are fixed to a shaft 556 and one of the arms has an extension below the shaft provided with a pin at the lower end which is engaged by the slotted end of a lever 557 freely rotatably mounted on the sector-carrying shaft 495. The other end of lever 557 has a cam follower roller 558 which is seated in a cam slot 559 of a box cam member 560 carried by the meter cam shaft (see Figs. 42 and 50). At the beginning of a cycle, the cam 560 has positioned lever 557 and through the latter has rocked shaft 556 so that the tooth ends of arms 555 are all engaged in the first notches 553 at the right end of rack bars 552 (see Fig. 26). This holds the rack sectors in alinement and in correct home or zero position at the beginning of a cycle. At 42° of the cycle, before cams 547—c and W begin to rock levers 543 clockwise, cam 560 rocks lever 557 clockwise (Fig. 26) to cause all the arms 555 to rise out of the notches of racks 552. This releases the rack sectors 492—c and W for operation by levers 543.

After the overthrow of these sectors, and while followers 546 of arms 543—c and W are moving down the short drop preceding the upper dwell portion, cam 560 rocks lever 557 counterclockwise to cause lock arms 555 to again enter notches 553 in the racks 552. The entry of the lock arms into the notches cams the sectors back the amount of their overthrow and again alines those sectors which have not yet moved, in their zero positions. Before the rack sectors for the dimes and units pounds wheels are operated, cam 560 again causes lock arms 555 to release racks 552. After the overthrow operation of the dimes and units weight sectors lock arms 555 again operate to restore the latter sectors and aline and lock all the sectors. The lock arms are then released and the dollars and zones sectors go through their entry operations after which the lock arms restore them the amount of their overthrow. This time the lock arms stay in locking position until after the printing operation when they are released from the sectors to permit restoration of the latter.

The rack sectors were all intentionally overthrown to assure the external pawls seating in the proper notches of the external ratchets of the registers. As the rack sectors are driven by levers 543 through a releasable pressure engagement, it is possible that when levers 543 reach the end of their clockwise sector driving stroke, that the sectors will continue moving due to momentum and will run ahead of their operating levers. As a result, the sectors which operate the registers would unintentionally and undesirably overthrow the latter beyond the intended point which might result in moving the registers one step further than proper.

The printing wheels would be overthrown also but since they are geared to the sectors for two-way actuation, when the sectors are restored the amount of unintentional overthrow by their springs 550, the printing wheels also will be restored. However, since the drive between the sectors and registers is one way, the restoration of the sectors by the springs 550 would not restore the amount of unintentional overthrow of the registers. The registers must therefore be prevented from unintentionally overthrowing by the following means: Referring to Figs. 26 and 38, there are three levers 562D, d, and c, one for each of the dollars, dimes, and cents orders, which are freely rotatable on shaft 495. The levers at their lower ends are held engaged with cams 563D, d, and c by springs 564. The upper end of each lever 562 has a pin and slot connection 565 with a member 566 pivotally carried by a pawl 567 pivoted on shaft 568. The nose of pawl 567 is adapted to engage the ratchet teeth of carrier disk 508a of the ascending register order which corresponds to the operating lever 562. Member 566 is found with an upwardly extending lug 569 held engaged with a stud 570 on pawl 567 by a spring 571 between the member and the pawl.

At the beginning of a cycle, the pawls 567D, d, and c are each engaged with the ratchet disks 508a of their corresponding ascending register orders. The operation of the rack sectors c and W begins at 52° of the cycle. Between 35° and 45° of the cycle, the cams 563 release all the levers 562 to permit springs 564 to rock the levers counterclockwise. Due to the engagement of lugs 569 of members 566 with studs 570 of the pawls, the members cannot rock clockwise relative to the pawls. As a result when levers 562 rock counterclockwise, they move members 566 and pawls 567 rigidly together in a clockwise direction, thereby releasing the pawls from disks 508a.

The cents order registers are then free to be operated a differential number of steps by the rack sector 492c in the manner previously explained. As the last step of this latter operation is being completed, cam 563c positively rocks lever 562c clockwise against resistance of spring 564c to move member 566c and pawl 567c counterclockwise. As the nose of the pawl moves towards ratchet disk 508a, it may engage the top of a tooth of the disk while the lever 562 is still rocking clockwise. When this happens, spring 571 yields to permit member 566 to rock counterclockwise about its pivotal connection to the pawl, thus preventing injury to the parts. When the abrupt side of a ratchet tooth of disk 508a encounters the nose pawl 567, it is stopped against further operation by the rack sector. As a result the rack sector is also stopped against further operation. Thus, when the entry operation of the cents order of the ascending register including its intentional overthrow is completed by the rack sector 492c, then pawl 567c is engaged with ratchet disk 508a of the cents order to positively arrest further forward movement of the ascending cents register order and the cents sector 492c. Since forward movement of the latter is arrested at a definite point, then its forward operation of the cents order of the descending register is also definitely stopped. In this manner, the cents rack sector and the cents orders of the registers are positively prevented from running ahead of the operating lever 543c.

In a similar manner, pawls 567d and D operate successively to prevent unintentional overthrow of rack sectors 492d and D and the dimes and dollars orders of both registers.

The transfer pinions 528 of the descending order are carried by a shaft 529 which is hung by bail arms 572 from a shaft 573 (Figs. 26 and 44). This is in order to permit the transfer pinions of the descending register to be separated from the carry-over gears 515 and Geneva disks 509 when the descending register is reset, as will be explained hereinafter. When the transfer pinions are removed from engagement with the descending register, they must be locked in position so that when returned to engagement they will be in proper positions relative to the register. For this reason, the transfer pinions 528 are locked against movement at all times except during the portion of a cycle in which they are under control of rack sectors 492. To effect this, meter cam shaft 465 has a cam 574 (see Figs. 42 and 51) coacting with a lever 575 rotatably carried by shaft 495 and urged clockwise against the cam by a spring 576. The free end of lever 575 is connected by a pin 577 to a link 578 connected to arm 579 of a lock bail 580 rotatably carried by the ends of shaft 573. Bail 580 is engageable between the teeth of Geneva pinions 528 to prevent their rotation. At the beginning of a cycle, the bail is in locking position. Before the operation of the cents order begins, cam 574 operates lever 575 counterclockwise to cause release of bail 580 from the Geneva pinions. After the variable indicia printing operation, near the end of the cycle, the cam again permits spring 576 to rock bail 580 into locking coaction with the Geneva pinions 528.

After the variable indicia printing operations, the cams 547 permit restoration of levers 543 by springs 548 and restoration of sectors 492 by springs 550. In order to positively restore the levers and sectors and to hold them in a definite home position, a positive restoring means is provided in addition to the spring restoring means.

Referring to Figs. 26, 41 and 50, the positive restoring means comprises a bail rod 582 which passes through slots 583 of the rack sectors. The bail rod is carried by a pair of side arms 584 one of which is in the form of a bell crank having its right end engaged with a cam 585 in cam shaft 465. The cam is shaped to permit unimpeded movement of rod 582 under the pressure exerted by the rack sectors 492 and levers 543 during their forward strokes. After the variable indicia printing operation, cam 585 positively rocks the restoring rod 582 counterclockwise. The latter engages the rear end of slots 583 of the rack sectors to positively restore the latter. At the same time the restoring rod engages the upper end of the arm 549 of each lever 543 to positively return the latter to home position.

As previously explained, the subtracting or descending register is set by the post-office at a certain initial figure. The maximum figure is $9999.99. The user of the machine pays to the post-office the value set up on the descending register. If a cycle of operations results in bringing the highest order of the descending register past zero, then the postage paid for has been exhausted. The meter cam shaft is then locked in home position and the motor operation of the machine interrupted. This is done as follows: Referring to Fig. 43, to the left of the highest order of the descending register is a disk 587 which has a single notch 588 (see Fig. 52). Normally, disk 587 is in the position shown in Fig. 52. In this position, its periphery is engaged with the bent-over lug 589 of a vertical slide 590 to hold the latter in up position. The lower end of the slide 590 carries an insulating piece 591 adapted to engage an upper spring blade 592. Intermediate its ends the vertical slide extends transversely to carry a roller 593 above a disk 594 on the meter cam shaft 465.

In the normal up position of slide 590, lug 589 is engaged by the periphery of disk 587, roller 593 is free of the periphery of disk 594, and insulating piece 591 is remote from spring blade 592.

When the postage set up in the meter has been exhausted, the highest order of the descending register moves from 0 to 9. Through the regular Geneva transfer pinion 528 described hereinbefore, the highest order Geneva disk 509 thereupon causes rotation of the carry-over gear 515 which is fixed to the hub of disk 587. This rotates the latter disk one step counterclockwise (Fig. 52), placing its notch 588 under lug 589 of slide 590. Spring 595 connected to the slide thereupon begins to lower the slide but the latter can move only as far as permitted by the engagement of roller 593 with the periphery of disk 594 of the cam shaft. When the latter finishes its cycle and returns to home position, then a notch 594' comes under roller 593 and spring 595 is then effective to complete the depression of the slide. The roller 593 moves into notch 594' of disk 594, thereby locking the cam shaft in home position, the lug 589 of the slide moves into notch 588 of the disk 587, and the lower end 591 of the slide moves blade 592 towards blade 592', thereby closing the points of a switch 596 carried by the blades. The closing of switch 596 interrupts motor operation, as will be later brought out.

To reset the descending register and condition the machine for further operations, the meter is removed and brought to the post-office. The authorized official breaks the seal of lock 598 (Figs. 1 and 26) which locks the top door 599 to the meter case 463, opens the lock and swings the door back on its hinge 600. This exposes the subtraction register wheels and also permits spring 601 to automatically swing pawl levers 602 counterclockwise to bring their rounded nose ends 603 in engagement with the teeth of the carry-over gears 515 of the subtraction register.

The pawl levers 602 simply serve as impositive restraining means for the register orders while they are being reset and also serve to hold the register wheels in the definite differential step positions to which they are reset.

Normally, two spaced hook elements 605 are hooked over a fixed rod 606. These hook elements are connected by pins 606' to the opposite bail arms 572 of the shaft 529 which carries the transfer pinions of the descending register. Spring 607 connected to one of the bail arms 572 tends to rock the entire assembly counterclockwise about shaft 573 but while the hooks 605 are on rod 606, the assembly cannot be rocked. When top door 599 is opened, the hooks 605 are released from rod 606 and spring 607 thereupon rocks the Geneva pinion shaft and its carrying bail counterclockwise, thereby releasing the pinions 528 of the subtraction register from the carry-over pinions and Geneva disks of the subtraction register. The right hand end bail arm 572 (as viewed in Fig. 45) has a lug 608 at its forward end (see Fig. 26) which in the normal position of the pinion shaft 529 is engaged with the gear 515 of the lowest or cents order of the descending register. This holds the gear 515 and the external ratchet 516 of the cents order stationary during normal operations and is made necessary because the first order gear 515 is not held against movement by a Geneva pinion such as 528 of the other orders.

In order to reset the subtraction register, the Geneva pinions are released from the orders above the cents order to permit them to be reset. The release of the pinions is effected by swinging bail arms 572 counterclockwise and this also results in releasing lug 608 from the first order gear 515.

All the orders of the descending register may now be reset. In this resetting operation, the external ratchets must move with the indicating drums since the internal ratchet is held stationary by the rack sectors 492 now fixed against movement because the cam shaft is locked in position. Both the internal and external ratchet pawls cannot simultaneously ride over the ratchet wheels because of the locking piece 526. For this reason, as the internal ratchet is stationary, the cam piece 526 is tilted in a direction to maintain the external pawl in the notch of the external ratchet causing the latter to move with the indicating wheel. This is the reason why the external ratchets must be released by separating the Geneva pinions 528 from the lower orders. As for the orders above the dollars order, they are normally held locked by their associated pinions 528 and the removal of the latter to a remote position, permits free resetting of the higher orders. The disk 587 is reset by lifting the slide 590 out of notch 588 and returning the disk to the position of Fig. 52. To lift the slide, a lever 610 is pivoted about shaft 573 and has an operating key lug 611 at the right end (Fig. 52) and a hook portion at the other end lying under a pin 612 extending transversely from the upper end of slide 590. Turning the disk 587 to its normal position, then holds the slide in upper position.

When the subtraction register has been reset, the hooks 605 are again engaged with rod 606 and the pinion shaft 529 restored to initial position in which the Geneva pinions 528 are again in cooperation with the register orders. The top door 599 is then closed, engaging the pawl levers 602 to swing them clear of the gears 515, after which the door is locked and a seal applied to the lock.

In addition to the weight, zone, dollars, dimes, and cents printing wheels, serial number printing wheels 615 are journaled on shaft 499 (see Figs. 38 and 53). To operate the serial number wheels, a box-cam 616 on meter cam shaft 465 coacts with a lever 617 which has a slot 618 at its lower end receiving the end of a shaft 619. The shaft is supported by bail arms 620 journaled on shaft 499 and rigidly carries an operating pawl 621 which coacts with ratchet wheels 622 of the serial number printing wheels in a well-known manner to advance them one unit at a time upon each reciprocation of lever 617 by box cam 616. Spring pressed dogs 623 coact with the ratchet wheels 622 to prevent retrogression of the serial number wheels 615.

The setting of the serial number printing wheels 615, the weight printing wheels 498W and w, the zone wheel 498Z, and the printing wheels 498D, d, and c has been described. These wheels effect the variable indicia imprint on the stamp blank which has already had the fixed indicia printed thereon.

Before describing the variable indicia printing operation and the issue of the completed stamp, the description of the meter as a separable and removable unit will be completed. This entails an explanation of the means whereby the meter is locked in position when inserted and unlocked when removed and the incidental operations controlled by the locking means.

*Meter locking means*

Referring particularly to Figs. 26, 37, 54, and 55, the meter has two main key shafts 624 and 486. The latter has been previously mentioned as one of the guides for the positioning slides 483 of the meter.

Key shaft 486 is journaled at the left (Fig. 37) in side plate 461 and at the right end is pinned to the rotatable barrel 625 of a lock 626 carried by side plate 462. The key 627 for lock 626 is slidably and irremovably carried by right hand end frame 282 of the machine. A coil spring 628 between the handle 629 of key 627 and frame 282 normally holds the key to the right with its operating end wholly within a hole in frame and out of the way of any part of the meter.

After the meter is moved down into position with the ends of clamp shafts 470 and 471 seated in sockets 472 and 473 of frame standards 31 and 282, respectively, as previously described, then key 627 is pressed in towards lock 626, into barrel 625 and turned clockwise (Fig. 26) about thirty degrees. The lock then holds the key in this operated position until its motion is reversed.

Shaft 486 has intermediate its ends, a crank arm 630 slotted to coact with a pin on the end of an arm 631 fast to previously mentioned upper clamp shaft 470. As key shaft 486 is turned clockwise (Fig. 54) by key 627, arm 630 coacts with arm 631 to turn clamp shaft 470 counterclockwise. This action of shaft 470 moves the latch hooks 474 on the opposite ends beneath studs 475 projecting from frames 31 and 282 to clamp the ends of shaft 470 firmly to the seats of the upper pair of sockets 472 and 473.

Key shaft 486 at the left end, (Fig. 37) has an upwardly extending crank arm 632 connected by pin 633 to a link 634 pivotally connected at its lower end to a crank arm 635 of the lower clamp shaft 471. When key shaft 486 is turned clockwise, its arm 632 moves link 634 upwardly and to the right to turn arm 635 and its shaft 471 clockwise (Figs. 26 and 54). This action of shaft 471 engages its latch hooks 474 beneath the lower pair of studs 475 projecting from frames 31 and 282 to clamp the opposite ends of shaft 471 firmly against the lower pair of sockets 472 and 473.

Thus, operation of key shaft 486 by insertion and turning of key 627 clockwise operates the upper and lower clamp shafts 470 and 471 to tightly clamp the meter in inserted position, in the manner set forth at the beginning of the meter description.

Key shaft 486 has a depending crank arm 636 connected by a link 637 to a bell crank lever 638 rotatably carried by sector-mounting shaft 495. The free end of lever 638 has a pin 639 adapted to move into a slot 640 of a disk 641 (see also Fig. 42) on meter cam shaft 465 when the latter is in home position. When the meter is out of the machine, pin 639 is located in notch 640 and holding disk 641 and meter cam shaft 465 against rotation in either direction, away from its zero or home position. Thus, the cams on the meter cam shaft are all held in home position and the parts controlled by these cams are likewise locked in home position when the meter is out of the machine. This not only prevents operation of the meter when the latter is not in the machine but assures its parts being in the correct home position when the meter is re-inserted.

When the meter is re-inserted and clamped in position by turning of key shaft 486 clockwise (Fig. 54) as described above, then crank arm 636 moves to the left and through link 637 rocks lever 638 counterclockwise to withdraw its pin 639 from slot 640 of disk 641, thereby releasing the meter cam shaft 465 for operation.

Still another crank arm 643 is provided on key shaft 486. Arm 643 is connected by link 644 to the lower end of a lever 645 freely rotatably mounted on a collar 646 carried by upper clamp shaft 470. The upper arm of the lever is formed as a lock sector 645' adapted to register with a segmentally-shaped milled slot 647 in a collar 648 fast to upper key shaft 624.

As previously described, key shaft 486 has a crank arm 632 at the left end with a pin 633 connecting it to link 634 to operate the lower clamp shaft 471. A similar arm 632' is carried by shaft 486 at the right hand end and provided with a pin 633'. These pins 633 and 633', respectively coact with the slotted ends of bail arms 648 and 648', rotatably carried by upper clamp shaft 470 and carrying between them a lock bar 649. Arm 648' also has a pin 650 projecting outwardly from its side in line with the lower end of the lock bar 649 and may be considered as an extension of the lock bar. Pin 650 is adapted to move into registry with a slot 651 in the extreme right hand positioning slide 483 (as viewed from the bottom of Fig. 38) while bar 649 is adapted to move into slots 651 of the remaining five slides 483. When the meter is out of the machine, the pin 650 and bar 649 are inside slots 651 and prevent movement of slides 483 out of home position. When the meter is replaced in the machine and key shaft 486 turned clockwise, as described, then crank arms 632 and 632' rock bail arms 648 and 648' clockwise, thereby removing pin 650 and lock bar 649 out of slots 651 of the positioning slides. The slides are thus released for operation by arms 340 of the reading mechanism.

Lower clamp shaft 471 has a depending arm 653 connected by a link 654 to a bail 655 rotatably carried by the ends of shaft 499 of the printing wheels 498. The bail 655 carries an arcuate shield 656 which is located below the printing wheels to prevent printing therefrom when the meter is out of the machine.

When the meter is inserted and key shaft 486 rocked clockwise, through arm 632 and link 634, the key shaft rocks lower clamp shaft 471 clockwise (Fig. 54). Through link 654, this action of shaft 471 rocks the bail 655 and printing shield 656 clockwise to remove the shield from operative, masking position (shown in dotted lines, Fig. 54) to a position (full lines, Figs. 26 and 54) in which the printing wheels 498 are exposed and operative to effect printing.

Upper clamp shaft 470 also has a crank arm 658 at the left end (Figs. 54 and 55) connected by a link 659 to the operating lever 660 (see also Figs. 26 and 54) of a switch 661 carried by meter plate 461. Before the key shaft 486 is rocked clockwise by key 627, the switch lever 660 is in its upper position and switch points 662 are closed. When the meter is inserted, the switch points will remain closed until and unless key shaft 486 is rocked clockwise by its key 627. Then, the upper clamp shaft 470 will rock counterclockwise, depressing link 659 to rock lever 660 downwardly to open switch points 662. When the switch points are closed, the motor M cannot be operated. When the points are opened, the motor can be operated. Thus, to run the motor and thereby the machine after insertion of the meter first requires turning of key shaft 486 to in turn perform all the operations attendant upon turning of said key shaft.

As stated above, when the meter is inserted and key shaft 486 still in initial, unactuated position, then switch points 662 are closed to prevent motor operation. To understand how this is effected, the motor control circuit will be described with reference to Fig. 22. It will be remembered that insertion of the meter engaged its plug pins 477 and 478 with contacts 480 and 481 of a receptacle 479 carried by frame 31. It will also be remembered that the motor circuit contains the relay contacts 153a and b which are normally closed to permit making of the motor circuit upon closing of main switch 151. Relay contacts 153a and b are opened by a motor control relay 153 when the latter is energized. Energization of relay 153 is effected through a motor control circuit which includes the switch points 662 which must be closed to permit the circuit to make. This circuit is as follows:

*Motor control circuit*—From +24 volt terminal 223, through line 664, relay 153, lines 665, 666, contact 480 in plug receptacle 479, plug pin 477 of the meter, line 667 in the meter, switch points 662 of the meter switch 661, line 668, meter plug 478, contact 481 of receptacle 479, and lines 669 and 670 to the —24 volt terminal 237.

The above circuit energizes relay 153 to open contacts 153a and b in the motor circuit, preventing operation of the motor after the meter has been inserted in the machine and before the key shafts 486 and 624 are properly operated.

When key shaft 486 is turned clockwise, after insertion of the meter, then it causes switch points 662 to open as previously explained. This in turn breaks the motor control circuit to de-energize relay 153 and permit contacts 153a and b to close. The motor circuit can then be made by closing main switch 151.

It may also be explained at this point how the motor circuit is opened by the depression of vertical slide 590 when the postage set up in the meter is exhausted. As previously described when the postage is exhausted, a disk 587 on the subtraction register shaft is moved one step by a transfer from the highest order of the subtraction register. This places a notch 588 in the disk under a lug 589 on slide 590 to permit depression of the slide at the end of the cycle. Depression of the slide locks the cam shaft in home position and closes normally open switch 596 in the meter. Now referring to Fig. 22, notch 596 is in parallel with switch 662 and although the former are now open because the meter is properly locked in inserted position, the closing of the switch 596 establishes the motor control circuit described above. As a result, relay 153 is energized and the contacts 153a and b opened to break the motor circuit. The motor cannot be operated now even with the meter in the machine until the subtraction register is re-set.

The operation of the key shaft 486 has been explained. The function and operation of the upper key shaft 624 will now be described.

Referring to Fig. 37, key shaft 624 at the right freely passes through an opening in meter side plate 462 and at the left is normally slidably supported by a key housing 672 secured to side plate 461. The left end of shaft 624 is provided with a key 624'. A coil spring 673 surrounding the key shaft, between the collar 674 of the shaft and the side plate 461 maintains the shaft at its right hand limit. In this limit position of the shaft, it cannot be turned but can only be moved axially towards the left. Further, its key 624' is inside key housing 672. The right hand end of shaft extends outside the meter and is provided with a handle 675.

When the meter is out of the machine, the key shafts 624 and 486 are at their counterclockwise limits and in the positions shown in Fig. 56. In these positions, the lock sector 645' rotatably mounted on upper clamp shaft 470 is opposite a circular, unbroken portion of collar 648 on shaft 624. As a result, key shaft 486 cannot now be turned clockwise as this would require lever 645 to rock clockwise an action which is now prevented because collar 648 is in the path of movement sector 645'. Thus, when the meter is out or when the meter is set in the machine and the key shafts are still in initial positions, key shaft 486 cannot be turned by key 627. To turn the key shaft 486 requires first that the upper key shaft 624 be moved by pressure on handle 675, towards the left (Fig. 37) against resistance of spring 673. This places the axial portion of collar 648 containing the milled slot 647 in the plane of sector 645'. Further, as the shaft 624 is moved axially towards the left, its key 624' moves into the key slot of a lock barrel 676 of a lock 677 carried by frame plate 31. Shaft 624 can now be turned clockwise (Figs. 54 and 56), thereby moving its slot 647 from the position shown in Fig. 56 to the position shown in Fig. 54. In the latter position, the bottom of the slot is concentric with the axis of lock sector 645' and with the path of the upper end of the sector. Now, the sector 645' can move clockwise without interference from collar 648. This permits key shaft 486 to turn clockwise to perform the functions attendant upon the operation of said key shaft and described hereinabove. When key shaft 486 has been turned to its clockwise position, Fig. 54, then lock sector 645' registers with slot 647. Now shaft 624 is locked against turning until the sector is first moved out of the slot.

When key shaft 624 was turned clockwise, its key 624' turned lock barrel 676 of the lock 677 on frame 31 clockwise. Lock barrel 676 has an eccentric connection to the upper end of a vertically extending link 678 which at the lower end is pivotally connected to a lever arm 679 at the left end (see Fig. 27) of shaft 403 previously mentioned in the description of the VOID printing block in the fixed indicia printing means. When the key shaft 624 is turned clockwise, its key 624' rocks cylinder 676 clockwise (Fig. 54), thereby depressing link 678 to move lever 679 and its shaft 403 clockwise. As the latter rocks clockwise, its arms 404 (see Figs. 26 and 32) rock upwardly to raise VOID printing block 402 (see also Fig. 34). This sets the VOID block in inoperative position incapable of effecting an imprint on the stamp.

After key shaft 624 has been turned clockwise only then can key shaft 486 be turned clockwise to perform its stated functions. After shaft 486 has been operated, shaft 624 is locked against turning by coaction of sector 645' with slot 647.

When both key shafts have been properly operated, the meter is clamped in inserted position, the meter parts are unlocked for operation, the printing wheels are exposed for printing effectiveness, the motor control circuit is conditioned to permit the machine motor M to run, and the VOID block is set in inoperative position.

To remove the meter from the machine, key shaft 486 must first be turned counterclockwise from the position of Fig. 54 to that of Fig. 56. This brings the sector 645' out of locking coaction with slot 647 of key shaft 624. It also causes clamp shaft 470 to rock clockwise and clamp shaft 471 to rock counterclockwise to release their latch hooks 474 from pins 475 of the machine frame.

At the same time, it results in closing of switch 662 so that when the meter is subsequently replaced the motor circuit will be conditioned to prevent motor operation until the key shaft is again turned clockwise. When clamp shaft 471 is rocked counterclockwise, it sets shield 656 in masking position with respect to the printing wheels.

After shaft 624 is turned counterclockwise and the latch hooks 474 release the studs 475, the meter is still not removable because key 624' is inside lock cylinder 676 and the coaction of the latter two elements prevents lifting of the meter out of the machine.

Shaft 624 however is now free to be rocked counterclockwise and in so doing, its key 624' turns cylinder 676 in the same direction to raise link 678 and rock shaft 403 counterclockwise. This moves VOID block 402 down into printing position.

When shaft 624 is fully turned counterclockwise, spring 673 moves the shaft axially to the right (Fig. 37), releasing key 624' from cylinder 676. The meter is now free to be bodily removed, upwardly, from the machine when shaft 624 was moved to the right by spring 673, the unbroken circular portion of collar 648 was positioned in front of the lock sector 645'. This is to prevent turning of key shaft 486 before clockwise operation of key shaft 624 when the meter is subsequently reinserted to thereby compel the VOID block to be placed in inoperative position before the meter can be locked in place and conditioned for operation.

Access to handle 675 of key shaft 624 and handle 629 of key 627 for operating key shaft 486 is had by removing the right hand side angular cover plate 35' of machine case 35 (see Figs. 1, 2, and 37).

The cover plate 35' is provided at the top with a lock 680 to lock it to the top of frame 282 and has offset hook portions 681 at the lower end of its vertical side to hook under the lugs 682 at the top of the front piece of the right hand side of casing 35. Preparatory to removing or inserting the meter, the lock 680 is opened by a key in the possession of the operator and the cover plate 35' unhooked from casing 35.

The reason for setting the VOID block 402 in printing position when the meter is out of the machine is to prevent counterfeiting of a stamp with the aid of the machine. Thus, with the meter out, closing of main switch 151 completes the motor circuit setting the motor in operation. Operating bar 100 can then be moved forward (Fig. 6) to set the machine in operation for a cycle. This will result in printing of the fixed indicia and the cutting off and injection of a stamp (the latter two operations will be later explained). Since the meter is out, there will be no variable indicia printing below the headings Ser. No., Wt., Z., and Amt. pd. now recorded on the stamp. If the space intended to receive the variable indicia is thus left blank, an opportunity is provided to print in by some means other than the meter a serial number, weight, zone, and postage. These stamps would not be charged against the meter since the subtraction register of the meter has not been operated. To avoid such unwarranted and unauthorized operation of the machine, when the meter is out, the Void block is set in position to print Void in the space normally occupied by the variable indicia. Now should the machine go through a cycle with the meter out, the fixed indicia printing operation will print the void or invalid stamp shown in Fig. 1a.

The meter has been described as a separable unit. In this description, the manner in which the printing wheels 498 were set to print a serial number, weight, zone, and postage was explained. These items comprise the variable indicia and the variable indicia printing operation on the stamp will now be explained.

Variable indicia printing

The setting of the zone, weight, and amount type wheels 498 was completed at about 240° and their operating sectors 492 then locked in position by arms 555 until about 280° of the cycle. The serial number wheels 498 were also operated at 240° of the cycle and remain set in operated position. Between 250° and 260° of the cycle, the variable indicia imprint is taken from the type wheels.

As explained previously, at about 60° of the cycle after the stamp blank received the fixed indicia imprint, it was fed past knives 455 and 456 and into variable indicia printing position between shields 457 and 458 and above platen 459. These latter elements are below the type wheels 498.

The construction of shields 457 and 458 may be understood from Figs. 26, 27, 37, 38, 57, and 58. The upper shield (see Fig. 57) is formed of two flat spring metal plates 457a and b riveted to each other at the corners with spacers 457c between them. The lower plate 457a is formed with a round bead 457d at the side nearest the fixed indicia printing means and is cut away below the printing wheels and above the platen. The upper plate 457b is formed with a rectangular hole above the opening of the lower plate and is slitted at the opposite ends to provide upwardly extending lips 457e. The upper plate is of spring metal and is so fastened and shaped as to tend to bow towards the lower spring metal plate.

The lower shield 458 (see Fig. 58) is similar to the upper shield with its parts inverted. Thus, the upper plate 458a is formed with the round bead 458d while the lower plate 458b tends to bow towards the upper plate and is formed with downwardly turned lips 458e at each end.

As shown in Fig. 37, a pair of ribbon spools 685 and 686 are carried by brackets 687 from the right hand side frame 282 of the machine. The ribbon coming off the upper spool is led between guide rollers 688, below one lip 457e between plates 457a and b of the upper shield, below the other lip 457e, around guide roller 689, above guide roller 690, above one lip 458e, between plates 458a and b of the lower shield, below the other lip 458e, around the lower guide roller 688 and from there to the lower ribbon spool 686.

The ribbon is guided in above manner by the plates of the upper shield 457 and by the plates of the lower shield 458. Lips 457e and 458e facilitate the entrance of the ribbon between the two plates of each shield and the portions of the plates 457b and 458b at each side of the lip act as side guides for the ribbon. In the initial insertion of the ribbon between the plates of a lower or upper shield, the spring plates 457b and 458b may be flexed apart from the companion shields 457a and 458a to provide an easy free passage for the ribbon folds. Thereafter, the companion plates of a shield flex towards each other to maintain the ribbon straight and taut where it passes through the shield. The ribbon guiding rollers 689 and 690 are supported by a vertically movable assembly 692, shown in Figs. 59 and 60.

The movable assembly comprises a pair of upper and lower plates 693 and 694, secured to each other in vertically spaced relationship by three bushings 695. The upper plate 693 is flat and adapted to support a sheet of paper below the ink ribbon fold which passes between the plates of the lower shield 458. The upper plate also has a rectangular opening for permitting the platen 459 to move therethrough (see Fig. 38). Secured to plate 693 and extending upwardly therefrom are three restoring studs 696 which have restoring shoulders 697 the purpose of which will be explained shortly. Secured to the top of and straddling the two studs 696 at the left end of the assembly (Fig. 59) is a restoring bar 698. The other stud 696 has a restoring screw head 699, the function of which is similar to that of bar 698.

The lower plate 694 carries a pair of vertical sleeves 700, has a circular hole 701 in the center, and its ends are turned up to support horizontally, outwardly extending pins 702.

Movable assembly 692 is mounted for vertical slidable movement by the assembly shown in Fig. 61. This latter assembly comprises the fixed base plate 704 of sub frame 390 of the fixed indicia printing means. Secured to the base plate 704 are a pair of upright bushings 705 and a pair of longer, upright pins 706 which have reduced upper ends 706'.

Also secured to base plate 704 is a bar 707 with upturned ends having bearing holes 708 for a shaft 709 (see Figs. 26, 27, 37, and 38). Platen 459 is provided with depending pins 710 which are received in and guided by bushings 705. Sleeves 700 of the movable assembly 692 surround and slide along bushings 705. The bushings 695 of the movable assembly receive and slide along the pins 706. By the coaction between these parts, the movable assembly is mounted for vertically slidable movement.

Pins 706 project above the top plate 693 of the movable assembly and the shoulders formed at the bases of the reduced ends 706' support the lower shield 458. The studs 696 of plate 693 pass through slots 712 in the lower shield (Fig. 58) and hold the latter against horizontal movement in its own plane. The restoring shoulders 697 lie above and rest on the upper plate 458a.

The reduced ends 706' of pins 706 pass through slots 713 (see Fig. 58) of the lower shield and also serve to prevent lateral movement of the shield. The tops of the reduced ends 706' support the upper shield 457. The latter has slots 714 (Fig. 57) through which the upper enlarged portions of studs 696 pass to prevent lateral movement of the shield. Restoring bar and screw head 699 lie on top of the shield plate 457b.

Shaft 709 of the fixed assembly is provided at each end with a crank arm 715 (see Figs. 26, 32, 38, and 62) slotted at the outer end to receive the pins 702 of lower plate 694 of the movable assembly 692. The shaft is also provided with an operating arm 716 (see also Fig. 27) having a pin 717 at the outer end which is received in the outer, forked, end of a lever 718 coacting with box cam 719 on main cam shaft 310 (see also Fig. 6).

Normally, the upper and lower shields are spaced apart a distance equal to the length of the reduced end 706', the top of which abuts the upper shield and the base of which abuts the lower shield. Further, the lower shield is normally spaced apart from top plate 693 of the movable assembly.

While the shields are spaced from each other, at about 60° of the cycle, as previously explained, the partially completed stamp blank was fed into position over the curved beads 457d and 458d (see Fig. 26) and between the shields. The stamp blank then rests on top of the lower shield and below the upper fold of the ink ribbon which lies between the plates of the upper shield, with the blank portion of the stamp below the headings Ser. No., Wt., Z., and Amt. Pd. in position to receive the imprint from the type wheels 498.

It is desirable while the stamp is receiving the variable indicia imprint to simultaneously have this data printed on an invoice or bill which relates to the package to be mailed and for which the stamp is being issued. To provide for this, the front, right hand corner of the machine (see Fig. 63) is provided with a slot in which is located an invoice guide 722. The invoice or other paper to receive the duplicate imprint is inserted through guide 722 at the beginning of the operations while plate 693 is spaced from the lower shield and is moved onto the top plate 693 to lie underneath the lower fold of the inking ribbon and below the lower shield 458.

In order to provide for a sharp imprint on the stamp and the invoice, the elements 693, 457, and 458 are compressed together and the compressed assembly with the stamp and invoice between them is moved bodily towards the printing wheels 498 immediately before the impression is made by operation of platen 459.

This is done as follows:

Between 225° and 245° of the cycle, cam 719 rocks lever 718 counterclockwise (Fig. 37). The lever in turn, through arm 716 rocks shaft 709 counterclockwise. Arms 715 of the latter thereupon raise the movable assembly 692. As the assembly rises, studs 696 move upwardly and restoring elements 697, 698, and 699 depart from the upper and lower shields 457 and 458. As the rise continues, top plate 693 carrying the invoice engages the lower shield 458 and raises it bodily towards the upper shield. When the lower shield carrying the stamp blank reaches the upper shield, it lifts the upper shield also. The two closely compressed shields then move bodily towards the type wheels 498.

The invoice and stamp are now at 245° of the cycle pressed against the upper and lower folds of the inking ribbon and lie close to the type of wheels 498 now in printing position. Between 250° and 260° of the cycle, platen 459 is operated to cause the type wheels to print on the invoice and stamp. The platen has a central depending portion 724 from which the ends of a pin 725 extend laterally. These projecting ends of the pins are received in the forked, outer ends of the spaced branches of a lever 726 which coacts with a cam 727 on main cam shaft 310 (see Figs. 6 and 27). To the bottom of base 310' of the machine is fixed a cup 728 into which a vertical rod 729, extending downwardly from the portion 724 of the platen, projects. The cup contains a coil spring 730 surrounding the rod 729 and engaging at its upper end with the bottom of portion 724.

The spring tends to move the platen upwardly towards the printing wheels but is restrained from doing so by lever 726 and its cam 727. At 250° of the cycle, the cam abruptly releases the lever and spring 730 sharply moves the platen upwardly to impel the compressed assembly of stamp blank, invoice, and the inking ribbon folds against the type wheels. The variable indicia imprint is thus made on the stamp blank and the invoice.

Following this printing operation, cam 727 restores lever 726 to in turn restore platen 459. Shortly after, the cam 719 restores lever 718 to cause lowering of movable assembly 692 and restoration of shields 457 and 458 and plate 693 to their initial, separated positions.

The invoice is then taken out by the operator. The stamp blank, the imprint on which is now completed, must be cut off from the web of stamp paper and ejected from the machine.

When the meter is out of the machine, there is no variable indicia printing. To prevent actuation of the platen 459 when the meter is out, the platen releasing lever 726 is held against counterclockwise rocking when the meter is removed. This is done by the operation of upper key shaft 624 when it moves the Void block into printing position. For this purpose, lever 679 which is on shaft 403 of the Void block operating means is connected at one end to a bell crank lever 731 freely pivoted on cam shaft 310. When the lever 679 is rocked to set the Void block in operative position, it also moves lever 731 to a position in which its upper, blunt end engages beneath follower pin 726' of lever 726.

Hence, the latter cannot follow the drop in cam 727 should a cam cycle be initiated with the meter removed and accordingly, platen 459 is not released under these conditions for an upward movement by spring 730.

The cutting means for the stamp blank comprises the aforementioned knife blades 455 and 456 (see Figs. 26, 27, and 36), located between the fixed and variable indicia printing means. The upper knife blade 455 is stationary and carried by the front wall of sub-frame 390. The lower knife blade 456 comprises the forward part of a lever 732, the rear end of which is engaged with a box cam 733 on cam shaft 310 (see Figs. 6 and 32). After the variable indicia printing operation, explained above, the cam rocks the lever counterclockwise (Fig. 32) and its blade portion 456 coacts with blade 455 to shear the completed stamp blank from the web.

The stamp is now ready to be rejected from the machine.

When the stamp is in variable printing position, its forward portion projects past the forward end of lower platen 458 and rests on top of an ejector plate 735 which is carried by a bail 736 (see Figs. 9, 26, and 37).

The bail is pivoted at 737 to a bracket 738 secured to a horizontally extending and vertically disposed bar 739 fastened to the frame. Journaled in bracket 738 and in frame 31 is a shaft 740, having at the left hand end (Fig. 37), a cam follower arm 741 which is urged by a spring 742 against a cam 743 on cam shaft 310 (see also Fig. 6). Shaft 740 has a pair of crank arms 744 at each side of bracket 738 which are connected at their outer ends to pins 745 secured to bail 736.

The ejector plate 735 is below rubber-covered ejector rollers 746 which are fixed to a shaft 747 journaled in bracket 738 and in frame plate 31. Shaft 747 has at the side of plate 31 adjacent the weighing mechanism a pulley 748 driven by a belt 749 from a large pulley 749' on motor-driven, continuously running shaft 147 (see also Fig. 13). Thus, ejector rollers 746 are constantly rotating. Normally, ejector plate 735 is in lower position and appreciably spaced from ejector rollers 746 so that although the stamp rests on the ejector plate, it is not engaged by the ejector rollers and is therefore not fed out.

After the variable indicia printing operation and after the cutting operation which shears the completely printed stamp blank from the part resting in fixed indicia printing position, cam 743 rocks cam follower arm 741 and its shaft 740 clockwise (Figs. 9 and 26), so that arms 744 on the shaft swing bail 736 counterclockwise, thereby moving ejector plate 735 upwardly towards ejector rollers 746. The leading portion of the stamp resting on the ejector plate is thereby gripped between the ejector rollers and ejector plate and fed out of the interior of the machine into a stamp-catching trough 750 fixed to the front of the machine casing (see Figs. 9 and 63). The restoration of sectors and type wheels occurs during cutting and ejecting period. Thereafter the finger lock bail releases the fingers and slides and they are restored by springs. The last operation in the cycle is the release of mechanical latch on bar 100 and restoration of same (when hand is removed from lever 83).

Summary of operations

The operations of the machine to issue a postage stamp for a package will be briefly described.

Figure 14:
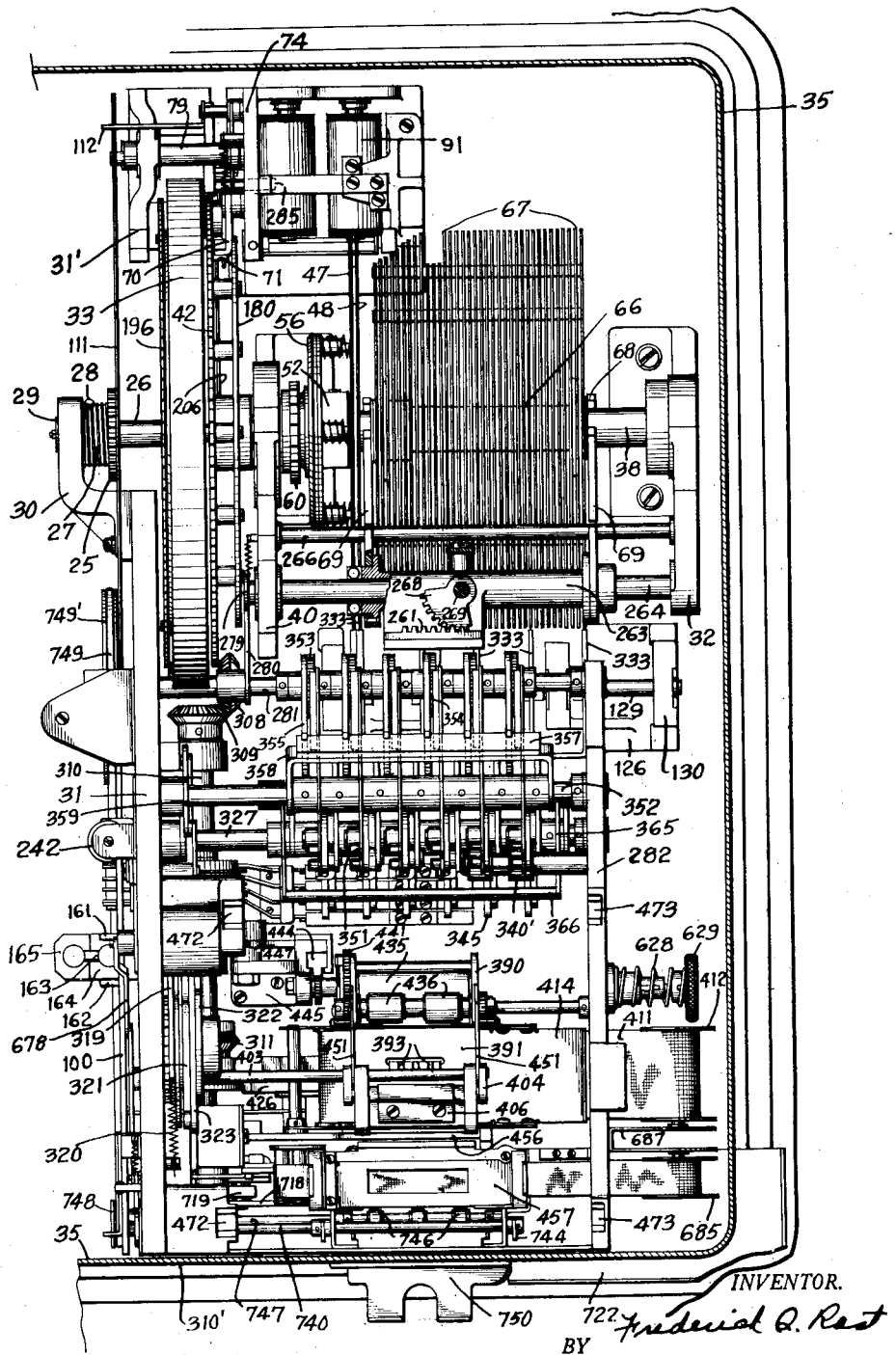
Fig. 14 is a plan section through the machine with the meter out.

The package is placed on scale platform 10 (Fig. 3) and the weight of the package causes weight shaft 26 to assume a position corresponding to the load and chart 33 on the shaft to indicate the exact weight through sight window 34 (Fig. 12). Contact plate 213 (Fig. 11) movable with the chart is likewise set in a position corresponding to the load. Now either at this time or previous to placing the package on the scale, the operator adjusts handle 272 to select the parcel post zone to which the package is to be mailed. This zone selection shifts disks 67 (Fig. 8) axially of supplementary shaft 38 to place one disk, corresponding to the selected zone, of each set of nine disks 67Z, D, d, and c, in a control plane, in line with a feeler 333 (Figs. 9 and 14).

After the weighing operation is completed, i. e., when the indicator 33 comes to rest under the load, and after the zone selection, the operator depresses handle 93 to advance operating bar 100 (Figs. 6 and 7). Bar 100 moves bar 111 to the left (Fig. 6) to rock shaft 79 counterclockwise and cause the stop 70 to withdraw from pin 71 of notched disk 42 on shaft 38. This releases the shaft for rotation by the friction coupling 51—56. Just before release of shaft 38, bar 100 closed switch 164 to form circuit A through normally closed relay contacts 172a (Fig. 22). This circuit causes high speed solenoid 157 to act and connect the driven shaft 129 to the high speed driving train (Fig. 13). Thus shaft 129 through its driving connection to the friction clutch 56 rotates shaft 38 at the high speed when stop 70 is withdrawn from pin 71 to release shaft 38 for rotation.

During the first portion of the rotation of shaft 38, cam 180 thereon depresses arm 183 (Fig. 10) to cause knife edge 192 to enter a notch 200 of disk 196 carried by the weight chart 33. The knife edge thereby cammingly coacts with the angular side of the notch 200 to secondarily set the weight shaft and to lock it in the even pound position following the load position. Arm 183 is meanwhile latched down by a latch 204.

As shaft 38 continues its rotation at high speed, brushes 216a and b engage contact portions 213a and b to establish circuit D which energizes change speed relay 172 to open contacts 172a, breaking high speed circuit A and to close relay contacts 172b to form circuit F. Circuit F energizes low speed solenoid 156 (Fig. 13) to connect shaft 129 to the low speed driving train. As a result, shaft 38 driven by shaft 129 has its speed reduced.

Energization of relay 172 by circuit D also closed relay contacts 172c to form holding circuit D' for the relay and to also establish circuit E which energizes relay 254 to close relay contacts 254a. The closure of relay contacts 254a is a necessary prerequisite to the operation of means for arresting shaft 38 in a position corresponding to the set position of weight shaft.

Shaft 38 is now rotating at the low speed and brush 216a moves off contact portion 213a, thereby breaking circuit D, but contacts 254a still remain closed due to the maintained closure of contacts 172c. As shaft 38 continues its rotation, brushes 216b and c engage contact portions 213b and c, forming latch circuit G through relay contacts 172c and relay contacts 254a.

Circuit G energizes magnet 91 to rock latch 88 into engagement with a notch 421 of the disk 42 fast on shaft 38. The latch 88 thereby arrests shaft 38 in a position corresponding to that of weight shaft 26.

When latch 88 fully enters a notch 421 to arrest shaft 38, it closes contacts 287 to establish circuit H for energizing clutch solenoid 288. This initiates the one-revolution cycle of cam shafts 310 and 315.

The further operation will be explained with particular reference to the timing diagram, Fig. 28. Cams 321 and 322 (Figs. 6 and 15) on cam shaft 315 during the first 30° of the cycle rock bail 329 (Fig. 9) clockwise. Through springs 338 the bail advances arms 331 and feeling fingers 333 towards the weight selector disks 47 and 48 and the disks 67 which were set in control planes by the zone selection. As arms 333 move forward, they bodily move their paired arms 340 along with them (Figs. 15 to 17). The feelers and arms advance until arrested in differential positions by the steps 262 of the selector disks. As a result pins 349 of arms 340 are set in differential positions.

Between 30 and 50° of the cycle, finger lock bail 357 operates to engage the alined notches 356 in sectors 355 actuated through connections to pins 349. This locks the sectors and the pins 349 in their differentially set positions. At the same time, shaft 337 is rocked counterclockwise (Fig. 16) to release latches 345 from arms 331, freeing the latter for return movement without disturbing the differential positions of pins 349.

Between 55° and 95° of the cycle, arms 331 and feelers 333 are returned by bail 329, the position of the parts at the end of this return movement being shown in Fig. 17. Retraction of feelers 333 disengages them from the selector disks so that restoration of shaft 38 may subsequently begin before the recording and registering operations take place. At 180° of the cycle, pins 304 and 305 on one-revolution disk 298 depress arm 285b sufficiently to cause an overthrow of link 206 to the left (Figs. 5 and 6), thereby kicking latch 88 out of detaining engagement with disk 42 releasing the latter for restoration by the friction coupling 51—56 to home position. When link 206 operated to release latch 88, it also raised bar 113 to permit shaft 79 to rock clockwise thereby resetting stop 70 in the path of pin 71 of disk 42 whereby the shaft 38 is arrested in home position.

While the selector disks were being read, between 20° and 30° of the cycle, platens 418 and 419 (Fig. 32) were actuated to cause the fixed indicia imprint to be made on the stamp blank.

Pins 349 while being set in differential positions also moved slides 483 of the meter MR differential distances. The slides 483 thereupon rocked stepped arms 490 to set them in angular positions corresponding to the differential positions of pins 349.

Between about 52° and 232° of the cycle, cams 547 of meter cam shaft 465 act successively to operate levers 543 to cause their arms 542 to encounter stepped arms 490 at differential times and move these stepped arms and their rack sectors 492 differential amounts depending on the angular settings of the stepped arms which were in turn determined by the settings of pins 349.

Rack sectors 492 through lower teeth 496 position type wheels 498 for printing the cents, dimes, and dollars values read off from selector disks 67c, d, and D and the zone, tens of lbs. and units of lbs. values read off from selector disks 67Z, 47 and 48. The rack sectors also operate pinions 503 and 504 to enter the cents, dimes, and dollar values in the ascending and descending registers.

After the fixed indicia imprint, and between 70° and 180° of the cycle, paper feed cam 448 operated to advance the paper below type wheels 498 and between upper and lower ribbon shields 457 and 458 (Fig. 26). Between 225° and 245° of the cycle, cam 719 operates to move the shields 457 and 458 and the invoice or duplicate slip table 693 towards each other and then bodily for a short distance towards the type wheels.

The setting of the type wheels was completed at 230°. The compression of the shields and the table is completed at 245°. Between 250° and 260° of the cycle, platen 459 is moved upwardly to effect the variable indicia imprint on the stamp blank from type wheels.

Between 270° and 290° the ribbon shields and the invoice plate 693 are separated from each other.

At 290°, the knife 456 is moved upwardly to cut the completed stamp blank off from the remainder of the stamp paper.

At about 320° of the cycle; ejector plate 735 has moved upwardly sufficiently to cause eject rollers 746 to eject the completed stamp blank into stamp trough 750 on the outside of the machine.

Between 290° and 335° of the cycle, rack sectors 492 are fully restored to home positions by restoring bail 582. Restoration of sectors 492 also restores type wheels 498 to zero positions.

At about 350° of the cycle, lock bail 357 releases sectors 355, permitting springs 341 to relax and restore arms 340, pins 349, slides 483, and stepped arms 490 to initial positions.

Starting at 345° of the cycle, cam 387 moves link 383 down to cause latch 106 to release operating bar 100. The latch completes its release of the bar near the very end of the cycle. Now provided that shaft 38 has returned to home position, latch 243 has also released bar 100. With both these latches released, spring 95 restores bar 100.

The machine is then ready for the next operation.

While the invention has been explained in its application to the disclosed embodiment, it is to be understood that such variations, departures, and changes as may be made without departing from the principles of the present invention lie within the scope of the following claims.

What is claimed is as follows:

1. In a machine including means operable according to a variable; the combination of selector mechanism, means mounting the selector mechanism for movement independently of and separately from the first named means in two directions transverse to each other, a device for moving the selector mechanism in one of aforesaid directions to set the selector mechanism according to a classifying factor independent of the aforesaid variable, a control mechanism comprising a control part included in the first named means and another control part included in the selector mechanism, a power drive operable after completion of the operation of the first named means and after the selector means has been set by said device for moving the selector mechanism in the other of aforesaid directions, and separate means governed by coaction of said control parts of the control mechanism for stopping the movement of said selector mechanism by said power drive when the selector mechanism reaches a position dependent on the aforesaid variable, whereby the selector mechanism is set according to said variable in addition to its previous setting according to the classifying factor.

2. In a machine including variably operable means; the combination of a set of movably mounted selector members, a device for moving any desired one of the selector members to a control plane, a control mechanism comprising a control part included in the variably operable means and another control part connected to the selected member, a power drive operable after the operation of the variably operable means and after the selected member has been moved to aforesaid control plane for moving the selected member along said plane, and means separate from but governed by coaction of said control parts of the control mechanism for stopping the movement of the selected member along said control plane when the selected member reaches a position dependent on the operation of the variably operable means.

3. In a machine including means displaceable according to a variable; the combination of a set of rotatably movable selector disks each having its periphery provided with differential steps for representing different values around the periphery, the arrangement of steps on each of said disks differing from the arrangements on the other disks whereby the disks represent different values at corresponding peripheral points, a device for selecting one of said disks for control purposes, an electrical intercontrol mechanism between the first-named means and the selected disk, a power drive operable after the displacement of the first named means and after the selection of said latter disk for rotating the selected disk, and means electrically governed by said intercontrol mechanism for stopping rotation of the selected disk by the power drive when the latter reaches a position corresponding to displacement of the first named means whereby a stepped portion of the selected disk is selected for controlling purposes according to the aforesaid variable.

4. In a machine including variably positionable means; the combination of a set of rotatably movable selector disks each having its periphery provided with differential steps for representing different values around the periphery, the arrangement of steps on each of said disks differing from the arrangements on the other disks whereby the disks represent different values at corresponding peripheral points, a device for selecting one of said disks for control purposes, an intercontrol mechanism between the variably positionable means and the selected disk, a notched disk connected to the selected disk, a power drive operable after the positioning of the variably positionable means and after the selection of said latter disk for rotating the selected disk and the notched disk, and a latch, operation of which is governed by said intercontrol mechanism, for engaging a notch of the notched disk to arrest rotation of the latter and the selected disk by said power drive when the latter disk reaches a position corresponding to that of the variably positionable means.

5. A machine comprising a set of movably mounted selector members, a device for moving any desired one of the selector members to a control plane, a first control device settable at any one of different positions within a control range, a second control device, a power drive operable after the first control device has been arrested in one of said positions and after the selected member has been moved to aforesaid control plane for moving the selected member along said plane, and for moving the second control device to sense the position of the first control device and locking means separate from said devices but controlled by the sensing of the first control device by the second for stopping the movement of the selected member along said plane and locking said selected member in said plane at a position corresponding to that of the first control device.

6. A machine comprising a variably positionable mechanism, a set of rotatably movable selector disks each having its periphery provided with differential steps for representing different values around the periphery, the arrangement of steps on each of said disks differing from the arrangements on the other disks whereby the disks represent different values at corresponding peripheral points, a device for selecting one of said disks for control purposes, an electrical intercontrol mechanism between the variably positionable mechanism and the selected disk, a power drive operable after said variably positionable mechanism has been arrested in one of its positions and after the selection of said latter disk for rotating the selected disk, and means electrically governed by said intercontrol mechanism for stopping rotation of the selected disk when the latter reaches a position corresponding to that of said variably positionable mechanism.

7. In a machine including mechanism operable according to a variable; the combination of selecting mechanism settable after completion of the operation of the first named mechanism but under control of the latter mechanism in a position dependent on said variable, auxiliary mechanism, a cyclically operable actuator for the auxiliary mechanism, means controlled by the setting of said selecting mechanism in said position for initiating operation of said actuator, and means between the selecting mechanism and the auxiliary mechanism and controlled by the selecting mechanism according to the variable for selectively governing operation of the auxiliary mechanism by the actuator.

8. In a machine including mechanism operable according to a variable; the combination of stepped selector disks, a shaft for mounting the disks for movement separately from and independently of the aforesaid mechanism, means controlled by a part of the aforesaid mechanism, for setting the shaft and its selector disks in a position dependent on the variable, cyclically operable auxiliary means, means controlled by the setting of the disks in said position for initiating the cycle of operations of the auxiliary means, and means controlled by the disks for selectively and differentially governing the operation of the auxiliary means in accordance with the variable.

9. In a machine including mechanism operable according to a variable; the combination of stepped selector disks, a shaft for mounting the disks for rotation independently of the first named mechanism, a notched disk also carried by said shaft, means for rotating said shaft, an intercontrol mechanism between the shaft and the first named mechanism, a latch controlled by operation of the intercontrol mechanism for engaging the notched disk and arresting it and the shaft with the stepped disks in a position corresponding to the variable, cyclically operable auxiliary mechanism, means controlled by the latch when it arrests said shaft for initiating the cycle of operations of the auxiliary mechanism, and means coacting with the stepped disks for differentially governing operation of the auxiliary mechanism in accordance with the variable.

10. In a machine including mechanism operable according to a variable; the combination of selecting mechanism settable under control of the first named mechanism in accordance with the variable, recording mechanism, paper feeding mechanism for feeding a blank to the recording mechanism to receive a record therefrom, means rendered effective upon setting of the selecting mechanism according to the variable for initiating operation of the paper feeding mechanism, means controlled by the selecting mechanism for governing operation of the recording mechanism according to the variable to record on the blank, and means for preventing more than one such recording operation for a single setting of the selecting mechanism.

11. In a machine including mechanism operable according to a variable; the combination of selecting mechanism settable under control of the first named mechanism in accordance with the variable, means for maintaining the setting of the selecting mechanism, a cyclically operable actuator, means operative upon setting of the selecting mechanism in accordance with the variable for initiating a cycle of operations of said actuator, means controlled by the actuator intermediate its cycle for releasing said selecting mechanism for return to normal, and means for preventing more than one cycle of the actuator upon failure of said selecting mechanism to return to normal when released.

12. In a machine including mechanism operable according to a variable; the combination of selecting mechanism separate from the first named mechanism, an intercontrol means between the first and second named mechanisms including a device movable by the first named mechanism and a coacting device cooperating with the selecting mechanism, means governed by the coaction of said intercontrol devices for setting the selecting mechanism according to the variable, registering mechanism controlled by the selecting mechanism for differential registering operation according to the variable, means set in operation during coaction of said intercontrol devices for operating the registering mechanism to effect said registering operation, and means for preventing more than one registering operation upon a single maintained coaction of said intercontrol devices.

13. In a machine including mechanism operable according to a variable; the combination of selecting mechanism separate from the first named mechanism, an intercontrol means between the first and second named mechanisms including a device movable by the first named mechanism and a coacting device cooperating with the selecting mechanism, means governed by the coaction of said intercontrol devices for setting the selecting mechanism according to the variable, auxiliary mechanism controlled by the selecting mechanism for differential operation according to the variable, means set in operation during the coaction of said intercontrol devices for operating the auxiliary mechanism for a differential operation under control of the selecting mechanism, and means for preventing more than one such differential operation upon a single maintained coaction of said intercontrol devices.

14. In a machine including mechanism movable according to a variable; the combination of selecting mechanism separate from the first named mechanism, an intercontrol means between the first and second named mechanisms including a device movable by the first named mechanism and a coacting device cooperating with the selecting mechanism, means governed by the coaction of said intercontrol devices for setting the selecting mechanism according to the variable, recording mechanism controlled by the selecting mechanism for differential recording operation according to the variable, means set in operation during coaction of said intercontrol devices for operating the recording mechanism to effect a recording operation, and means for preventing more than one recording operation upon a single maintained coaction of said intercontrol devices.

15. In a machine including means operable according to a variable; the combination of selecting mechanism, an intercontrol means between the selecting mechanism and the first named means, means governed by the intercontrol means for setting the selecting mechanism according to the variable, a cyclically operating actuator, means controlled by said setting means upon the setting of the selecting mechanism according to the variable for initiating operation of said actuator for a cycle, registering mechanism differentially operated by the actuator during its cycle and under control of the selecting mechanism in accordance with the variable, and means for preventing more than one cycle of said actuator for a single setting of the selecting mechanism.

16. In a machine including means operable according to a variable; the combination of selecting mechanism, an intercontrol means between the selecting mechanism and the first named means, means governed by the intercontrol means for setting the selecting mechanism according to the variable, a cyclically operating actuator, means controlled by and upon the setting of the selecting mechanism according to the variable for setting said actuator in operation for a cycle, auxiliary mechanism differentially operated by the actuator during its cycle and under control of the selecting mechanism in accordance with the variable, and means for preventing more than one cycle of said actuator for a single setting of the selecting mechanism.

17. In a machine including means operable according to a variable; the combination of selecting mechanism, intercontrol devices between the selecting mechanism and the first named means, means governed by the intercontrol devices for setting the selecting mechanism according to the variable, a cyclically operating actuator, means controlled by the setting means upon the setting of the selecting mechanism according to the variable for initiating operation of said actuator for a cycle, type members differentially operated by the actuator during its cycle and under control of the selecting mechanism in accordance with the variable, and means for preventing more than one cycle of said actuator for a single setting of the selecting mechanism.

18. In a machine including variably operable mechanism; the combination of selecting mechanism, intercontrol devices between the variably operable mechanism and selecting mechanism; means governed by the intercontrol devices for setting the selecting mechanism according to the operation of the variably operable mechanism, a cyclically operable actuator, means controlled by and upon the setting of the selecting mechanism for initiating a cycle of operations of the actuator, means for returning the selecting mechanism to normal, and means for preventing a second cycle of operations of the actuator upon a maintained setting of the selecting mechanism and upon failure of the latter to return to normal.

19. In a machine including variably positionable mechanism, the combination of selecting mechanism, a control part in the variably positionable mechanism and a coacting control part in the selecting mechanism, means for moving the selecting mechanism to different positions corresponding to those of the variably positionable mechanism, a device operated upon the coaction of said control parts when they reach a predetermined relationship to each other for arresting the selecting mechanism in a position dependent on the position of the variably positionable mechanism, cyclically operating cam mechanism, means controlled by said device when it arrests the selecting mechanism for initiating a cycle of operations of the cam mechanism, means actuated by the latter mechanism for temporarily releasing said device from the selecting mechanism to permit return of the selecting mechanism to normal, and means for preventing the device after its release from returning to arresting position and initiating a second cycle of the cyclically operating mechanism upon failure of the selecting mechanism to return to normal and upon said control parts maintaining their aforesaid predetermined relationship.

20. In a machine including mechanism operable according to a variable; the combination of control means forming a part of the first named mechanism and settable thereby at a position corresponding to the variable, a follower mechanism movable from a predetermined starting position and independently of the first named mechanism, after the control means is at rest at the first mentioned position, to follow said control means to the latter position, and a variable speed drive for the follower mechanism.

21. In a machine including variably operable mechanism; the combination of control means forming a part of the variably operable mechanism and assuming a position of rest dependent on the operation of the latter mechanism, a follower mechanism movable from a position entirely remote from the first mentioned position and independently of the variably operable mechanism to follow said control means to the first mentioned position, means for driving the follower mechanism at an initial predetermined speed, means for driving the follower mechanism at a less speed than the former speed as it approaches said control means, and means for setting the follower mechanism in operation by the first driving means after the aforesaid control means is at rest at the first mentioned position.

22. In a machine including mechanism operable according to a variable; the combination of control means forming a part of the latter mechanism and assuming a position dependent on the variable, a follower mechanism movable independently of the first named mechanism to follow said control means to its position, means for driving the follower mechanism at an initial high speed, means governed by said control means and said follower mechanism depending on their relative positions for reducing the speed of the follower mechanism as it nears the first mentioned position, means for locking the control means in the latter position, means for initiating driving of the follower mechanism by the first driving means, and a common operating device for the locking and initiating means to operate them concomitantly.

23. In a machine including mechanism operable according to a variable; the combination of control means forming a part of the latter mechanism and assuming a position dependent on the variable; a follower mechanism movable independently of the first mentioned mechanism to follow said control means to its position, means for initially driving the follower mechanism at a high speed, means for reducing the speed of the follower mechanism as it approaches the first mentioned position, and means controlled by said control means and said follower mechanism depending on their relative positions for positive locking of the follower mechanism against movement when the latter reaches said first mentioned position.

24. In combination, a control means for assuming any one of different positions, a follower mechanism for following said control means to its assumed position, high speed gearing for driving the follower mechanism at an initial high speed, low speed gearing and means controlled by the control means and said follower mechanism depending on their relative positions for shifting the driving of the follower mechanism from the high speed to the low speed gearing to reduce the speed of the follower mechanism as the latter nears said assumed position.

25. In combination, a control means for assuming any one of different positions, a follower mechanism for following the control means to i's assumed position, means for driving the follower mechanism at an initial high speed, means for reducing the speed of the follower mechanism as it nears said assumed position, a device controlled by the control means and said follower mechanism depending on their relative positions for arresting the follower mechanism when it reaches said assumed position, and means for preventing operation of said device to arrest said follower mechanism unless the speed-reducing means has functioned properly.

26. In combination, control means for assuming any one of several positions, a follower mechanism for following the control means to its assumed position, a power drive, high speed driving connections between the power drive and the follower mechanism including a first clutch, means for initially rendering said first clutch operative to cause driving of the follower mechanism at an initial high speed, low speed driving connections between the power drive and the follower mechanism including a second clutch, and means controlled by said control means and said follower mechanism depending on their relative positions as the follower mechanism approaches said assumed position for disabling the first clutch and rendering the second clutch effective to cause driving of the follower mechanism at a low speed.

27. The combination as defined in claim 26 and in which the first clutch is of the one-way type and the second clutch is of the two-way type to prevent slipping of its parts upon its being rendered effective.

28. In combination, a rotatable control part for assuming any one of different positions, a rotatable follower mechanism including a second control part for following the first control part to its assumed position, a shaft for mounting the follower mechanism, an axially shiftable shaft, a member connected to the axially shiftable shaft for common rotation therewith, means for supporting said member independently of the latter shaft so as to relieve the latter shaft of the weight of said member, a second member on the shaft of the follower mechanism driven by the first-mentioned member for rotating the latter shaft, a driven clutch element carried by the axially shiftable shaft, a high speed driving clutch element and a low speed driving clutch element between which the driven clutch element is disposed, means for initially shifting the axially shiftable shaft in a direction to engage the driven clutch element with the high speed driving clutch element whereby the follower mechanism is rotated at a high speed, and means controlled by interaction of said control parts for axially shifting the axially shiftable shaft in a direction opposite to the first-named direction for releasing the driven clutch element from the high speed driving clutch element and engaging the driven clutch element with the low speed driving clutch element whereby the follower mechanism is then driven at a low speed, and means controlled by said control parts for arresting the follower mechanism when its control part reaches said assumed position.

29. In combination, a rotatable electrical control element for assuming any one of several positions, a follower mechanism including a second rotatable electrical control element for following the first mentioned control element to its assumed position, variable speed gearing for driving the follower mechanism, means for setting the gearing at an initial high speed ratio to drive the follower mechanism at an initial high speed, electrical means controlled by initial coaction of said control elements before the second element reaches said assumed position for reducing the speed ratio of the gearing to drive the follower mechanism at a low speed, and electrical means controlled by interaction of said control elements when the second element reaches said assumed position for stopping the follower mechanism.

30. In combination, a control part for assuming any one of several positions, each corresponding to and dependent on a different variable factor, a follower mechanism for following said control part to its assumed position, frictional driving means for driving the follower mechanism, a stop device for initially holding said follower mechanism in a predetermined starting or home position to prevent its being driven by the frictional means, means for operating the stop device to release the follower mechanism for actuation by said frictional driving means, and means controlled by said control part and said follower mechanism when the latter reaches a position assumed by the former for arresting the follower mechanism and causing the frictional driving means to slip when the follower mechanism reaches said assumed position.

31. The combination as defined in claim 30, and including means for subsequently releasing said arresting means to cause the frictional driving means to return the follower mechanism to home position, and means for automatically restoring effectiveness of said stop device to stop the return of the follower mechanism and cause slipping of the friction driving means when the follower mechanism reaches home position.

32. In combination, a variably settable control device for assuming any one of several positions, a follower mechanism for following said control device to its assumed position, frictional driving means for driving the follower mechanism, a stop device for initially holding the follower mechanism in a predetermined starting or home position and restraining actuation of the follower mechanism by the frictional driving means, manual means for causing release of said stop device to render the frictional driving means effective for actuating the follower mechanism, and means controlled by said control device and the follower mechanism for arresting the follower mechanism and causing the friction driving means to slip when the follower mechanism reaches said assumed position.

33. The combination as defined in claim 32, and means controlled by operation of the aforesaid manual means for setting said frictional driving means in operation just prior to the release of said stop.

34. In the combination defined in claim 32, means for subsequently releasing the arresting means to cause return of the follower mechanism to home position by said frictional driving means, and connections between said latter releasing means and said stop device for restoring effectiveness of said stop device to arrest the return movement of the follower when it reaches home position.

35. In combination, a control device for assuming any one of several positions, selector mechanism settable under control of said device in accordance with the assumed position of said device, means coacting with the selector mechanism to hold the latter set according to said assumed position, auxiliary mechanism, means for differentially operating the auxiliary mechanism under control of the selector mechanism and in accordance with the setting of the latter, and means for releasing said holding means from the selector mechanism to permit restoration of the latter to normal before the auxiliary mechanism completes its differential operation.

36. In combination, a control device for assuming any one of several positions, selector mechanism settable under control of said device in accordance with the assumed position of said device, members differentially controlled by the selector mechanism after the latter has been set, means for retaining said members in their differentially set positions while restoring said selector mechanism to normal, auxiliary mechanism differentially operated under control of said members according to their differential positions, and means for releasing said members for return to normal at the end of the operation of the auxiliary mechanism.

37. In combination, a control device for assuming any one of several positions, selector mechanism settable under control of said device in accordance with the assumed position of said device, reading mechanism differentially set by the selector mechanism after the setting of the latter, means for retaining the differential setting of the reading mechanism while the selector mechanism is restoring to normal, and auxiliary mechanism differentially controlled by the reading mechanism, during restoration of the selector mechanism, in accordance with the retained, differential setting of the reading mechanism.

38. In combination, a control device for assuming any one of several positions, selector mechanism settable under control of said device in accordance with the assumed position of said device, reading mechanism differentially set by the selector mechanism after the setting of the latter, means for retaining the differential setting of the reading mechanism while the selector mechanism is restoring to normal, and indicating mechanism differentially controlled by the reading mechanism, during restoration of the selector mechanism, in accordance with the retained, differential setting of the reading mechanism.

39. In combination, a control device for assuming any one of several positions, selector mechanism settable under control of said device in accordance with the assumed position of said device, reading mechanism differentially set by the selector mechanism after the setting of the latter, means for retaining the differential setting of the reading mechanism while the selector mechanism is restoring to normal, and registering mechanism differentially controlled by the reading mechanism, during restoration of the selector mechanism, in accordance with the retained, differential setting of the reading mechanism.

40. In combination, a control device for assuming any one of several positions, selector mechanism settable under control of said device in accordance with the assumed position of said device, reading mechanism differentially set by the selector mechanism after the setting of the latter, means for retaining the differential setting of the reading mechanism while the selector mechanism is restoring to normal, and recording mechanism differentially controlled by the reading mechanism, during restoration of the selector mechanism, in accordance with the retained, differential setting of the reading mechanism.

41. In combination, a control device for assuming any one of different positions, stepped selector mechanism settable under control of said device in accordance with the assumed position of the device, feelers for engaging the selector steps, an actuator, means controlled by the actuator for moving the feelers into engagement with said steps, members differentially positioned by the feelers in accordance with the steps engaged by the latter, means for withdrawing the feelers from the steps after said members have been differentially positioned, means operated by said actuator for retaining the members in their differential positions after withdrawal of said feelers, and auxiliary mechanism controlled by said members in accordance with their differential positions after the feelers have been withdrawn.

42. In combination, a control device for assuming any one of different positions, stepped selector mechanism settable under control of said device in accordance with the position assumed by said control device, feelers for engaging the steps of the selector mechanism, members differentially positioned by the feelers in accordance with the steps engaged by the feelers, means for withdrawing the feelers after the members have been differentially positioned, means for retaining the differential setting of said members after the feelers have been withdrawn, auxiliary mechanism differentially controlled by the members according to the setting of the latter, and means for initiating restoration of the selector mechanism after the feelers are withdrawn and while said members are still retaining their differential positions.

43. In combination, a control device for assuming any one of several positions, selector mechanism settable under control of said device according to the position assumed by said device, a feeler for engaging the selector mechanism to be differentially positioned thereby, a control member, means releasably coupling the control member to the feeler to take a differential position similar to that of the feeler, means for uncoupling the feeler from the control member after the feeler has been differentially positioned by the selector mechanism, means for returning the feeler to initial position, means for retaining the control member in its differential position while the feeler is returned to initial position, and auxiliary means controlled by the control member for differential operation.

44. In the combination defined in claim 43, the coupling means between the feeler and control member preventing the control member from moving ahead of the feeler when the latter is stopped by the selector mechanism in a differential position.

45. In the combination defined in claim 43, the means for retaining the control member in differential position and the means for uncoupling the feeler from the control member being simultaneously and commonly operated.

46. In a machine including variably operable mechanism; the combination of selector mechanism settable under control of the first named mechanism according to the operation of the latter mechanism, reading mechanism cooperating with the selector mechanism to be differentially set by the selector mechanism, auxiliary mechanism differentially operated under control of the reading mechanism, and power means separate from the first named mechanism for restoring the selector mechanism while the auxiliary mechanism is being differentially operated.

47. In combination, a notched element primarily set and moved to a position corresponding to a variable, secondary setting means including a member for moving into a notch of the element to secondarily set and move the element to a predetermined point proximate to said position, a device for operating said member, a cam for actuating said device, means for retaining the device in actuated position, and means separate from said cam for releasing said device for restoration.

48. In combination, an element movable to any of successive positions spaced apart a distance equivalent to a predetermined unit of value, a first contact carried by said element and correspondingly set, follower mechanism carrying a second contact restricted to cooperation with said first contact during a movement of the second contact through aforesaid distance, means for actuating the follower mechanism to cause the second contact to follow the first contact to its set position, and means automatically operated under control of the contacts during their aforesaid restricted cooperation for arresting the actuation of the follower mechanism.

49. In the combination as defined in claim 48, and means for adjusting the location of the first contact relative to said element in the direction of movement of said element to one of the aforesaid positions whereby the first contact is in definite, predetermined relationship to the position of the element.

50. In combination, an element set in any of several positions, a first contact carried by said element and correspondingly set, follower mechanism including a toothed disk, the successive teeth of which are spaced apart a distance equivalent to a predetermined factor, a second contact connected for movement to said disk, drive means for actuating the disk and second contact to cause the latter to follow the first contact to its set position, a latch for engaging a tooth of said disk to arrest its actuation, and means controlled by the coaction of said contacts for an interval restricted to the travel of the disk through said distance for automatically operating the latch to engage a tooth of the disk and arrest actuation of the latter.

51. In the combination as defined in claim 50, auxiliary mechanism, means operated by the notch when it fully engages a tooth of the disk and arrests the latter for initiating operation of the auxiliary mechanism, and means for controlling the operation of the auxiliary mechanism in accordance with the arrested position of said disk.

52. In combination, variably settable selector mechanism, auxiliary mechanism controlled for operation by the selector mechanism according to the setting of the selector mechanism, means operated before the auxiliary mechanism completes its operation, for restoring the selector mechanism, and means for preventing a new setting of the selector mechanism after restoration of the latter until the auxiliary mechanism completes its operation.

53. In combination, variably settable selector mechanism, a power drive for setting the selector mechanism, auxiliary mechanism, cyclically operated mechanism for operating the auxiliary mechanism under control of the selector mechanism and in accordance with the setting of the latter, means rendered effective under control of the cyclically operated mechanism for causing the aforesaid power drive to restore the selector mechanism independently of the cyclically operated mechanism, and means for preventing a new setting of the selector means until the cyclically operated mechanism completes its cycle.

54. In combination, selector mechanism having a home position, an actuator for moving the selector mechanism variable amounts from its home position to variably set said selector mechanism, a manual device operable to initiate movement of said selector mechanism by said actuator, auxiliary mechanism controlled for differential operation by said selector mechanism according to the setting of the latter, actuating means other than said actuator for independently of the latter operating the auxiliary mechanism, means controlled by the aforesaid actuating means of the auxiliary mechanism for causing restoration of the selector mechanism to home position after it has controlled the auxiliary mechanism, and means for preventing an effective new initiating operation of said manual device before the selector mechanism has returned to home position.

55. In the combination defined in claim 54, and other means controlled by the auxiliary mechanism for preventing an effective new initiating operation of the manual device even if the selector mechanism has returned to home position unless the auxiliary mechanism has also completed its operation.

56. In combination, selector mechanism having a cycle of operation during which it is moved different amounts from a home position to be variably set in selecting positions, auxiliary mechanism having another different cycle of operation during which it is controlled by the selector mechanism according to the setting of the latter, means operative upon the setting of the selector mechanism in a selecting position for initiating the cycle of the auxiliary mechanism, other means for initiating the cycle of the selector mechanism, and means for preventing operation of said latter initiating means until a preceding cycle of the auxiliary mechanism is completed.

57. In combination, selector mechanism variably settable from its normal position, auxiliary mechanism controlled by the selector mechanism according to the setting of the latter, a manual member operated to initiate the setting of the selector mechanism, a pair of latches for locking the manual member in actuated position, means controlled by the selector mechanism when it is restored to normal position for releasing one of said latches, and means controlled by the auxiliary mechanism for releasing the other latch when the auxiliary mechanism completes its operation whereby the manual member is locked in actuated position until both the selector and auxiliary mechanisms have completed their operations.

58. In a combination including variably operable means; the combination of selector mechanism having a normal home position and settable subsequently to operation of the variable operable means but under control of the latter means to a position dependent on the operation of the latter means, a manual member operable independently of the variably operable means to initiate setting of the selector mechanism, a latch for retaining the member in operated initiating position, and means for releasing the latch upon return of the selector mechanism to said home position.

59. In combination; selectively settable selector mechanism, control members individually moved to differential positions under control of the selector mechanism and in accordance with the setting of the latter, stepped elements positively coupled to the control members for differential positioning by the members, means for engaging steps of the stepped elements to move them differential amounts according to their positioning and while they remain coupled to the control members, registering mechanism, and means connected to the stepped elements and operated by and in accordance with movements of the stepped elements for differentially operating the registering mechanism.

60. In combination; selectively operable selector mechanism, control members moved to differential positions under control of the selector mechanism and in accordance with the operation of the latter, stepped elements positively coupled to the control members for differential positioning by the members, each stepped element having a plurality of steps one of which is selected according to the differential positioning of the element, means for engaging the selected steps of the stepped elements to move them differential amounts according to their positioning and while they remain coupled to the control members, recording mechanism including differentially settable means, and means connected to the stepped elements and operated by and in accordance with the differential amounts of movement of said elements for differentially setting the settable means of said recording mechanism.

61. In combination; selectively operable selector mechanism, a control member moved to differential position under control of the selector mechanism and in accordance with the operation of the latter, an operating arm movable in a certain direction, an element having a plurality of steps and set by said control member with one of its steps in the path of movement of said operating arm, means for positively holding said element from moving transversely to said direction when the arm strikes the step in its path, said arm after striking said step moving said element in aforesaid direction a differential amount according to which of the steps is engaged by said arm, and means differentially operated by said element an amount depending on the operation of the aforesaid selector mechanism.

62. In combination; selector mechanism operable in accordance with a variable, a control member movable to a differential position under control of the selector mechanism and in accordance with the operation of the latter, an element settable by said member in a corresponding differential position, an operating arm for encountering different points of said element depending on the setting of the latter and actuating the element a differential amount, means for positively restraining the element from varying its setting under the force of the blow struck by said arm when it encounters said element, registering mechanism, and means operated by said element upon its actuation by said arm to enter a value into said registering mechanism depending on said variable.

63. In combination; selector mechanism settable in accordance with a variable, a control member movable to a differential position under control of the selector mechanism and in accordance with the operation of the latter, an element settable by said member in a corresponding differential position, an operating arm for encountering different points of said element depending on the setting of the latter and actuating the element a differential amount, means for positively restraining the element from varying its setting under the force of the blow struck by said arm when it encounters said element, recording mechanism including differentially settable means, and means operated by said element upon its actuation by said arm for differentially setting the settable means of said recording mechanism in accordance with said variable.

64. In a machine of the class described; the combination of selector mechanism operable in accordance with a variable, a control member movable in a certain direction to a differential position under control of and in accordance with the operation of the selector mechanism, an element coupled to said member for common movement without play substantially in above direction to be set in a corresponding differential position, operating means separable from the element for encountering the element and actuating it a differential amount depending on its setting in a second direction transverse to the first-named direction, common means for locking both the member and element against movement by said operating means in said first-named direction and restricting the actuation of the element by said operating means to a movement in the second direction, and means differentially operated, an amount depending on the variable, by said element when the latter is actuated in the second direction.

65. In combination; selector mechanism selectively operable in accordance with a variable, a control member movable in a certain direction to a differential position under control of and in accordance with the operation of the selector mechanism, a stepped element, a pin and slot coupling between said element and said control member for connecting the element to the member for common movement without play in substantially above direction to be differentially set thereby, an operating member movable in a second direction transverse to the first-named direction and encountering said element to actuate the latter in aforesaid direction, and mechanism differentially operated by the element during its movement in the second direction for an amount depending on the variable.

66. The combination as defined in claim 65, the slot of said pin and slot coupling being elongated in the second direction whereby movement of the element in the second direction is effected without interference from the control member.

67. The combination as defined in claim 65, the slot of said pin and slot coupling being elongated to permit movement of the element in the second direction without interference from the control member, said slot and pin co-acting without play in their initial, relative position and the slot widening as the pin is moved therealong in the second direction to prevent binding between the slot and pin as the movement in the second direction proceeds.

68. In a machine including selectively operable mechanism; the combination of translating mechanism controlled by the selectively operable mechanism for operation according to a variable, a removable meter including differentially operable mechanism controlled by the translating mechanism, means for locking the meter in inserted position, actuating means for the translating mechanism operable when the meter is out of the machine, means for disabling said actuating means by and upon the insertion of the meter, and means controlled by the locking means upon locking the meter in inserted position for rendering the actuating means operative.

69. A machine comprising a variably positionable element, a set of selector members, mechanism for selecting one of said members for control purposes and including manually operable means movable in one direction to cause said mechanism to select one of said members, a device for initially restraining operation of said manually operable means in aforesaid direction and requiring a preliminary movement of said means transversely of aforesaid direction to release said means for movement in the selecting direction, driving means for moving the selected member to a position corresponding to that of the variably positionable element, an instrumentality operable for initiating movement of the selected member by the driving means, and means operated by said manually operable means, when the latter is given said preliminary movement, for preventing operation of said instrumentality and for permitting said instrumentality to operate only while said device is restraining operation of the manually operable means.

70. In combination; selecting mechanism settable in a position dependent on a variable, auxiliary mechanism, an automatic cyclically operable actuator for the auxiliary mechanism, means controlled by the setting of the selecting mechanism in said position for automatically initiating the operation of the actuator for one cycle, and means controlled by the selecting mechanism in accordance with the setting of the selecting mechanism for governing operation of the auxiliary mechanism by the actuator during aforesaid cycle of the actuator.

71. In combination; control means operable in accordance with a variable and including two portions, one portion of the control means assuming a variable-dependent position and the other portion assuming a position immediately behind the aforesaid position, a follower mechanism movable independently of the control means and after the control means is at rest, to follow said control means to the aforesaid position, means for driving the follower mechanism at an initial high speed, and means governed by the second-mentioned portion of said control means and said follower mechanism depending on their relative positions for reducing the speed of the follower mechanism as it nears the first-mentioned portion of the control means and the variable-dependent position at which the latter portion is set.

72. In combination; control means for assuming a position dependent on a variable, a follower mechanism movable independently of the control means to follow said control means to the aforesaid position, means for driving the follower mechanism to follow the control means, a device operated by said driving means for preliminarily locking the control means substantially in the aforesaid position, means for causing said driving means to drive the follower mechanism at an initial high speed, and means governed by said follower mechanism and said control means depending on their relative positions and after the control means has been locked in position for reducing the speed of the follower mechanism as it nears the position of the control means.

73. In a machine including variably operable mechanism; the combination of selector mechanism selectively settable under control of the variably operable mechanism, reading mechanism, a cyclically operable actuator, means controlled by the actuator, during a part of the cycle of the actuator, for selectively setting up the reading mechanism under control of the selector mechanism, means operated by the actuator during its cycle for retaining the differential set-up of the reading mechanism, means for restoring the selector mechanism while the reading mechanism is retaining its set-up, and auxiliary mechanism differentially operated under control of the reading mechanism while the selector mechanism is restoring.

74. In a machine including variably operable mechanism; the combination of selector mechanism variably settable under control of the variably operable mechanism, reading mechanism including a sensing part and a control part, a cyclically operable actuator, means controlled by said actuator during a cycle thereof for moving the sensing part into engagement with the selector mechanism to thereby set up the control part of the reading mechanism, means operated by the actuator during said cycle and after the control part of the reading mechanism has been set up for retaining the setup of said control part, means operated by the actuator while said setup is retained for withdrawing the sensing part clear of the selector mechanism, means for thereupon restoring the selector mechanism to normal, and auxiliary mechanism selectively operated under control of said control part while the selector mechanism is being restored to normal.

75. In combination; a control means positionable in any one of different positions, a follower mechanism which follows the control means to its assumed position, a device for arresting the follower mechanism upon arrival of the latter at the aforesaid assumed position, auxiliary mechanism controlled by the follower mechanism according to the position at which the latter is arrested, and cyclically operating means set in cyclical operation under control of said device, upon the latter arresting the follower mechanism, for automatically operating the auxiliary mechanism under control of said follower mechanism.

76. In combination; a first control means positionable in any one of different positions, a follower mechanism having a second control means to coact with the first control means upon the follower mechanism reaching the position assumed by the first control means, a device operated under control of both said control means upon their coaction for arresting the follower mechanism in the aforesaid assumed position, auxiliary mechanism controlled by the follower mechanism according to its arrested position, and a cyclical actuator set in operation for a cycle under control of said device, upon the latter arresting the follower mechanism, for actuating the auxiliary mechanism under control of the follower mechanism.

77. In combination; selecting mechanism settable in a position dependent on a variable, a device for arresting the selecting mechanism upon arrival of the latter in the aforesaid position, auxiliary mechanism controlled by the selecting mechanism according to the variable, a cyclically operable actuator for the auxiliary mechanism, and means controlled by said arresting device, upon movement of the latter to arrest the selecting mechanism, for initiating operation of the actuator.

78. In combination; selector mechanism settable according to a variable, a device for holding the selector mechanism in its setting, reading mechanism differentially settable under control of the selector mechanism after the latter has been acted on by the holding device, means for releasing said holding device from the selector mechanism, after the reading mechanism has been set, to permit restoration of the selector mechanism, and auxiliary means operated under control of the reading mechanism during restoration of the selector mechanism.

79. In combination; selector mechanism settable according to a variable, reading mechanism differentially set under control of said selector mechanism, means acting after the reading mechanism has been set to retain the setting of the reading mechanism, means for initiating restoration of the selector mechanism after retention of the setting of the reading mechanism has been effected, and auxiliary mechanism operated under control of the retained setting of the reading mechanism while the selector mechanism is being restorted.

80. In combination; selectively operable selector means, control members individually moved to different positions under control of the selector mechanism, stepped elements positively coupled to the control members for differential positioning by the members, means, operable after the elements have been differentially positioned, for engaging the steps of the stepped elements to move them differential amounts depending on their differential positioning and while they remain coupled to the control members, auxiliary mechanism, and means for operating the auxiliary mechanism under control of the stepped elements in accordance with the differential movements thereof effected by said engaging means.

FREDERICK Q. RAST.